(12) United States Patent
Huang et al.

(10) Patent No.: US 12,111,448 B2
(45) Date of Patent: Oct. 8, 2024

(54) OPTICAL CAMERA SYSTEM

(71) Applicant: ZHEJIANG SUNNY OPTICS CO., LTD., Yuyao (CN)

(72) Inventors: Wenbo Huang, Yuyao (CN); Lingbo He, Yuyao (CN); Fujian Dai, Yuyao (CN); Liefeng Zhao, Yuyao (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 752 days.

(21) Appl. No.: 17/318,260

(22) Filed: May 12, 2021

(65) Prior Publication Data

US 2021/0382281 A1 Dec. 9, 2021

(30) Foreign Application Priority Data

May 26, 2020 (CN) .......................... 202010453455.4

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  CPC .............................. G02B 13/0045; G02B 9/64

USPC ................................... 359/754, 708
See application file for complete search history.

(56) References Cited

U.S. PATENT DOCUMENTS

| | | | | |
|---|---|---|---|---|
| 2016/0139372 | A1* | 5/2016 | Tanaka | G02B 13/0045 359/708 |
| 2020/0209593 | A1* | 7/2020 | Hirano | G02B 13/0045 |
| 2020/0209594 | A1* | 7/2020 | Hirano | G02B 13/0045 |
| 2020/0393652 | A1* | 12/2020 | Kuo | G02B 9/64 |
| 2021/0018728 | A1* | 1/2021 | Li | G02B 9/64 |
| 2022/0082795 | A1* | 3/2022 | Wang | G02B 9/64 |

* cited by examiner

*Primary Examiner* — William R Alexander
*Assistant Examiner* — Sharrief I Broome
(74) *Attorney, Agent, or Firm* — Birch, Stewart, Kolasch & Birch, LLP

(57) ABSTRACT

An optical camera system is provided, including, in order from an object side to an image side along an optical axis: a first lens, a second lens, a third lens, a fourth lens, a fifth lens, a sixth lens, a seventh lens, an eighth lens and a ninth lens having refractive powers. The first lens has a convex object side surface; the fifth lens and the ninth lens have negative refractive powers; and a distance TTL from an object side surface of the first lens to an imaging plane of the optical camera system on the optical axis and a half ImgH of a diagonal length of an effective pixel region of the optical camera system satisfy: TTL/ImgH<1.5.

18 Claims, 30 Drawing Sheets

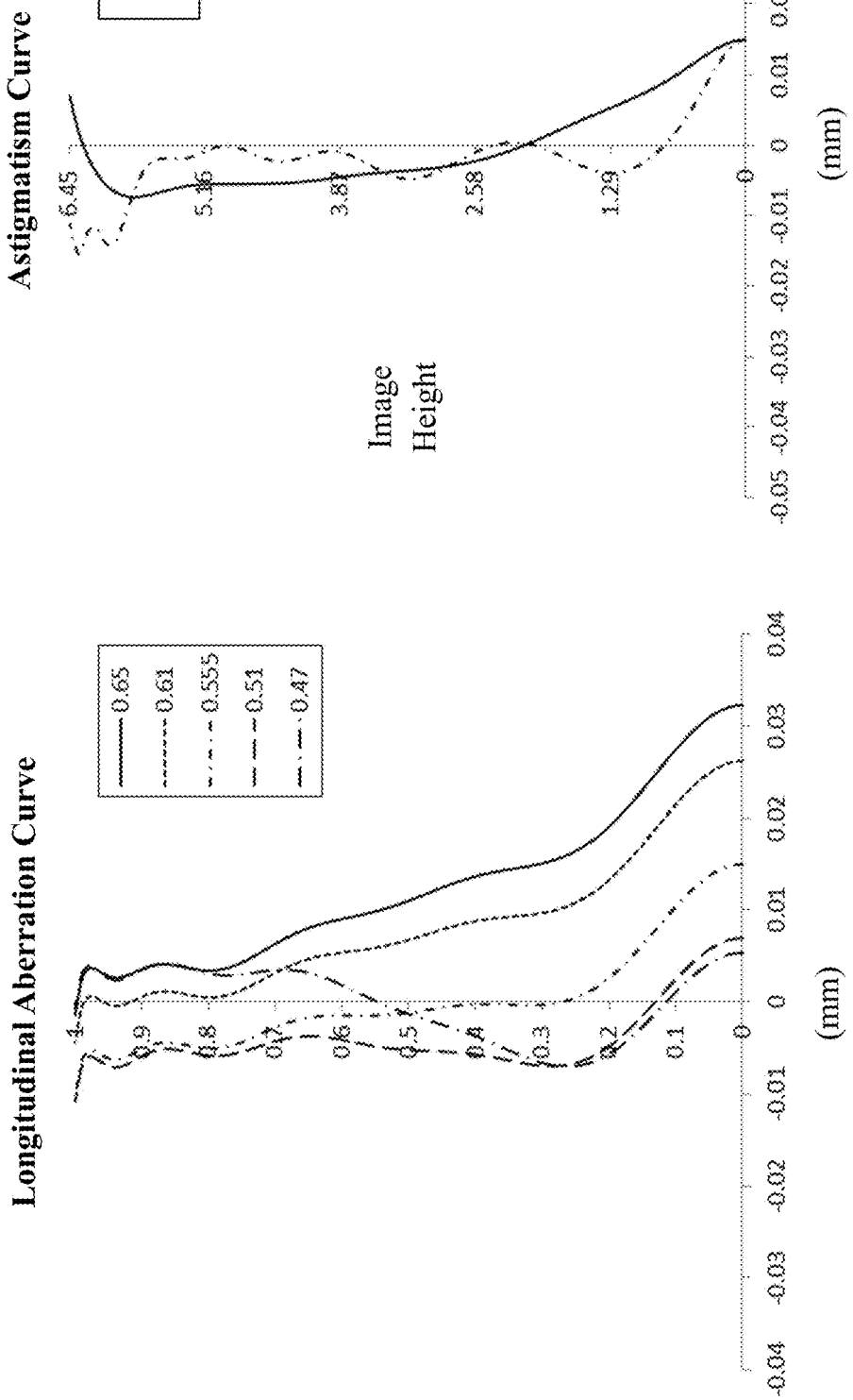

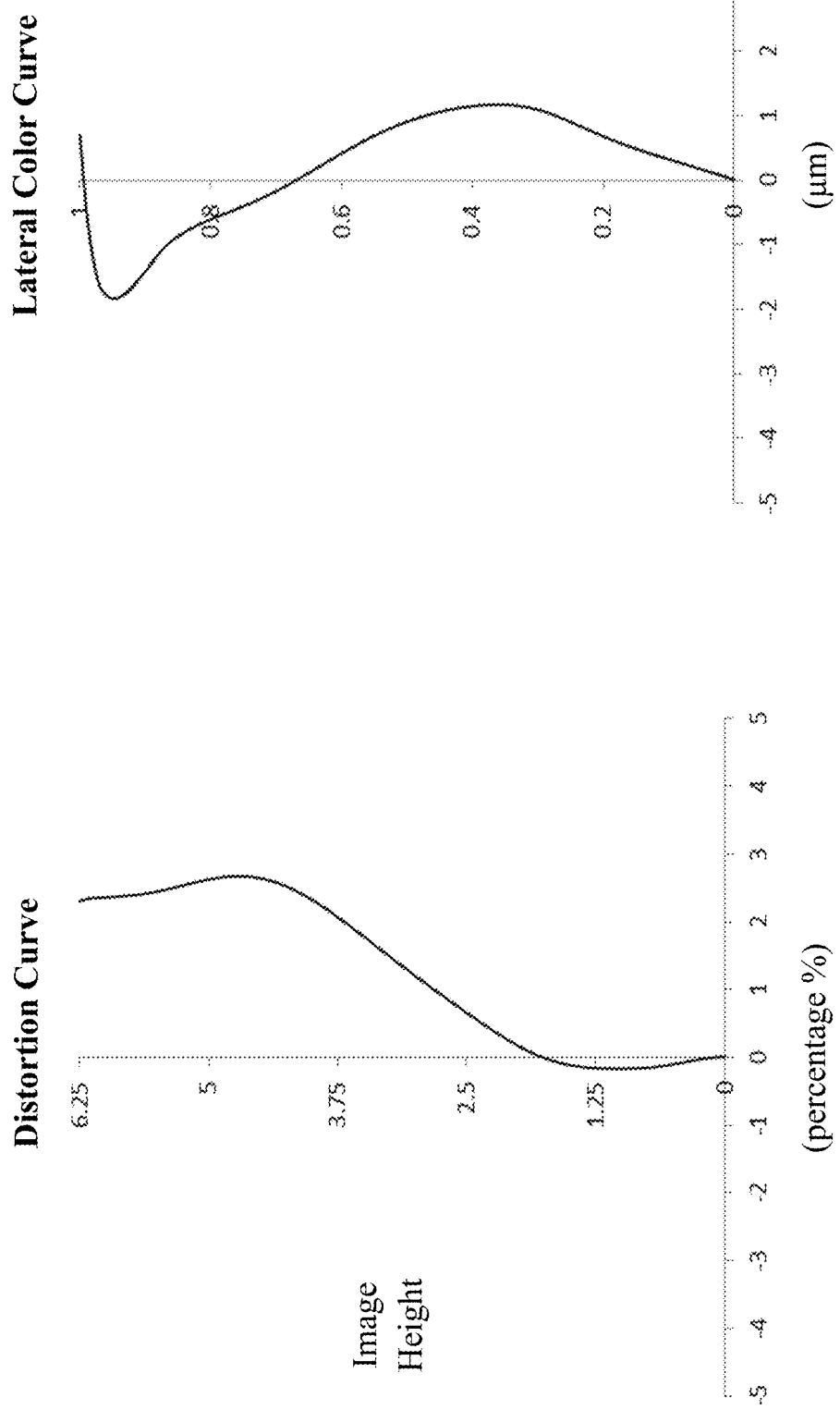

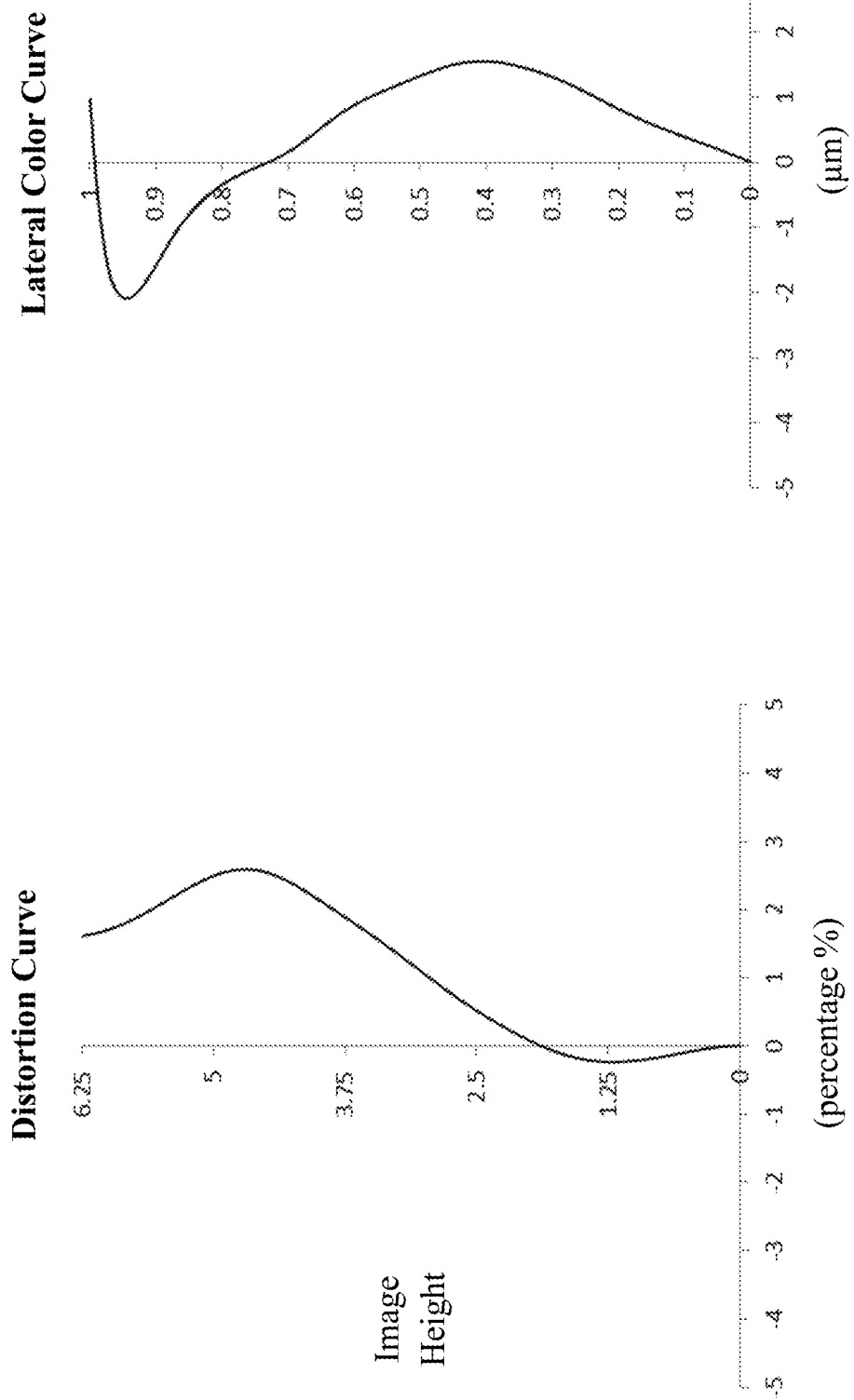

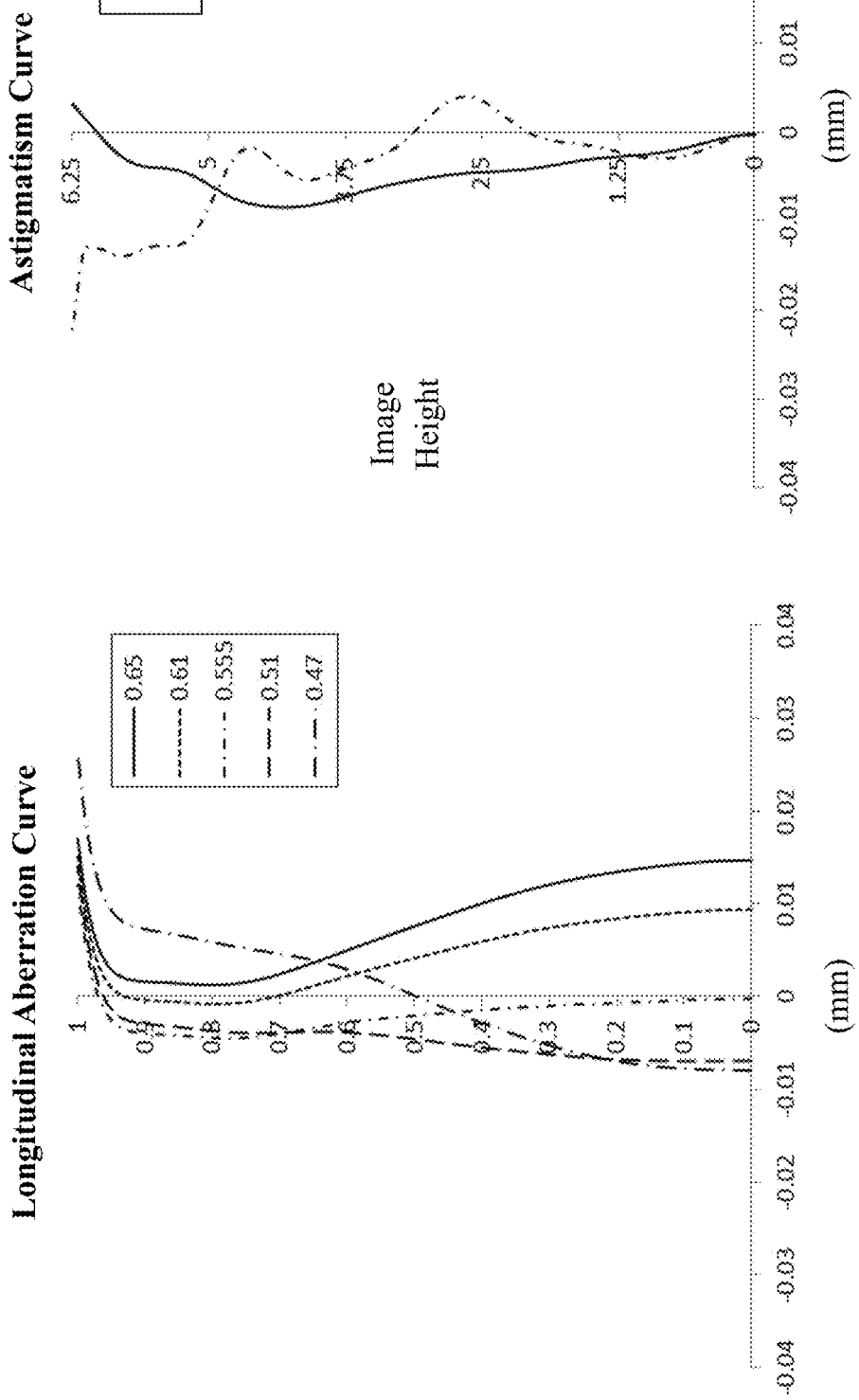

OPTICAL CAMERA SYSTEM

CROSS-REFERENCE TO RELATED APPLICATIONS

The present application claims the priority of Chinese patent application No. 202010453455.4, filed on May 26, 2020, which is hereby incorporated by reference in its entirety.

TECHNICAL FIELD

The present application relates to the field of optical elements, and specifically, to an optical camera system.

BACKGROUND

With the rapid development of science and technology, optical camera systems suitable for portable electronic products such as mobile phones are changing with each passing day, and people have higher and higher requirements for the imaging quality of optical camera systems. At the same time, as the performance of photosensitive elements (such as photosensitive coupling elements (CCD) or complementary metal oxide semiconductor elements (CMOS)) applied in the portable electronic products such as mobile phones increases and the pixel size decreases, the market has also put forward higher requirements for the corresponding optical camera systems.

SUMMARY

One aspect of the present application provides an optical camera system. The optical camera system comprises a first lens, a second lens, a third lens, a fourth lens, a fifth lens, a sixth lens, a seventh lens, an eighth lens and a ninth lens having refractive powers in order from an object side to an image side along an optical axis. The first lens has a convex object side surface; the fifth lens and the ninth lens have negative refractive powers; and a distance TTL from an object side surface of the first lens to an imaging plane of the optical camera system on the optical axis and a half ImgH of a diagonal length of an effective pixel region of the optical camera system satisfy: TTL/ImgH<1.5.

In one implementation, there is at least one aspherical lens surface from an object side surface of the first lens to an image side surface of the ninth lens.

In one implementation, an effective half aperture DT11 of an object side surface of the first lens and the half ImgH of the diagonal length of the effective pixel region of the optical camera system may satisfy: DT11/ImgH<0.5.

In one implementation, the maximum field of view FOV of the optical camera system and a total effective focal length f of the optical camera system may satisfy: tan(FOV/2)×f>5 mm.

In one implementation, an effective focal length f3 of the third lens and an effective focal length f4 of the fourth lens may satisfy: 0<(f3+f4)/(f3−f4)<0.5.

In one implementation, an effective focal length f1 of the first lens and the total effective focal length f of the optical camera system may satisfy: 0.7<f1/f≤1.

In one implementation, an effective focal length f8 of the eighth lens and an effective focal length f9 of the ninth lens may satisfy: −3<f8/f9<−2.

In one implementation, an effective focal length f5 of the fifth lens and the total effective focal length f of the optical camera system may satisfy: −4<f5/f<0.

In one implementation, a radius of curvature R13 of an object side surface of the seventh lens and a radius of curvature R14 of an image side surface of the seventh lens may satisfy: |(R13−R14)/(R13+R14)|<0.5.

In one implementation, an edge thickness ET2 of the second lens, an edge thickness ET3 of the third lens, a center thickness CT2 of the second lens on the optical axis and a center thickness CT3 of the third lens on the optical axis may satisfy: 1<(ET2+ET3)/(CT2+CT3)<1.5.

In one implementation, a center thickness CT7 of the seventh lens on the optical axis, a center thickness CT5 of the fifth lens on the optical axis, and a center thickness CT6 of the sixth lens on the optical axis may satisfy: 0.8<2×CT7/(CT5+CT6)<1.2.

In one implementation, a separation distance SAG42 from an intersection point of an image side surface of the fourth lens and the optical axis to an effective radius vertex of the image side surface of the fourth lens on the optical axis, and a separation distance SAG52 from an intersection point of an image side surface of the fifth lens and the optical axis to an effective radius vertex of the image side surface of the fifth lens on the optical axis may satisfy: 0.6<SAG42/SAG52<1.

In one implementation, a combined focal length f23 of the second lens and the third lens and a total effective focal length f of the optical camera system may satisfy: −3<f23/f<0.

In one implementation, a radius of curvature R8 of an image side surface of the fourth lens and an effective focal length f4 of the fourth lens may satisfy: −1<R8/f4<0.

In one implementation, a center thickness CT8 of the eighth lens on the optical axis, and a separation distance T89 between the eighth lens and the ninth lens on the optical axis may satisfy: 0.5<CT8/T89<1.

In one implementation, the maximum effective radius DT32 of an image side surface of the third lens and the maximum effective radius DT42 of an image side surface of the fourth lens may satisfy: 0.5<DT32/DT42<1.

In one implementation, a distance Tr7r14 from an object side surface of the fourth lens to an image side surface of the seventh lens on the optical axis, and the distance TTL from the object side surface of the first lens to the imaging plane of the optical camera system on the optical axis may satisfy: 0<Tr7r14/TTL<0.4.

In one implementation, a center thickness CTO of the sixth lens on the optical axis and a center thickness CT7 of the seventh lens on the optical axis may satisfy: 0.8<CT6/CT7<1.2.

In one implementation, the optical camera system further comprises a diaphragm provided between the object side and the fourth lens, and a distance SL from the diaphragm to the imaging plane of the optical camera system on the optical axis and the distance TTL from the object side surface of the first lens to the imaging plane of the optical camera system on the optical axis may satisfy: 0.7<SL/TTL<1.

Another aspect of the present application provides an optical camera system. The optical camera system comprises a first lens, a second lens, a third lens, a fourth lens, a fifth lens, a sixth lens, a seventh lens, an eighth lens and a ninth lens having refractive powers in order from an object side to an image side along an optical axis. The first lens has a convex object side surface; the fifth lens and the ninth lens have negative refractive powers; and an effective half aperture DT11 of an object side surface of the first lens and a half ImgH of a diagonal length of an effective pixel region of the optical camera system may satisfy: DT11/ImgH<0.5.

Another aspect of the present application provides an optical camera system. The optical camera system comprises a first lens, a second lens, a third lens, a fourth lens, a fifth lens, a sixth lens, a seventh lens, an eighth lens and a ninth lens in order from an object side to an image side along an optical axis; at least one of the first lens to the ninth lens has a refractive power; there is a separation distance between any two adjacent lenses of the first to ninth lenses; a distance TTL from an object side surface of the first lens to an imaging plane of the optical camera system on the optical axis and a half ImgH of a diagonal length of an effective pixel region of the optical camera system may satisfy: TTL/ImgH<1.5; an effective half aperture DT11 of an object side surface of the first lens and the half ImgH of the diagonal length of the effective pixel region of the optical camera system may satisfy: DT11/ImgH<0.5; and the maximum field of view FOV of the optical camera system and a total effective focal length f of the optical camera system may satisfy: tan (FOV/2)×f>5 mm.

By reasonably distributing the refractive power and optimizing the optical parameters, the present application provides an optical camera system that is suitable for portable electronic products and has a large image plane, ultra-thin thickness and good imaging quality.

BRIEF DESCRIPTION OF THE DRAWINGS

Other features, objectives, and advantages of the present application will become more apparent by reading a detailed description of non-restrictive embodiments made with reference to the following drawings.

FIGS. 2A to 2D show a longitudinal aberration curve, astigmatism curve, distortion curve and lateral color curve of the optical camera system according to Embodiment 1, respectively;

FIGS. 4A to 4D show a longitudinal aberration curve, astigmatism curve, distortion curve and lateral color curve of the optical camera system according to Embodiment 2, respectively;

FIGS. 8A to 8D show a longitudinal aberration curve, astigmatism curve, distortion curve and lateral color curve of the optical camera system according to Embodiment 4, respectively;

FIGS. 16A to 16D show a longitudinal aberration curve, astigmatism curve, distortion curve and lateral color curve of the optical camera system according to Embodiment 8, respectively;

DETAILED DESCRIPTION

Figure 1:
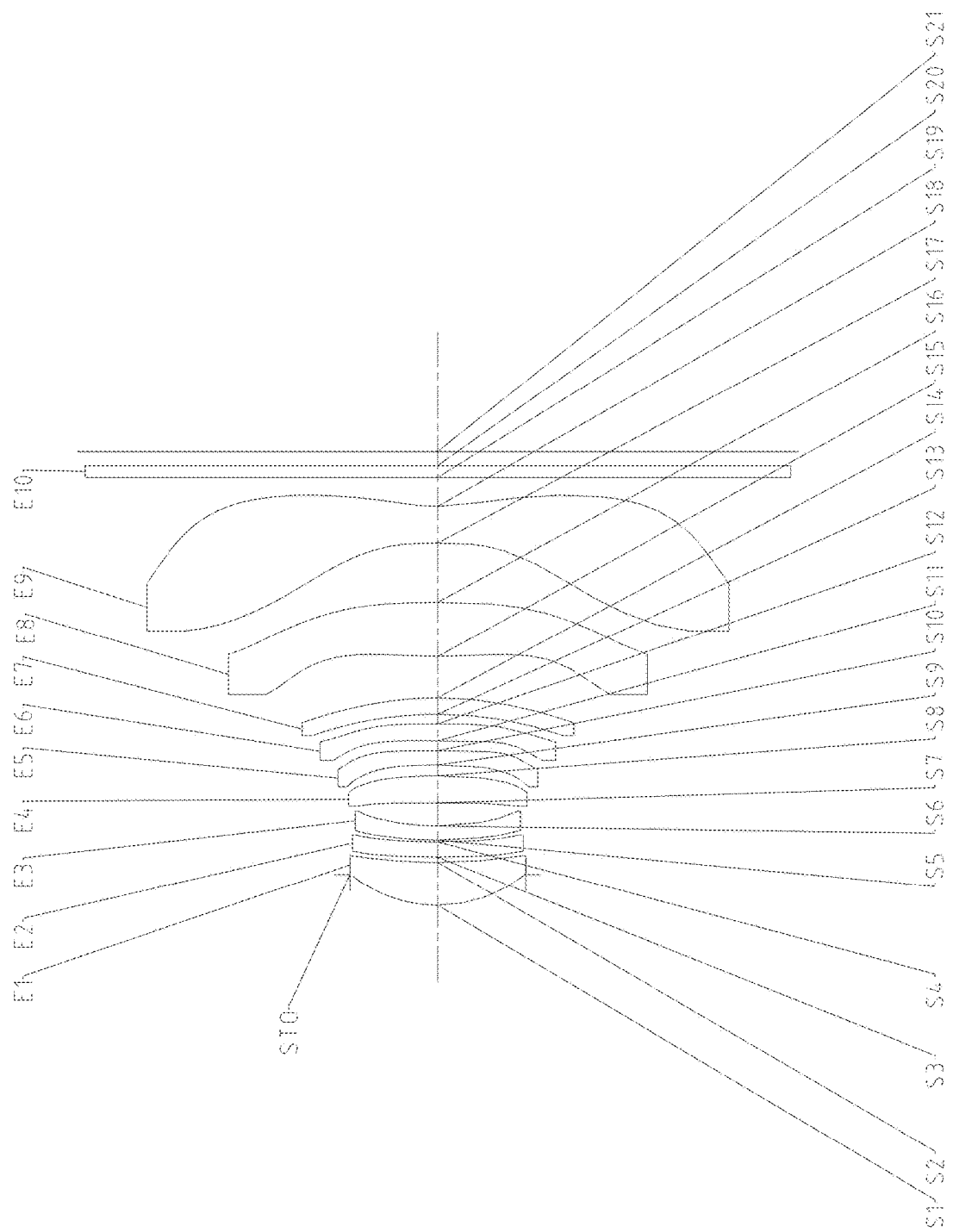
FIG. 1 shows a schematic structural diagram of an optical camera system according to Embodiment 1 of the present application.

In order to better understand the present application, various aspects of the present application will be described in more detail with reference to the drawings, it should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspheric surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to a subject (=an object to be captured) is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs, it should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

An optical camera system according to an exemplary implementation of the present application may include, for example, nine lenses having refractive powers, which are a first lens, a second lens, a third lens, a fourth lens, a fifth lens, a sixth lens, a seventh lens, an eighth lens and a ninth lens, respectively. The nine lenses are arranged in order from an object side to an image side along an optical axis. There may be a separation distance between any two adjacent lenses of the first to ninth lenses.

In an exemplary implementation, the first lens may have a positive refractive power or a negative refractive power, and an object side surface thereof may be convex; the second lens may have a positive refractive power or a negative refractive power; the third lens may have a positive refractive power or a negative refractive power; the fourth lens may have a positive refractive power or a negative refractive power; the fifth lens may have a negative refractive power; the sixth lens may have a positive refractive power or a negative refractive power; the seventh lens may have a positive refractive power or a negative refractive power; the eighth lens may have a positive refractive power or a negative refractive power; and the ninth lens may have a negative refractive power.

In an exemplary implementation, the object side surface of the first lens is configured as a convex surface, which facilitates the convergence of incident light. The fifth lens has a negative refractive power, which is helpful to reduce the overall astigmatism. The ninth lens has negative refractive power, which is helpful to correct the aberration of the off-axis edge field of view.

In an exemplary implementation, the optical camera system according to the present application may satisfy: TTL/ImgH<1.5, where TTL is a distance from the object side surface of the first lens to an imaging plane of the optical camera system on the optical axis, and ImgH is a half of a diagonal length of an effective pixel region of the optical camera system. More specifically, TTL and ImgH may further satisfy: TTL/ImgH<1.4. TTL/ImgH<1.5 is satisfied, so that the camera lens can be miniaturized, and is suitable for more application scenarios.

In an exemplary implementation, the optical camera system according to the present application may satisfy: DT11/ImgH<0.5, where DT11 is an effective half aperture of an object side surface of the first lens, and ImgH is a half of a diagonal length of an effective pixel region of the optical camera system. More specifically, DT11 and ImgH may further satisfy: DT11/ImgH<0.3. DT11/ImgH<0.5 is satisfied, so that the size of the camera lens is maintained within a reasonable range, facilitating the assembly and production of the camera lens.

In an exemplary implementation, the optical camera system according to the present application may satisfy: tan (FOV/2)×f>5 mm, where FOV is the maximum field of view of the optical camera system, and f is a total effective optical camera system focal length. More specifically, FOV and f may further satisfy: tan (FOV/2)×f>8 mm. tan (FOV/2)×f>5 mm is satisfied, so that the system can obtain a larger field of view while maintaining a certain focal length, and the system can obtain a wider viewing range.

In an exemplary implementation, the optical camera system according to the present application may satisfy: 0<(f3+f4)/(f3−f4)<0.5, where f3 is an effective focal length of the third lens, and f4 is an effective focal length of the fourth lens. More specifically, f3 and f4 may further satisfy: 0<(f3+f4)/(f3−f4)<0.2. 0<(f3+f4)/(f3−f4)<0.5 is satisfied, so that the internal field-of-view coma can be corrected, improving the imaging quality.

In an exemplary implementation, the optical camera system according to the present application may satisfy: 0.7<f1/f≤1, where f1 is the effective focal length of the first lens, and f is the total effective focal length of the optical camera system. More specifically, f1 and f may further satisfy: 0.8<f1/f≤1. 0.7<f1/f≤1 is satisfied, so that the refractive power of the first lens can be distributed reasonably, and the sensitivity is reduced, facilitating the machining and production of the lens sheets.

In an exemplary implementation, the optical camera system according to the present application may satisfy: −3<f8/f9<−2, where f8 is an effective focal length of the eighth lens, and f9 is an effective focal length of the ninth lens. More specifically, f8 and f9 may further satisfy: −2.7<f8/f9<−2.2. −3<f8/f9<−2 is satisfied, so that the field curvature of the off-axis field of view can be reduced, and the imaging quality can be improved.

In an exemplary implementation, the optical camera system according to the present application may satisfy: −4<f5/f<0, where f5 is an effective focal length of the fifth lens, and f is the total effective focal length of the optical camera system. More specifically, f5 and f may further satisfy: −3.4<f5/f<−1.7. −4<f5/f<0 is satisfied, so that the astigmatism of the intermediate field of view can be reduced and the distribution of refractive powers of the respective lens sheet can be improved.

In an exemplary implementation, the optical camera system according to the present application may satisfy: |(R13−R14)/(R13+R14)|<0.5, where R13 is a radius of curvature of an object side surface of the seventh lens, and R14 is a radius of curvature of an image side surface of the seventh lens. More specifically, R13 and R14 may further satisfy: |(R13−R14)/(R13+R14)|<0.4. |(R13−R14)/(R13+R14)|<0.5 is satisfied, so that the astigmatism of the intermediate field of view can be reduced and the distribution of refractive powers of the respective lens sheets can be improved.

In an exemplary implementation, the optical camera system according to the present application may satisfy: 1<(ET2+ET3)/(CT2+CT3)<1.5, where ET2 is an edge thickness of the second lens, ET3 is an edge thickness of the third lens, CT2 is a center thickness of the second lens on the optical axis, and CT3 is a center thickness of the third lens on the optical axis. More specifically, ET2, ET3, CT2, and CT3 may further satisfy: 1<(ET2+ET3)/(CT2+CT3)<1.3. 1<(ET2+ET3)/(CT2+CT3)<1.5 is satisfied, so that the shapes of the second lens and the third lens can be improved, facilitating the machining and production of the lens sheets.

In an exemplary implementation, the optical camera system according to the present application may satisfy: 0.8<2×CT7/(CT5+CT8)<1.2, where CT7 is a center thickness of the seventh lens on the optical axis, CT5 is a center thickness of the fifth lens on the optical axis, and CT8 is a center thickness of the sixth lens on the optical axis. More specifically, CT7, CT5, and CT6 may further satisfy: 0.9<2×CT7/(CT5+CT6)<1.1. 0.8<2×CT7/(CT5+CT6)<1.2 is satisfied, so that the field curvature of the internal field of view can be corrected, improving the imaging quality, and facilitating the machining and molding of the lens sheets.

In an exemplary implementation, the optical camera system according to the present application may satisfy: 0.6<SAG42/SAG52<1, where SAG42 is a separation distance from an intersection point of an image side surface of the fourth lens and the optical axis to an effective radius vertex of the image side surface of the fourth lens on the optical axis, and SAG52 is a separation distance from an intersection point of an image side surface of the fifth lens and the optical axis to an effective radius vertex of the image side surface of the fifth lens on the optical axis. More specifically, SAG42 and SAG52 may further satisfy: 0.7<SAG42/SAG52<0.9. 0.6<SAG42/SAG52<1 is satisfied, so that the field curvature of the internal field of view can be corrected, improving the imaging quality, and facilitating the machining and molding of the lens sheets.

In an exemplary implementation, the optical camera system according to the present application may satisfy: −3<f23/f<0, where f23 is a combined focal length of the second lens and the third lens, and f is the total effective focal length of the optical camera system. More specifically, f23 and f may further satisfy: −3<f23/f<−2.7. −3<f23/f<0 is satisfied, which is helpful to correct the spherical aberration and longitudinal aberration, and improve the imaging quality of the central field of view.

In an exemplary implementation, the optical camera system according to the present application may satisfy: −1<R8/f4<0, where R8 is a radius of curvature of an image side surface of the fourth lens, and f4 is an effective focal length of the fourth lens. More specifically, R8 and f4 may further satisfy: −0.7<R8/f4<−0.4. −1<R8/f4<0 is satisfied, which is helpful to control the shape of the fourth lens and reduce the on-axis and off-axis chromatic aberration.

In an exemplary implementation, the optical camera system according to the present application may satisfy: 0.5<CT8/T89<1, where CT8 is a center thickness of the eighth lens on the optical axis, and T89 is a separation distance between the eighth lens and the ninth lens on the optical axis. 0.5<CT8/T89<1 is satisfied, which facilitates the correction of higher-order aberrations and facilitates the assembly of the lens sheets.

In an exemplary implementation, the optical camera system according to the present application may satisfy: 0.5<DT32/DT42<1, where DT32 is the maximum effective radius of an image side surface of the third lens, and DT42 is the maximum effective radius of an image side surface of the fourth lens. More specifically, DT32 and DT42 may further satisfy: 0.8<DT32/DT42<1. 0.5<DT32/DT42<1 is satisfied, which is helpful to improve the distribution of refractive powers of the lens sheets and reduce the sensitivity of the lens sheets, facilitating the assembly of the lens sheets.

In an exemplary implementation, the optical camera system according to the present application may satisfy: 0<Tr7r14/TTL<0.4, where Tr7r14 is a distance from a object side surface of the fourth lens to an image side surface of the seventh lens on the optical axis, and TTL is the distance from the object side surface of the first lens to the imaging plane f the optical camera system on the optical axis. More specifically, Tr7r14 and TTL may further satisfy: 0.2<Tr7r14/TTL<0.3. 0<Tr7r14/TTL<0.4 is satisfied, which is helpful to have a compact structure between the lens sheets, facilitating the miniaturization of the camera lens.

In an exemplary implementation, the optical camera system according to the present application may satisfy: 0.8<CT6/CT7<1.2, where CT6 is a center thickness of the sixth lens on the optical axis, and CT7 is a center thickness of the seventh lens on the optical axis. More specifically, CT6 and CT7 may further satisfy: 0.9<CT6/CT7<1.2. 0.8<CT6/CT7<1.2 is satisfied, which is helpful to make light in the central field of view have a smaller incident angle when reaching the sixth lens and the seventh lens, and reduce the MTF tolerance sensitivity of the central field of view.

In an exemplary implementation, the optical camera system according to the present application may satisfy: 0.7<SL/TTL<1, where SL is a distance from the diaphragm to the imaging plane of the optical camera system on the optical axis, and TTL is the distance from the object side surface of the first lens to the imaging plane f the optical camera system on the optical axis. 0.7<SL/TTL<1 is satisfied, which is helpful to make the system achieve the ultra-thin characteristics of the system, and at the same time the off-axis relative illumination can be controlled within a reasonable range.

In an exemplary implementation, the optical camera system according to the present application further includes a diaphragm provided between the object side and the fourth lens, for example, a diaphragm provided between the object side and the first lens or between the third lens and the fourth lens. Optionally, the optical camera system described above may further include a filter for correcting color deviation and/or a protective glass for protecting a photosensitive element located on the imaging plane. The present application proposes an optical camera system having the characteristics of miniaturization, large image plane, ultra-thin thickness, high imaging quality and so on. The optical camera system according to the above-mentioned implementations of the present application may adopt multiple lens sheets, for example, nine sheets described above. The refractive power, surface shape and center thickness of each lens, the on-axis distances between the respective lenses, and the like, are reasonably distributed, which can effectively converge the incident light, reduce the total length of the imaging lens and improve the machinability of the imaging lens, so that the optical camera system is more conducive to production and machining.

In the implementations of the present application, at least one of lens surfaces of the respective lenses is an aspheric lens surface, that is, at least one lens surface of the object side surface of the first lens to the image side surface of the ninth lens is an aspheric lens surface. An aspheric lens is characterized in that the curvature changes continuously from the center of the lens to the periphery of the lens. Unlike a spherical lens having a constant curvature from the center of the lens to the periphery of the lens, the aspheric lens has better radius-of-curvature properties, and has the advantages of improving distortion aberration and improving astigmatism aberration. After the aspheric lens is adopted, the aberrations that occur during imaging can be eliminated as much as possible, thereby improving the imaging quality. Optionally, at least one of an object side surface and an image side surface of each of the first lens, the second lens, the third lens, the fourth lens, the fifth lens, the sixth lens, the seventh lens, the eighth lens and the ninth lens is an aspheric lens surface. Optionally, both an object side surface and an image side surface of each of the first lens, the second lens, the third lens, the fourth lens, the fifth lens, the sixth lens, the seventh lens, the eighth lens and the ninth lens are aspheric lens surfaces.

However, it should be understood by those skilled in the art that the number of lenses constituting the optical camera system can be changed without departing from the technical solution claimed in the present application, to obtain respective results and advantages described in the description. For example, although eight lenses have been described in the implementations as an example, the optical camera system is not limited to including the nine lenses, if necessary, the optical camera system may also include other numbers of lenses.

Specific embodiments of the optical camera system applicable to the above-mentioned implementations will be further described below with reference to the drawings.

Embodiment 1

An optical camera system according to Embodiment 1 of the present application will be described below with reference to FIGS. 1 to 2D. FIG. 1 shows a schematic structural diagram of the optical camera system according to Embodiment 1 of the present application.

As shown in FIG. 1, the optical camera system includes a diaphragm STO, a first lens E1, a second lens E2, a third lens E3, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a negative refractive power, and has a convex object side surface S5 and a concave image side surface S8. The fourth lens E4 has a positive refractive power, and has a convex object side surface S7 and a convex image side surface S8. The fifth lens E5 has a negative refractive power, and has a concave object side surface S9 and a concave image side surface S10. The sixth lens E6 has a positive refractive power, and has a convex object side surface S11 and a concave image side surface S12. The seventh lens E7 has a positive refractive power, and has a concave object side surface S13 and a convex image side surface S14. The eighth lens E8 has a positive refractive power, and has a convex object side surface S15 and a convex image side surface S18. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

Table 1 shows a table of basic parameters of the optical camera system of Embodiment 1, wherein the units of the radius of curvature, thickness/distance, and focal length are all millimeters (mm).

TABLE 1

| Surface No. | Surface type | Radius of curvature | Thickness/ distance | Refractive index | Abbe number | Focal length | Conic coefficient |
|---|---|---|---|---|---|---|---|
| OBJ | Spherical | Infinity | Infinity | | | | |
| STO | Spherical | Infinity | −0.5433 | | | | |
| S1 | Aspherical | 2.5362 | 0.7574 | 1.55 | 56.1 | 6.21 | −1.2603 |
| S2 | Aspherical | 9.0106 | 0.0934 | | | | −2.8363 |
| S3 | Aspherical | 17.6031 | 0.2700 | 1.67 | 20.4 | −145.01 | 98.0801 |
| S4 | Aspherical | 14.7995 | 0.0300 | | | | 89.8584 |
| S5 | Aspherical | 6.6585 | 0.2500 | 1.68 | 19.2 | −21.72 | 6.6675 |
| S6 | Aspherical | 4.5146 | 0.4050 | | | | −0.9424 |
| S7 | Aspherical | 149.1054 | 0.4761 | 1.55 | 56.1 | 19.11 | 99.0000 |
| S8 | Aspherical | −11.2076 | 0.1924 | | | | 5.5798 |
| S9 | Aspherical | −12.8697 | 0.2500 | 1.67 | 20.4 | −17.68 | −3.8178 |
| S10 | Aspherical | 140.8744 | 0.1750 | | | | 99.0000 |
| S11 | Aspherical | 28.1567 | 0.2972 | 1.64 | 23.5 | 46.02 | −99.0000 |
| S12 | Aspherical | 550.8610 | 0.1700 | | | | 99.0000 |
| S13 | Aspherical | −7.1070 | 0.2900 | 1.64 | 23.5 | 101.71 | 1.2453 |
| S14 | Aspherical | −6.5145 | 0.7305 | | | | −1.1755 |
| S15 | Aspherical | 9.4989 | 0.9550 | 1.55 | 56.1 | 12.03 | 5.1362 |
| S16 | Aspherical | −20.5357 | 1.0465 | | | | 10.8712 |
| S17 | Aspherical | −14.7096 | 0.6427 | 1.54 | 55.7 | −4.52 | 5.4364 |
| S18 | Aspherical | 2.9514 | 0.5095 | | | | −14.5282 |
| S19 | Spherical | Infinity | 0.2100 | 1.52 | 64.2 | | |
| S20 | Spherical | Infinity | 0.2492 | | | | |
| S21 | Spherical | Infinity | | | | | |

In the present example, a total effective focal length f of the optical camera system is 6.92 mm, a total length TTL of the optical camera system (i.e., a distance from the object side surface S1 of the first lens E1 to the imaging plane S21 of the optical camera system on the optical axis) is 8.00 mm, a half ImgH of a diagonal length of an effective pixel region on the imaging plane S21 of the optical camera system is 8.45 mm, and the maximum field of view FOV of the optical camera system is 85.32°.

In Embodiment 1, both the object side surface and image side surface of any one of the first lens E1 to the ninth lens E9 are aspherical, and the surface shape x of each aspherical lens can be defined by using but not limited to the following aspherical formula:

$$x = \frac{ch^2}{1 + \sqrt{1 - (k+1)c^2h^2}} + \sum A_i h^i \quad (1)$$

where x is a distance vector height from a vertex of the aspheric surface when the aspheric surface is at a height of h along the optical axis direction; c is paraxial curvature of the aspheric surface, c=1/R (that is, the paraxial curvature c is the reciprocal of the radius of curvature R in Table 1 above); k is a conic coefficient; and Ai is a correction coefficient of an i-th order of the aspheric surface. Higher-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$ and $A_{28}$ of each aspheric lens surface of S1 to S18 that are applicable in Embodiment 1 are given in Tables 2-1 and 2-2 below.

TABLE 2-1

| Surface No. | A4 | A6 | A8 | A10 | A12 | A14 | A16 |
|---|---|---|---|---|---|---|---|
| S1 | 1.0482E−02 | −1.4307E−03 | 4.7690E−03 | −6.1137E−03 | 4.7781E−03 | −2.2622E−03 | 6.1694E−04 |
| S2 | −8.0376E−03 | 4.0553E−03 | −2.5942E−03 | 6.3017E−03 | −8.0752E−03 | 5.4873E−03 | −2.0555E−03 |
| S3 | 8.2461E−04 | −9.6188E−04 | 8.2011E−03 | −1.1924E−02 | 1.0248E−02 | −6.0899E−03 | 2.5055E−03 |
| S4 | 2.4332E−02 | −4.2456E−02 | 5.4950E−02 | −4.8634E−02 | 2.1501E−02 | 3.8664E−04 | −4.6235E−03 |
| S5 | 4.9119E−03 | −4.1928E−02 | 6.7619E−02 | −7.1800E−02 | 5.0221E−02 | −2.1055E−02 | 4.8314E−03 |
| S6 | −7.1364E−03 | 3.8823E−03 | −1.7476E−03 | 9.1977E−03 | −1.3264E−02 | 1.1043E−02 | −5.2212E−03 |
| S7 | −9.3266E−03 | −6.4901E−03 | 1.0545E−02 | −1.7652E−02 | 1.8938E−02 | −1.3434E−02 | 6.0734E−03 |
| S8 | −9.7507E−03 | −2.1243E−02 | 2.8115E−02 | −2.9113E−02 | 2.2219E−02 | −1.2518E−02 | 4.6916E−03 |
| S9 | −7.8735E−03 | −6.0132E−02 | 7.6550E−02 | −6.9404E−02 | 4.6565E−02 | −2.2738E−02 | 7.3537E−03 |
| S10 | −7.5830E−03 | −4.4151E−02 | 4.7400E−02 | −3.5113E−02 | 1.8805E−02 | −7.6154E−03 | 2.1392E−03 |
| S11 | −4.1271E−02 | 2.0148E−03 | 1.1926E−02 | −2.0971E−02 | 1.9311E−02 | −1.0708E−02 | 3.4950E−03 |
| S12 | −4.5742E−02 | 1.4930E−02 | −5.1197E−03 | −2.5020E−03 | 5.3270E−03 | −3.4538E−03 | 1.1892E−03 |
| S13 | −2.3419E−15 | 8.8383E−15 | −1.2471E−14 | 8.8622E−15 | −3.4915E−15 | 7.7134E−16 | −8.8764E−17 |
| S14 | −3.7205E−03 | 5.1930E−04 | 2.0700E−03 | −1.2135E−03 | 2.2272E−04 | 1.7475E−05 | −1.2723E−05 |
| S15 | −2.2169E−02 | 1.7585E−03 | −5.0878E−04 | 1.7381E−04 | −2.8379E−05 | −1.3501E−06 | 1.2849E−06 |
| S16 | −1.0083E−02 | 2.3374E−03 | −1.1220E−03 | 3.4364E−04 | −5.7953E−05 | 5.6256E−06 | −3.1417E−07 |
| S17 | −7.7965E−02 | 3.5835E−02 | −1.1490E−02 | 2.5691E−03 | −3.9904E−04 | 4.4029E−05 | −3.5213E−06 |
| S18 | −3.5184E−02 | 1.4257E−02 | −3.8685E−03 | 7.3831E−04 | −1.0252E−04 | 1.0506E−05 | −7.9700E−07 |

TABLE 2-2

| Surface No. | A18 | A20 | A22 | A24 | A26 | A28 |
|---|---|---|---|---|---|---|
| S1 | −8.5013E−05 | 3.8556E−06 | 0.0000E+00 | 0.0000E+00 | 0.0000E+00 | 0.0000E+00 |
| S2 | 3.9574E−04 | −3.0440E−05 | 0.0000E+00 | 0.0000E+00 | 0.0000E+00 | 0.0000E+00 |
| S3 | −6.2861E−04 | 7.0024E−05 | 0.0000E+00 | 0.0000E+00 | 0.0000E+00 | 0.0000E+00 |
| S4 | 1.8007E−03 | −2.2941E−04 | 0.0000E+00 | 0.0000E+00 | 0.0000E+00 | 0.0000E+00 |
| S5 | −5.2285E−04 | 1.3692E−05 | 0.0000E+00 | 0.0000E+00 | 0.0000E+00 | 0.0000E+00 |
| S6 | 1.3136E−03 | −1.3634E−04 | 0.0000E+00 | 0.0000E+00 | 0.0000E+00 | 0.0000E+00 |
| S7 | −1.5454E−03 | 1.6870E−04 | 0.0000E+00 | 0.0000E+00 | 0.0000E+00 | 0.0000E+00 |
| S8 | −9.8875E−04 | 8.4635E−05 | 0.0000E+00 | 0.0000E+00 | 0.0000E+00 | 0.0000E+00 |
| S9 | −1.3530E−03 | 1.0312E−04 | 0.0000E+00 | 0.0000E+00 | 0.0000E+00 | 0.0000E+00 |
| S10 | −3.5132E−04 | 2.4913E−05 | 0.0000E+00 | 0.0000E+00 | 0.0000E+00 | 0.0000E+00 |
| S11 | −6.3131E−04 | 5.5075E−05 | −1.5566E−06 | 0.0000E+00 | 0.0000E+00 | 0.0000E+00 |
| S12 | −2.3057E−04 | 2.3680E−05 | −1.0015E−06 | 0.0000E+00 | 0.0000E+00 | 0.0000E+00 |

TABLE 2-2-continued

| Surface No. | A18 | A20 | A22 | A24 | A26 | A28 |
|---|---|---|---|---|---|---|
| S13 | 3.9852E−18 | 2.4274E−20 | 0.0000E+00 | 0.0000E+00 | 0.0000E+00 | 0.0000E+00 |
| S14 | 1.7827E−06 | −8.4207E−08 | 0.0000E+00 | 0.0000E+00 | 0.0000E+00 | 0.0000E+00 |
| S15 | −2.2758E−07 | 2.1269E−08 | −1.0853E−09 | 2.3601E−11 | 0.0000E+00 | 0.0000E+00 |
| S16 | 9.3826E−09 | −1.1598E−10 | 0.0000E+00 | 0.0000E+00 | 0.0000E+00 | 0.0000E+00 |
| S17 | 2.0598E−07 | −8.7626E−09 | 2.6461E−10 | −5.3810E−12 | 6.6063E−14 | −3.6953E−16 |
| S18 | 4.4511E−08 | −1.8022E−09 | 5.1380E−11 | −9.7707E−13 | 1.1123E−14 | −5.7348E−17 |

Figure 2D:
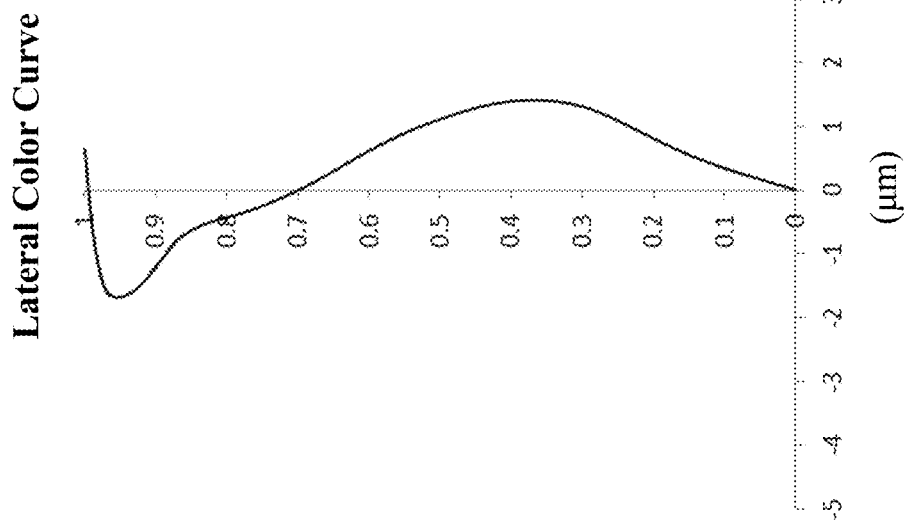
Figure 2C:
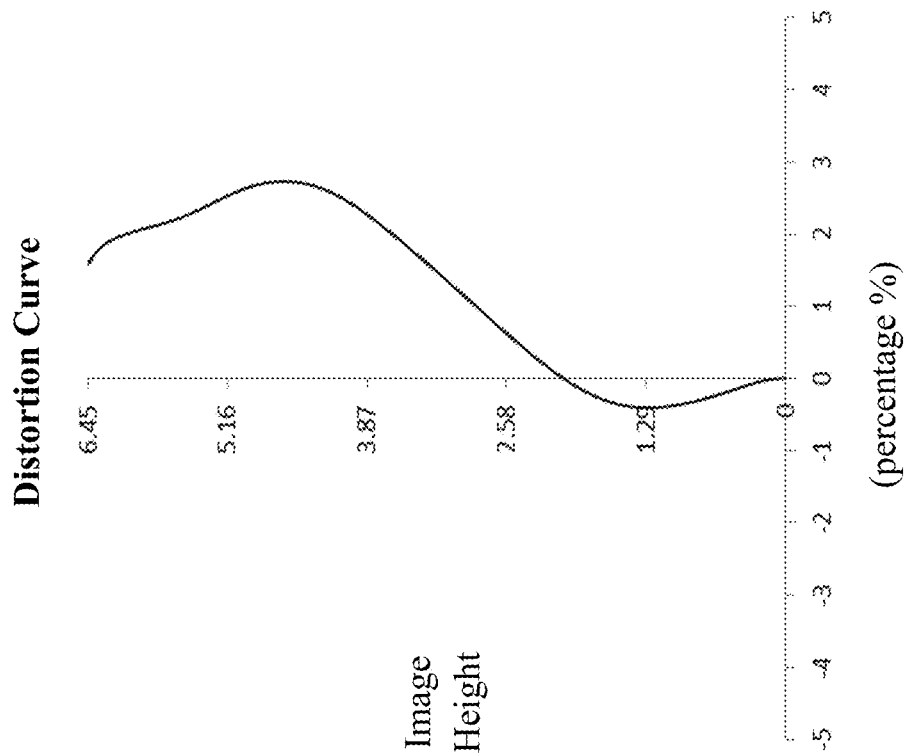

FIG. 2A shows a longitudinal aberration curve of the optical camera system according to Embodiment 1, which represents the deviation of the converged focal point after light of different wavelengths passes through the camera lens. FIG. 2B shows an astigmatism curve of the optical camera system according to Embodiment 1, which represents the curvature of the tangential image plane and the curvature of the sagittal image plane. FIG. 2C shows a distortion curve of the optical camera system according to Embodiment 1, which represents distortion magnitude values corresponding to different image heights. FIG. 2D shows a lateral color curve of the optical camera system according to Embodiment 1, which represents the deviation of different image heights on the imaging plane after light passes through the camera lens. According to FIGS. 2A to 2D, it can be seen that the optical camera system given in Embodiment 1 can achieve good imaging quality.

Embodiment 2

Figure 3:
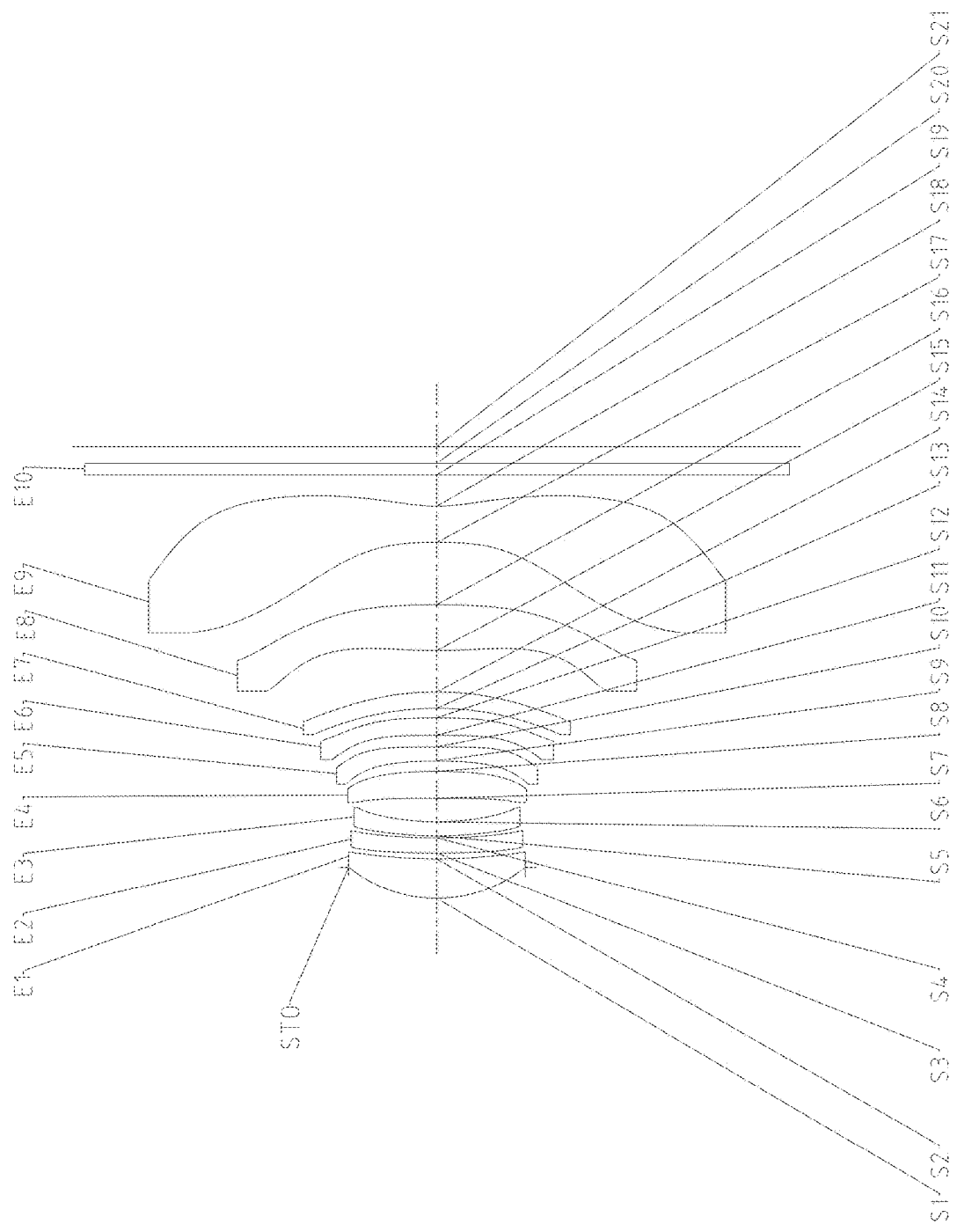
FIG. 3 shows a schematic structural diagram of an optical camera system according to Embodiment 2 of the present application.

An optical camera system according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the optical camera system according to Embodiment 2 of the present application.

As shown in FIG. 3, the optical camera system includes a diaphragm STO, a first lens E1, a second lens E2, a third lens E3, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a negative refractive power, and has a convex object side surface S5 and a concave image side surface S6. The fourth lens E4 has a positive refractive power, and has a convex object side surface S7 and a convex image side surface S8. The fifth lens E5 has a negative refractive power, and has a concave object side surface S9 and a convex image side surface S10. The sixth lens E6 has a positive refractive power, and has a concave object side surface S11 and a convex image side surface S12. The seventh lens E7 has a positive refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 6.92 mm, a total length TTL of the optical camera system is 8.00 mm, a half ImgH of a diagonal length of an effective pixel region on the imaging plane S21 of the optical camera system is 6.25 mm, and the maximum field of view FOV of the optical camera system is 83.75°.

Table 3 shows a table of basic parameters of the optical camera system of Embodiment 2, wherein the units of the radius of curvature, thickness/distance, and focal length are all millimeters (mm). Tables 4-1 and 4-2 show higher-order coefficients of each of aspheric lens surfaces that are applicable in Embodiment 2, wherein the surface shape of each aspheric surface can be defined by formula (1) given in Embodiment 1 described above.

TABLE 3

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.5523 | | | | |
| S1 | Aspherical | 2.5139 | 0.7043 | 1.55 | 56.1 | 6.20 | −1.2423 |
| S2 | Aspherical | 8.8141 | 0.1037 | | | | −4.0105 |
| S3 | Aspherical | 17.9090 | 0.2700 | 1.67 | 20.4 | −134.36 | 98.4939 |
| S4 | Aspherical | 14.8314 | 0.0315 | | | | 89.7376 |
| S5 | Aspherical | 6.6301 | 0.2500 | 1.68 | 19.2 | −22.35 | 6.5734 |
| S6 | Aspherical | 4.5410 | 0.4153 | | | | −1.0071 |
| S7 | Aspherical | 731.1044 | 0.4769 | 1.55 | 56.1 | 17.69 | 95.7783 |
| S8 | Aspherical | −9.7824 | 0.1817 | | | | 7.9975 |
| S9 | Aspherical | −10.0696 | 0.2500 | 1.67 | 20.4 | −17.30 | 0.0335 |
| S10 | Aspherical | −80.9645 | 0.2059 | | | | 99.0000 |
| S11 | Aspherical | −68.3564 | 0.3077 | 1.64 | 23.5 | 53.76 | 90.7912 |
| S12 | Aspherical | −23.0092 | 0.1700 | | | | −0.4102 |
| S13 | Aspherical | −5.4352 | 0.2900 | 1.64 | 23.5 | 118.73 | 1.0921 |

TABLE 3-continued

| Surface No. | Surface type | Radius of curvature | Thickness/ distance | Material Refractive index | Abbe number | Focal length | Conic coefficient |
|---|---|---|---|---|---|---|---|
| S14 | Aspherical | −5.1802 | 0.7305 | | | | −1.1444 |
| S15 | Aspherical | 9.5783 | 0.8209 | 1.55 | 56.1 | 10.95 | 4.1077 |
| S16 | Aspherical | −15.4149 | 1.1009 | | | | 4.4337 |
| S17 | Aspherical | −14.0386 | 0.6400 | 1.54 | 55.7 | −4.47 | 5.4212 |
| S18 | Aspherical | 2.9426 | 0.5505 | | | | −14.9479 |
| S19 | Spherical | Infinity | 0.2100 | 1.52 | 64.2 | | |
| S20 | Spherical | Infinity | 0.2902 | | | | |
| S21 | Spherical | Infinity | | | | | |

TABLE 4-1

| Surface No. | A4 | A6 | A8 | A10 | A12 | A14 | A16 |
|---|---|---|---|---|---|---|---|
| S1 | 1.0624E−02 | −1.3141E−04 | 1.9482E−03 | −2.3640E−03 | 1.7736E−03 | −7.6950E−04 | 1.6674E−04 |
| S2 | −7.9467E−03 | 2.3219E−03 | 2.6860E−05 | 3.0960E−03 | −5.1107E−03 | 3.7743E−03 | −1.4875E−03 |
| S3 | 1.3179E−04 | −9.2153E−04 | 7.0326E−03 | −8.2599E−03 | 5.2101E−03 | −2.0320E−03 | 5.6521E−04 |
| S4 | 1.9553E−02 | −2.5870E−02 | 2.7704E−02 | −1.9199E−02 | −1.0116E−03 | 1.2507E−02 | −8.9953E−03 |
| S5 | −1.6252E−03 | −2.0803E−02 | 3.1665E−02 | −3.0352E−02 | 1.5986E−02 | −1.3067E−03 | −2.5453E−03 |
| S6 | −9.5879E−03 | 7.4694E−03 | −3.7190E−03 | 7.2097E−03 | −8.5517E−03 | 7.0360E−03 | −3.3491E−03 |
| S7 | −1.1642E−02 | −7.4484E−03 | 1.4455E−02 | −2.4185E−02 | 2.5050E−02 | −1.6945E−02 | 7.2916E−03 |
| S8 | −7.8752E−03 | −3.4306E−02 | 5.6322E−02 | −6.3822E−02 | 4.8394E−02 | −2.4927E−02 | 8.3192E−03 |
| S9 | −2.7255E−03 | −8.2695E−02 | 1.1561E−01 | −1.0569E−01 | 6.5143E−02 | −2.7585E−02 | 7.7603E−03 |
| S10 | −1.5454E−03 | −5.8260E−02 | 6.2831E−02 | −4.1730E−02 | 1.7011E−02 | −4.5059E−03 | 8.1687E−04 |
| S11 | −4.6760E−02 | 2.8021E−02 | −4.0656E−02 | 3.8372E−02 | −2.1220E−02 | 6.4319E−03 | −9.4003E−04 |
| S12 | −5.8997E−02 | 4.7478E−02 | −4.9789E−02 | 3.6165E−02 | −1.6183E−02 | 4.2964E−03 | −6.0785E−04 |
| S13 | −3.0981E−15 | 1.3300E−14 | −2.4475E−14 | 2.4245E−14 | −1.4001E−14 | 4.8459E−15 | −9.3915E−16 |
| S14 | 5.0399E−03 | −1.3195E−02 | 1.3354E−02 | −7.4484E−03 | 2.5077E−03 | −5.1681E−04 | 6.3482E−05 |
| S15 | −1.6327E−02 | −3.5408E−03 | 2.1761E−03 | −8.0961E−04 | 2.6283E−04 | −7.1022E−05 | 1.3757E−05 |
| S16 | −7.4002E−03 | −1.4651E−04 | −4.8281E−04 | 3.1177E−04 | −7.3444E−05 | 9.0056E−06 | −6.1366E−07 |
| S17 | −8.0779E−02 | 3.5931E−02 | −1.1763E−02 | 2.8090E−03 | −4.7489E−04 | 5.7264E−05 | −4.9860E−06 |
| S18 | −3.3100E−02 | 1.2014E−02 | −2.9785E−03 | 5.2406E−04 | −6.7599E−05 | 6.5019E−06 | −4.6943E−07 |

TABLE 4-2

| Surface No. | A18 | A20 | A22 | A24 | A26 | A28 |
|---|---|---|---|---|---|---|
| S1 | −8.5066E−06 | −1.9840E−06 | 0.0000E+00 | 0.0000E+00 | 0.0000E+00 | 0.0000E+00 |
| S2 | 2.9728E−04 | −2.3545E−05 | 0.0000E+00 | 0.0000E+00 | 0.0000E+00 | 0.0000E+00 |
| S3 | −1.2831E−04 | 1.7294E−05 | 0.0000E+00 | 0.0000E+00 | 0.0000E+00 | 0.0000E+00 |
| S4 | 2.7303E−03 | −3.1444E−04 | 0.0000E+00 | 0.0000E+00 | 0.0000E+00 | 0.0000E+00 |
| S5 | 1.0857E−03 | −1.3631E−04 | 0.0000E+00 | 0.0000E+00 | 0.0000E+00 | 0.0000E+00 |
| S6 | 8.4009E−04 | −3.5351E−05 | 0.0000E+00 | 0.0000E+00 | 0.0000E+00 | 0.0000E+00 |
| S7 | −1.7775E−03 | 1.8710E−04 | 0.0000E+00 | 0.0000E+00 | 0.0000E+00 | 0.0000E+00 |
| S8 | −1.5880E−03 | 1.2730E−04 | 0.0000E+00 | 0.0000E+00 | 0.0000E+00 | 0.0000E+00 |
| S9 | −1.2905E−03 | 9.2660E−05 | 0.0000E+00 | 0.0000E+00 | 0.0000E+00 | 0.0000E+00 |
| S10 | −9.9029E−05 | 6.3551E−06 | 0.0000E+00 | 0.0000E+00 | 0.0000E+00 | 0.0000E+00 |
| S11 | 3.1880E−05 | 5.7921E−06 | −4.1992E−07 | 0.0000E+00 | 0.0000E+00 | 0.0000E+00 |
| S12 | 2.8197E−05 | 2.6372E−06 | −2.6379E−07 | 0.0000E+00 | 0.0000E+00 | 0.0000E+00 |
| S13 | 1.0972E−16 | −5.0978E−18 | 0.0000E+00 | 0.0000E+00 | 0.0000E+00 | 0.0000E+00 |
| S14 | −4.2561E−06 | 1.1965E−07 | 0.0000E+00 | 0.0000E+00 | 0.0000E+00 | 0.0000E+00 |
| S15 | −1.7687E−06 | 1.4273E−07 | −6.5176E−09 | 1.2785E−10 | 0.0000E+00 | 0.0000E+00 |
| S16 | 2.2122E−08 | −3.3044E−10 | 0.0000E+00 | 0.0000E+00 | 0.0000E+00 | 0.0000E+00 |
| S17 | 3.1491E−07 | −1.4314E−08 | 4.5686E−10 | −9.7204E−12 | 1.2380E−13 | −7.1375E−16 |
| S18 | 2.5346E−08 | −1.0032E−09 | 2.8673E−11 | −5.5155E−13 | 6.4296E−15 | −3.4299E−17 |

Figure 4A:
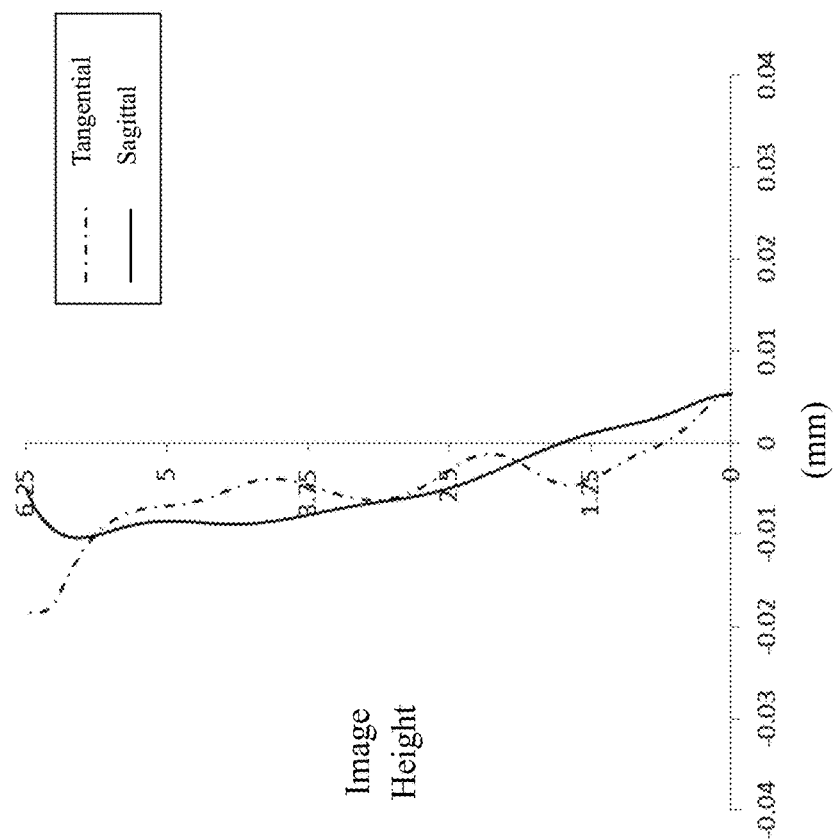
Figure 4B:
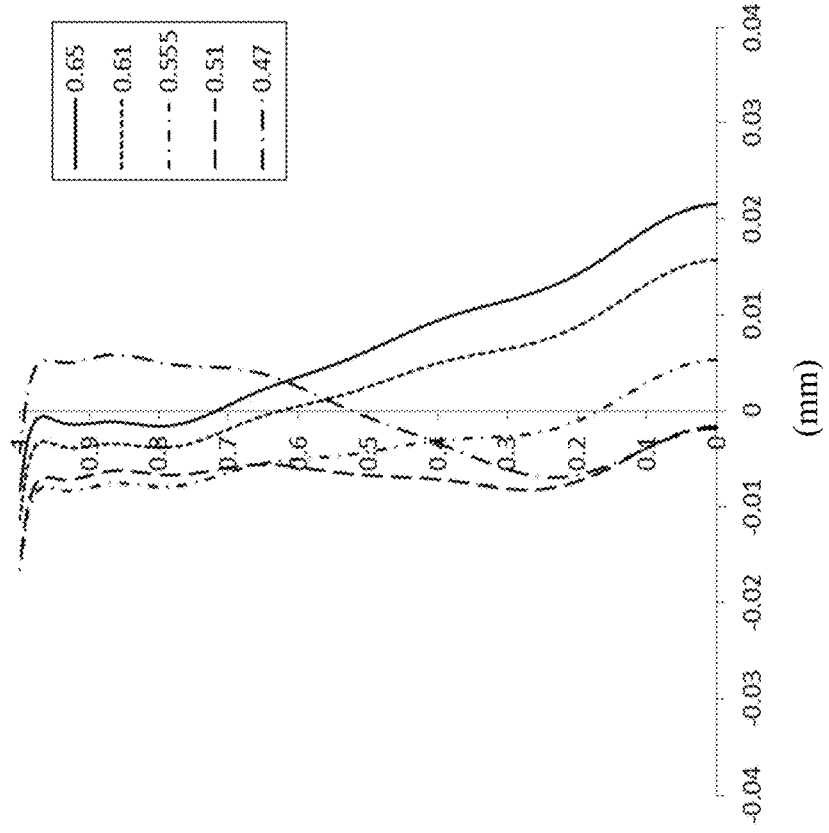

FIG. 4A shows a longitudinal aberration curve of the optical camera system according to Embodiment 2, which represents the deviation of the converged focal point after light of different wavelengths passes through the camera lens. FIG. 4B shows an astigmatism curve of the optical camera system according to Embodiment 2, which represents the curvature of the tangential image plane and the curvature of the sagittal image plane. FIG. 4C shows a distortion curve of the optical camera system according to Embodiment 2, which represents distortion magnitude values corresponding to different image heights. FIG. 4D shows a lateral color curve of the optical camera system according to Embodiment 2, which represents the deviation of different image heights on the imaging plane after light passes through the camera lens. According to FIGS. 4A to 4D, it can be seen that the optical camera system given in Embodiment 2 can achieve good imaging quality.

Embodiment 3

Figure 5:
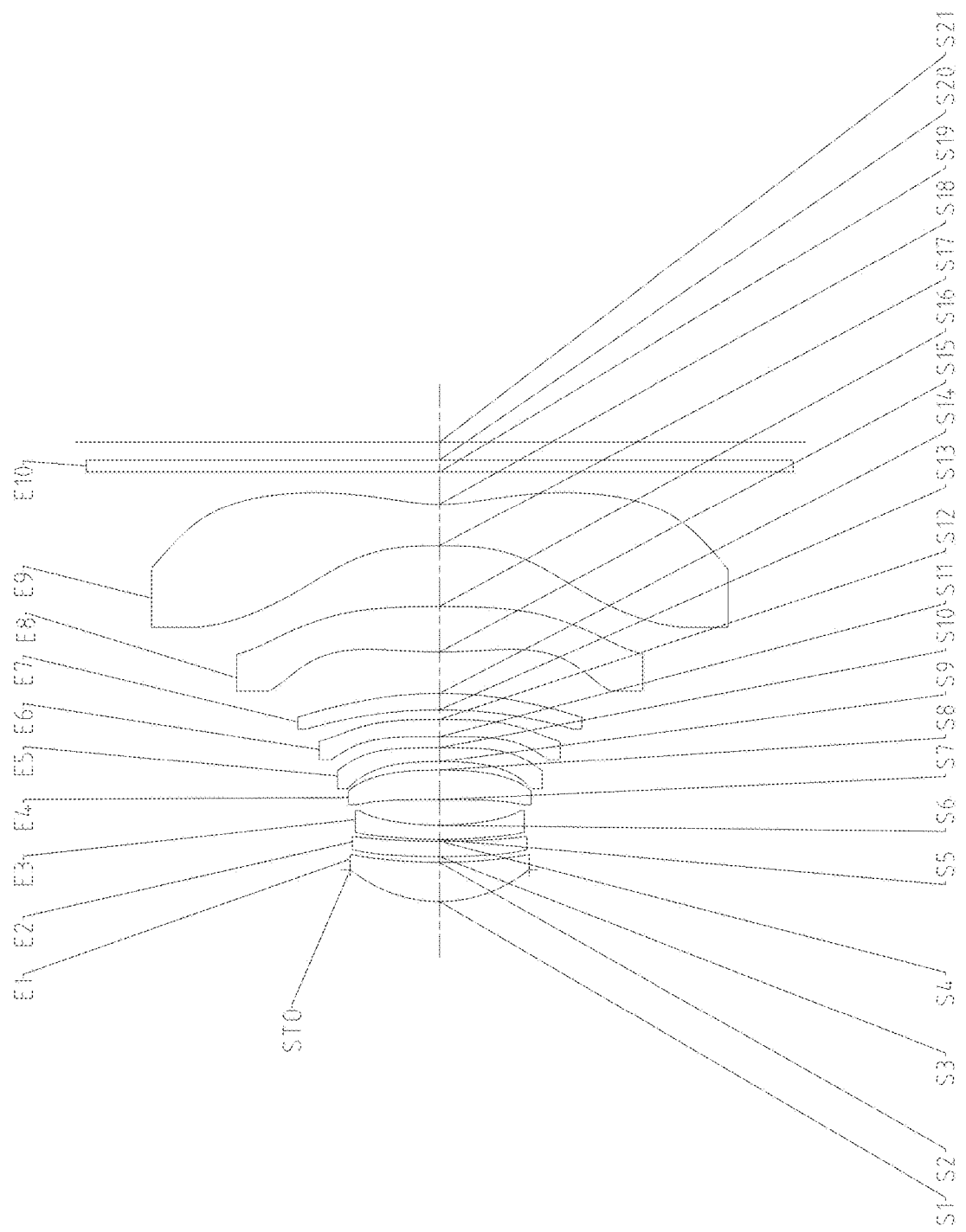
FIG. 5 shows a schematic structural diagram of an optical camera system according to Embodiment 3 of the present application.
Figures 6A, 6B:
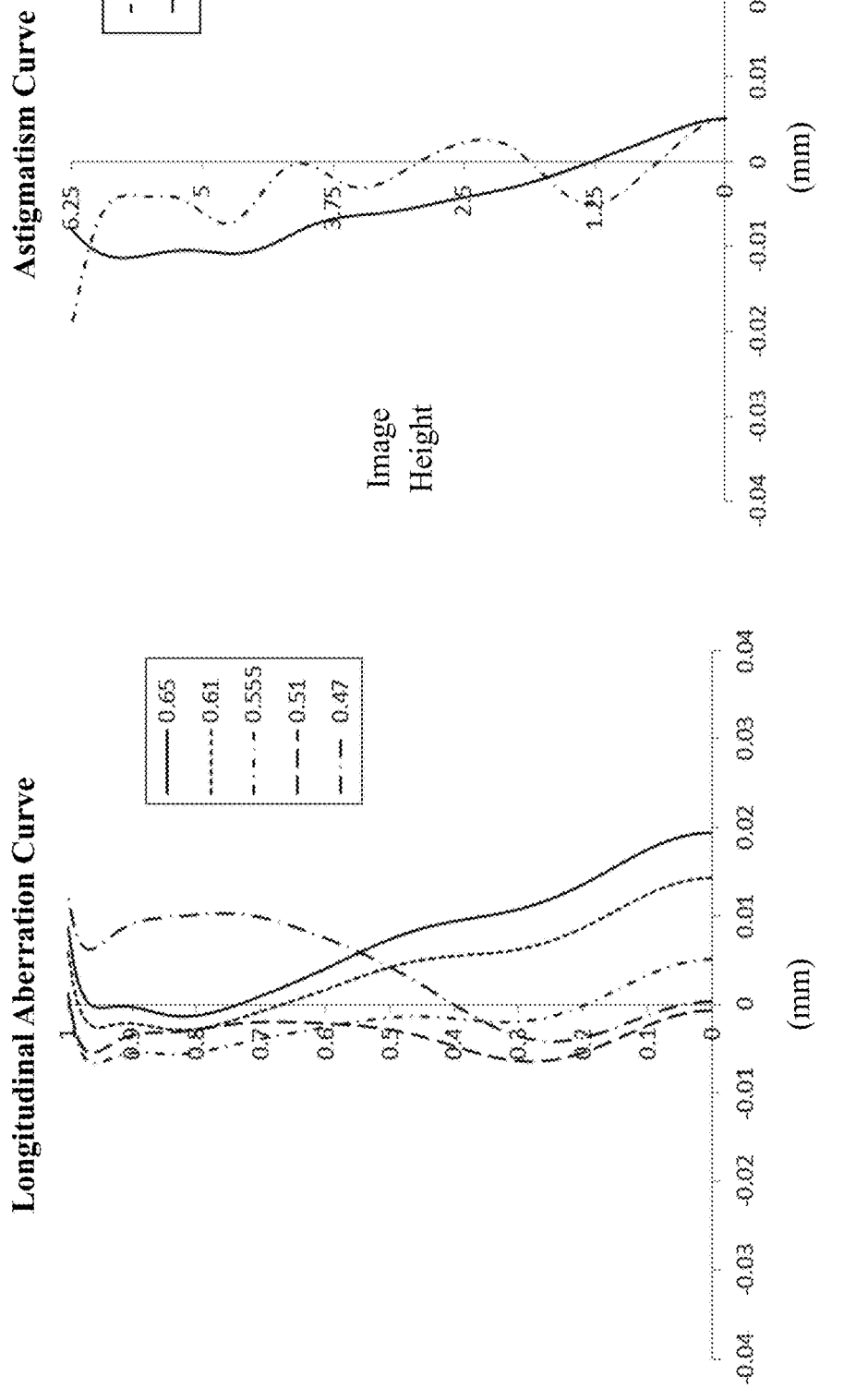
FIGS. 6A to 6D show a longitudinal aberration curve, astigmatism curve, distortion curve and lateral color curve of the optical camera system according to Embodiment 3, respectively.
Figure 6D:
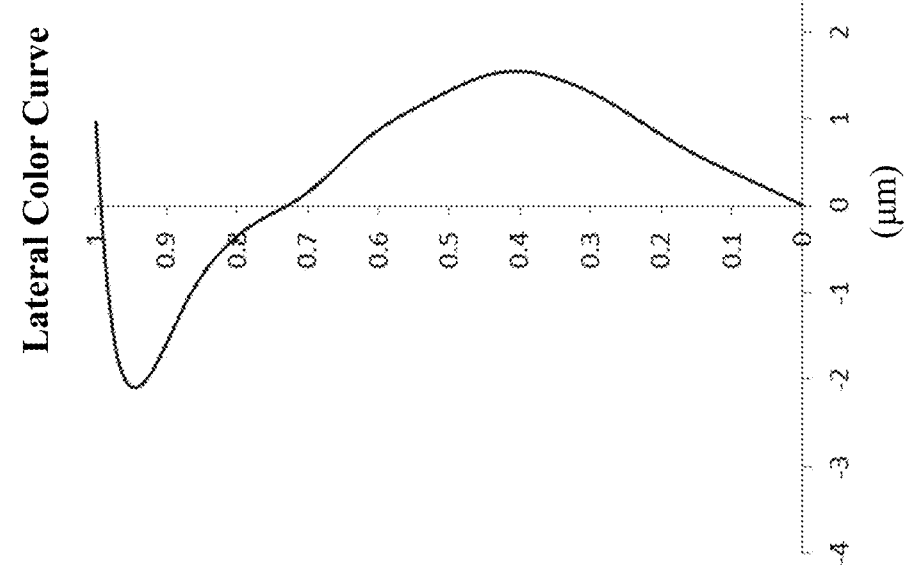

An optical camera system according to Embodiment 3 of the present application will be described below with reference to FIGS. 5 to 6D. FIG. 5 shows a schematic structural diagram of the optical camera system according to Embodiment 3 of the present application.

As shown in FIG. 5, the optical camera system includes a diaphragm STO, a first lens E1, a second lens E2, a third lens E3, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a positive refractive power, and has a convex object side surface S3 and a concave image side surface S4. The third lens E3 has a negative refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a concave object side surface S9 and a convex image side surface S10. The sixth lens E6 has a positive refractive power, and has a convex object side surface S11 and a convex image side surface S12. The seventh lens E7 has a positive refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 8.97 mm, a total length TTL of the optical camera system is 8.13 mm, a half ImgH of a diagonal length of an effective pixel region on the imaging plane S21 of the optical camera system is 6.25 mm, and the maximum field of view FOV of the optical camera system is 83.36°.

Table 5 shows a table of basic parameters of the optical camera system of Embodiment 3, wherein the units of the radius of curvature, thickness/distance, and focal length are all millimeters (mm). Tables 6-1 and 6-2 show higher-order coefficients of each of aspheric lens surfaces that are applicable in Embodiment 3, wherein the surface shape of each aspheric surface can be defined by formula (1) given in Embodiment 1 described above.

TABLE 5

| Surface No. | Surface type | Radius of curvature | Thickness distance | Material Refractive index | Abbe number | Focal length | Conic coefficient |
|---|---|---|---|---|---|---|---|
| OBJ | Spherical | Infinity | infinity | | | | |
| STO | Spherical | Infinity | −0.5602 | | | | |
| S1 | Aspherical | 2.5155 | 0.6896 | 155 | 56.1 | 6.33 | −1.2506 |
| S2 | Aspherical | 8.3349 | 0.1038 | | | | −1.9325 |
| S3 | Aspherical | 15.7729 | 0.2700 | 1.67 | 20.4 | 100.21 | 93.1688 |
| S4 | Aspherical | 20.5153 | 0.0300 | | | | 97.5084 |
| S5 | Aspherical | 7.9739 | 0.2500 | 1.68 | 19.2 | −16.89 | 4.4193 |
| S6 | Aspherical | 4.6404 | 0.4561 | | | | −0.5472 |
| S7 | Aspherical | −63.0984 | 0.5214 | 1.55 | 56.1 | 16.13 | 95.7783 |
| S8 | Aspherical | −7.7512 | 0.1522 | | | | 6.5668 |
| S9 | Aspherical | −6.6389 | 0.2500 | 1.67 | 20.4 | −13.18 | −0.7955 |
| S10 | Aspherical | −27.6605 | 0.1923 | | | | −21.3677 |
| S11 | Aspherical | 48.1997 | 0.3068 | 1.64 | 23.5 | 36.63 | 99.0000 |
| S12 | Aspherical | −46.0010 | 0.1700 | | | | 47.1329 |
| S13 | Aspherical | −8.3468 | 0.2900 | 1.64 | 23.5 | 39.69 | 1.3196 |
| S14 | Aspherical | −7.3913 | 0.7305 | | | | −0.8570 |
| S15 | Aspherical | 8.7088 | 0.8039 | 1.55 | 56.1 | 11.48 | 3.9301 |
| S16 | Aspherical | −21.5979 | 1.0738 | | | | −0.8842 |
| S17 | Aspherical | −15.1041 | 0.7351 | 1.54 | 55.7 | −4.82 | 5.3007 |
| S18 | Aspherical | 3.1774 | 0.5749 | | | | −11.9235 |
| S19 | Spherical | Infinity | 0.2100 | 1.52 | 64.2 | | |
| S20 | Spherical | Infinity | 0.3146 | | | | |
| S21 | Spherical | Infinity | | | | | |

TABLE 6-1

| Surface No. | A4 | A6 | A8 | A10 | A12 | A14 | A16 |
|---|---|---|---|---|---|---|---|
| S1 | 1.0426E−02 | 1.7639E−03 | −2.9593E−03 | 4.9676E−03 | −4.8510E−03 | 2.8850E−03 | −1.0378E−03 |
| S2 | −7.0204E−03 | −4.9845E−04 | 7.7488E−03 | −8.4052E−03 | 4.9421E−03 | −1.4880E−03 | 1.4434E−04 |
| S3 | −1.2072E−04 | −8.0071E−04 | 4.6817E−03 | −3.0851E−04 | −7.5124E−03 | 9.0730E−03 | −4.8946E−03 |
| S4 | 2.6962E−02 | −5.8194E−02 | 1.0489E−01 | −1.3980E−01 | 1.2311E−01 | −6.9134E−02 | 2.3793E−02 |
| S5 | 6.0882E−03 | −5.2734E−02 | 9.7498E−02 | −1.2409E−01 | 1.0724E−01 | −5.8992E−02 | 1.9646E−02 |
| S6 | −7.6114E−03 | 3.4403E−04 | 1.0352E−02 | −1.2172E−02 | 1.0828E−02 | −5.3990E−03 | 1.3155E−03 |
| S7 | −1.1212E−02 | −4.4242E−03 | 4.2194E−03 | −7.1467E−03 | 8.0298E−03 | −6.1720E−03 | 3.1446E−03 |
| S8 | −5.1957E−03 | −3.0102E−02 | 2.7888E−02 | −1.2213E−02 | −1.2205E−03 | 2.7702E−03 | −5.0902E−04 |
| S9 | −1.3563E−03 | −6.6940E−02 | 5.9058E−02 | −1.9529E−02 | −7.1003E−03 | 6.9672E−03 | −1.1943E−03 |
| S10 | −7.3038E−03 | −3.4884E−02 | 1.3473E−02 | 1.7169E−02 | −2.5117E−02 | 1.4001E−02 | −4.0779E−03 |
| S11 | −5.2435E−02 | 3.9186E−02 | −4.9654E−02 | 3.6096E−02 | −1.2135E−02 | −5.4597E−04 | 1.8003E−03 |
| S12 | −5.5955E−02 | 4.4487E−02 | −4.1244E−02 | 2.3316E−02 | −61 582E−03 | −3.1981E−04 | 6.9472E−04 |
| S13 | −1.3677E−15 | 3.8412E−15 | −4.4568E−15 | 2.6805E−15 | −8.9523E−16 | 1.6601E−16 | −1.5664E−17 |
| S14 | 2.4317E−03 | −9.4222E−03 | 9.0757E−03 | −4.5080E−03 | 1.3269E−03 | −2.3495E−04 | 2.3955E−05 |
| S15 | −1.7734E−02 | 3.4227E−04 | −1.2923E−03 | 8.1745E−04 | −2.6280E−04 | 5.5404E−05 | −8.5182E−06 |
| S16 | −6.5272E−03 | 1.9663E−03 | −2.0642E−03 | 7.8814E−04 | −1.5144E−04 | −1.6508E−05 | −1.0367E−06 |
| S17 | −6.2740E−02 | 2.4939E−02 | −8.2103E−03 | 2.0191E−03 | −3.4208E−04 | 4.0222E−05 | −3.3521E−06 |
| S18 | −2.8617E−02 | 1.0506E−02 | −3.0228E−03 | 6.3330E−04 | −9.5243E−05 | 1.0315E−05 | −8.0831E−07 |

TABLE 6-2

| Surface No. | A18 | A20 | A22 | A24 | A26 | A28 |
|---|---|---|---|---|---|---|
| S1 | 2.0896E−04 | −1.8502E−05 | 0.0000E+00 | 0.0000E+00 | 0.0000E+00 | 0.0000E+00 |
| S2 | 2.0778E−05 | −3.8703E−06 | 0.0000E+00 | 0.0000E+00 | 0.0000E+00 | 0.0000E+00 |
| S3 | 1.2873E−03 | −1.3409E−04 | 0.0000E+00 | 0.0000E+00 | 0.0000E+00 | 0.0000E+00 |
| S4 | −4.5832E−03 | 3.8214E−04 | 0.0000E+00 | 0.0000E+00 | 0.0000E+00 | 0.0000E+00 |
| S5 | −3.5901E−03 | 2.7545E−04 | 0.0000E+00 | 0.0000E+00 | 0.0000E+00 | 0.0000E+00 |
| S6 | −6.5528E−05 | −1.7361E−05 | 0.0000E+00 | 0.0000E+00 | 0.0000E+00 | 0.0000E+00 |
| S7 | −9.0678E−04 | 1.1105E−04 | 0.0000E+00 | 0.0000E+00 | 0.0000E+00 | 0.0000E+00 |
| S8 | −1.2725E−04 | 3.2871E−05 | 0.0000E+00 | 0.0000E+00 | 0.0000E+00 | 0.0000E+00 |
| S9 | −2.5024E−04 | 7.03235E−05 | 0.0000E+00 | 0.0000E+00 | 0.0000E+00 | 0.0000E+00 |
| S10 | 6.1595E−04 | −3.7904E−05 | 0.0000E+00 | 0.0000E+00 | 0.0000E+00 | 0.0000E+00 |
| S11 | −5.7268E−04 | 7.6982E−05 | −3.9084E−06 | 0.0000E+00 | 0.0000E+00 | 0.0000E+00 |
| S12 | −1.9245E−04 | 2.3178E−05 | −1.0697E−06 | 0.0000E+00 | 0.0000E+00 | 0.0000E+00 |
| S13 | 5.2471E−19 | 7.7526E−21 | 0.0000E+00 | 0.0000E+00 | 0.0000E+00 | 0.0000E+00 |
| S14 | −1.2421E−06 | 2.3047E−08 | 0.0000E+00 | 0.0000E+00 | 0.0000E+00 | 0.0000E+00 |
| S15 | 9.3834E−07 | −6.6910E−08 | 2.6671E−09 | −4.4245E−11 | 0.0000E+00 | 0.0000E+00 |
| S16 | 3.5037E−08 | −4.9469E−10 | 0.0000E+00 | 0.0000E+00 | 0.0000E+00 | 0.0000E+00 |
| S17 | 2.0047E−07 | −8.5870E−09 | 2.5811E−10 | −5.1843E−12 | 6.2598E−14 | −3.4387E−16 |
| S18 | 4.5765E−08 | −1.8512E−09 | 5.2124E−11 | −9.7011E−13 | 1.0729E−14 | −5.3426E−17 |

Figure 6C:
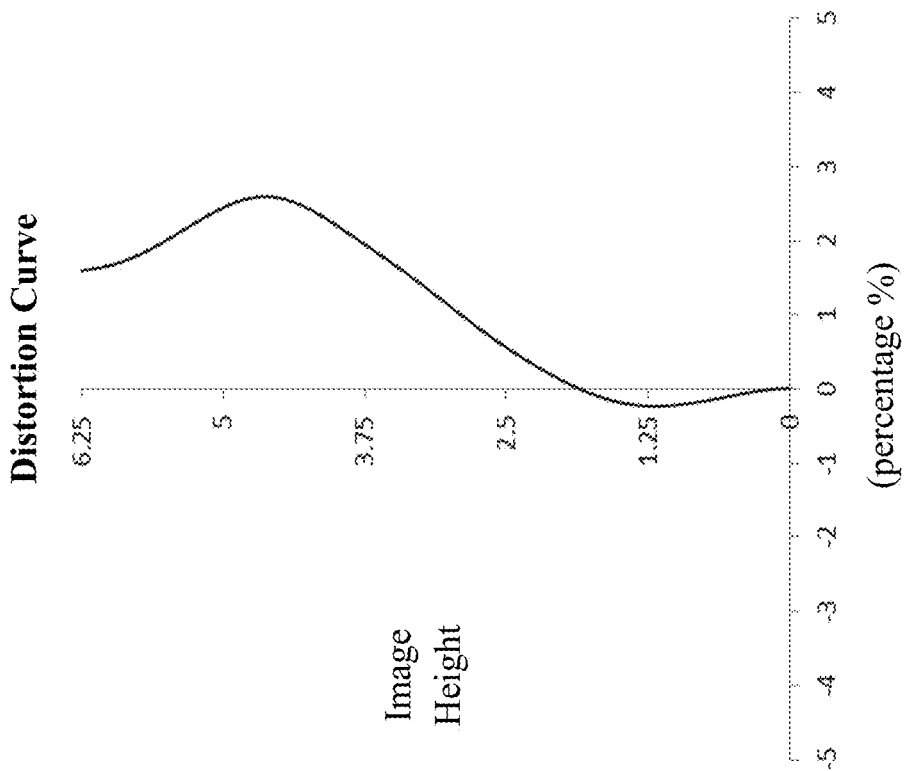
Figures 8A, 8B:
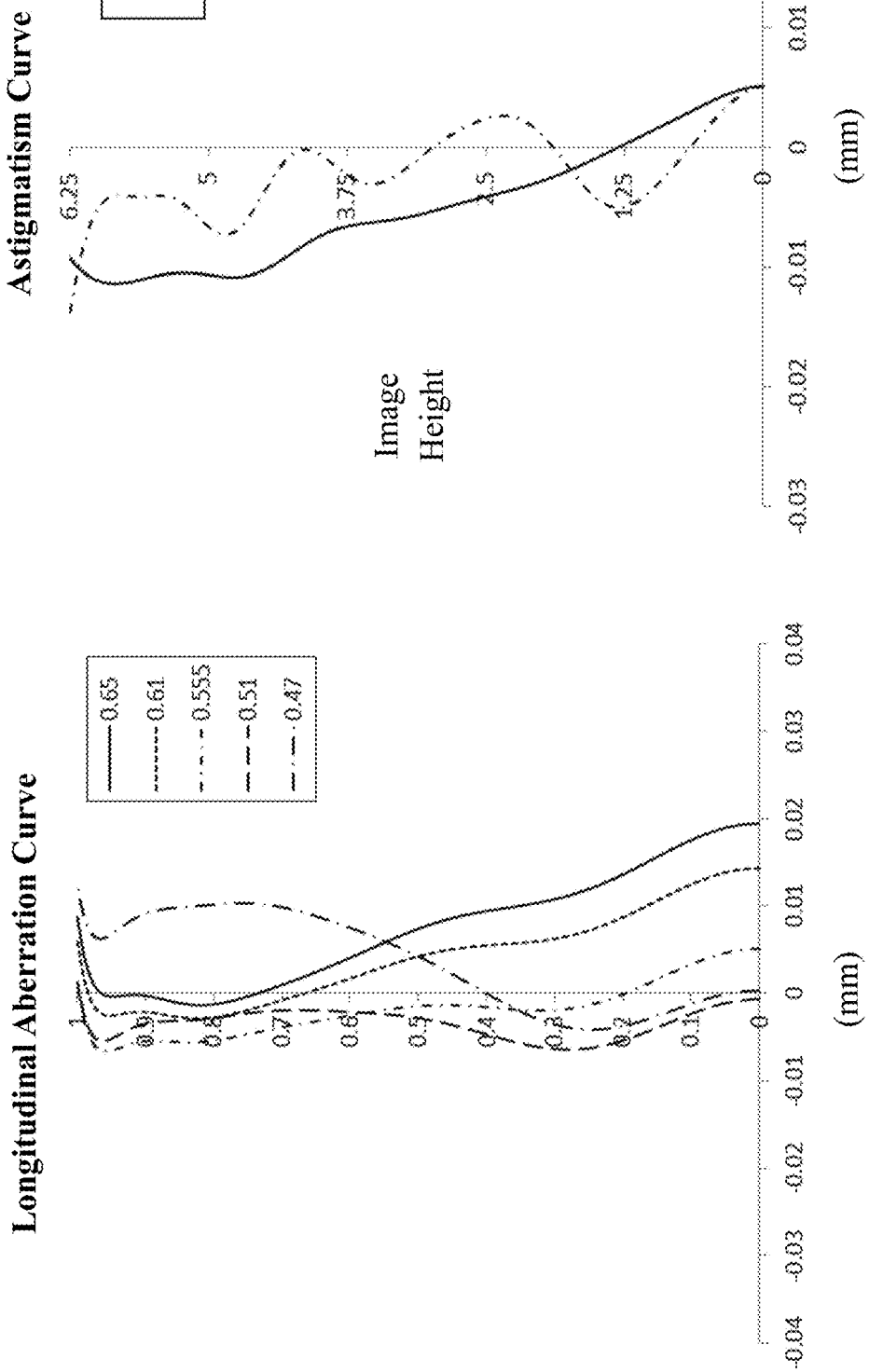

FIG. 8A shows a longitudinal aberration curve of the optical camera system according to Embodiment 3, which represents the deviation of the converged focal point after light of different wavelengths passes through the camera lens. FIG. 6B shows an astigmatism curve of the optical camera system according to Embodiment 3, which represents the curvature of the tangential image plane and the curvature of the sagittal image plane. FIG. 6C shows a distortion curve of the optical camera system according to Embodiment 3, which represents distortion magnitude values corresponding to different image heights. FIG. 6D shows a lateral color curve of the optical camera system according to Embodiment 3, which represents the deviation of different image heights on the imaging plane after light passes through the camera lens. According to FIGS. 6A to 6D, it can be seen that the optical camera system given in Embodiment 3 can achieve good imaging quality.

Embodiment 4

Figure 7:
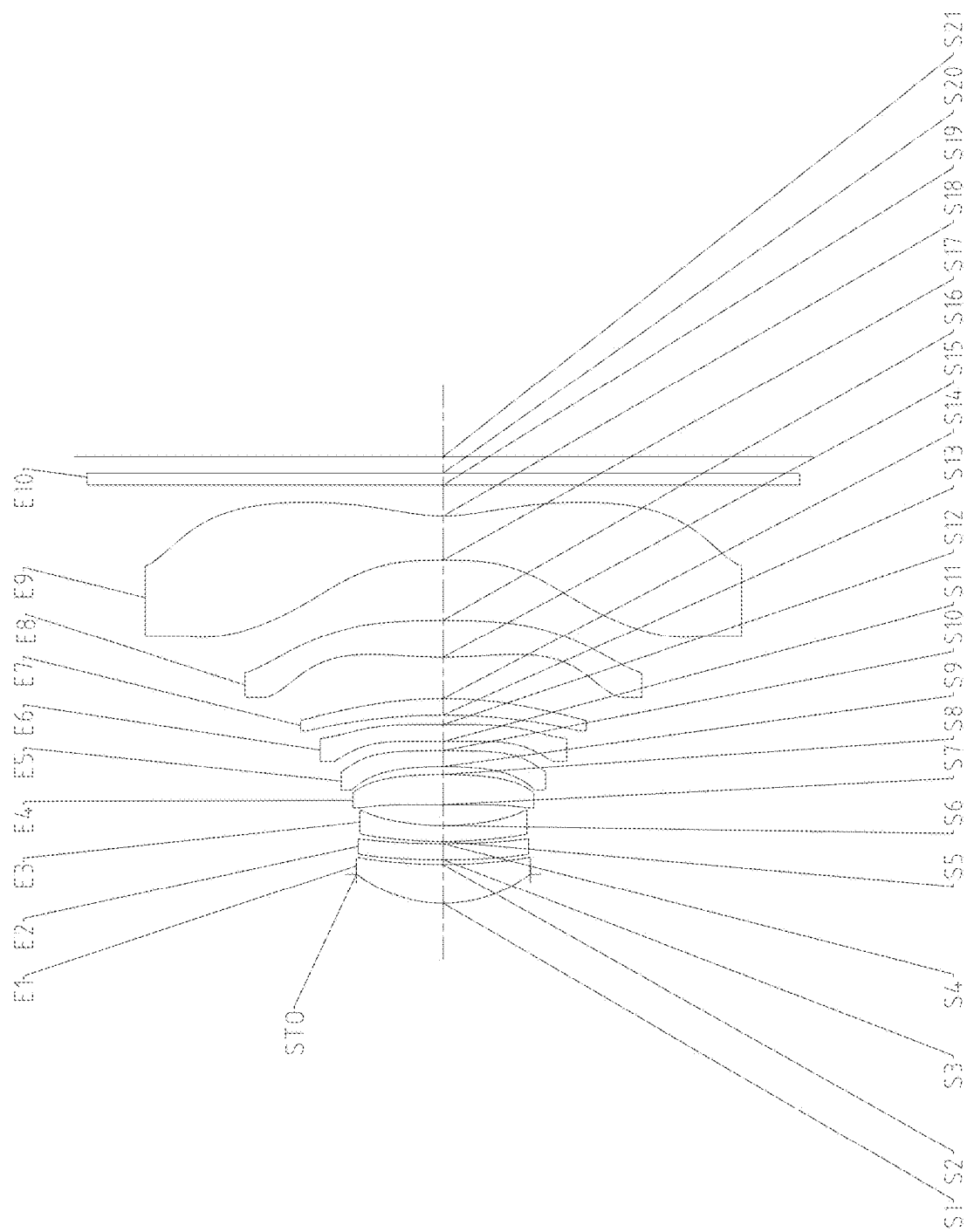
FIG. 7 shows a schematic structural diagram of an optical camera system according to Embodiment 4 of the present application.

An optical camera system according to Embodiment 4 of the present application will be described below with reference to FIGS. 7 to 8D. FIG. 7 shows a schematic structural diagram of the optical camera system according to Embodiment 4 of the present application.

As shown in FIG. 7, the optical camera system includes a diaphragm STO, a first lens E1, a second lens E2, a third lens E3, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a positive refractive power, and has a convex object side surface S3 and a concave image side surface S4. The third lens E3 has a negative refractive power, and has a convex object side surface S5 and a concave image side surface S6. The fourth lens E4 has a positive refractive power, and has a convex object side surface S7 and a convex image side surface S8. The fifth lens E5 has a negative refractive power, and has a concave object side surface S9 and a convex image side surface S10. The sixth lens E6 has a positive refractive power, and has a convex object side surface S11 and a concave image side surface S12. The seventh lens E7 has a positive refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 8.71 mm, a total length TTL of the optical camera system is 7.88 mm, a half ImgH of a diagonal length of an effective pixel region on the imaging plane S21 of the optical camera system is 8.25 mm, and the maximum field of view FOV of the optical camera system is 85.57°.

Table 7 shows a table of basic parameters of the optical camera system of Embodiment 4, wherein the units of the radius of curvature, thickness/distance, and focal length are ail millimeters (mm). Tables 8-1 and 8-2 show higher-order coefficients of each of aspheric lens surfaces that are applicable in Embodiment 4, wherein the surface shape of each aspheric surface can be defined by formula (1) given in Embodiment 1 described above.

TABLE 7

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.5157 | | | | |
| S1 | Aspherical | 2.5091 | 0.6855 | 1.55 | 56.1 | 6.32 | −1.2627 |
| S2 | Aspherical | 8.3244 | 0.0871 | | | | −2.2711 |
| S3 | Aspherical | 15.8525 | 0.2811 | 1.67 | 20.4 | 145.40 | 90.6673 |
| S4 | Aspherical | 18.8226 | 0.0400 | | | | 98.1363 |
| S5 | Aspherical | 7.3779 | 0.2800 | 1.68 | 19.2 | −16.14 | 4.9046 |
| S6 | Aspherical | 4.3381 | 0.3668 | | | | −0.9530 |
| S7 | Aspherical | 100.0000 | 0.5326 | 1.55 | 56.1 | 15.98 | 95.7783 |
| S8 | Aspherical | −9.5401 | 0.1385 | | | | 10.1361 |
| S9 | Aspherical | −8.3088 | 0.2800 | 1.67 | 20.4 | −14.94 | −3.3618 |
| S10 | Aspherical | −51.1299 | 0.1612 | | | | −99.0000 |
| S11 | Aspherical | 17.4267 | 0.2970 | 1.64 | 23.5 | 62.39 | 8.1142 |
| S12 | Aspherical | 30.5863 | 0.1700 | | | | 76.6589 |
| S13 | Aspherical | −10.3434 | 0.2900 | 1.64 | 23.5 | 47.06 | 3.0959 |
| S14 | Aspherical | −7.7946 | 0.7305 | | | | −0.9862 |
| S15 | Aspherical | 8.6802 | 0.6540 | 1.55 | 56.1 | 10.19 | 3.9884 |
| S16 | Aspherical | −15.0970 | 1.0623 | | | | −1.8437 |
| S17 | Aspherical | −15.3272 | 0.7747 | 1.54 | 55.7 | −4.36 | 4.9141 |
| S18 | Aspherical | 2.8091 | 0.5468 | | | | −11.3359 |
| S19 | Spherical | Infinity | 0.2100 | 1.52 | 64.2 | | |
| S20 | Spherical | Infinity | 0.2867 | | | | |
| S21 | Spherical | Infinity | | | | | |

TABLE 8-1

| Surface No. | A4 | A6 | A8 | A10 | A12 | A14 | A16 |
|---|---|---|---|---|---|---|---|
| S1 | 1.0288E−02 | 1.5687E−03 | −2.7358E−03 | 4.9030E−03 | −5.1549E−03 | 3.3577E−03 | −1.3391E−03 |
| S2 | −5.5786E−03 | −4.3555E−03 | 6.9637E−03 | 2.7992E−03 | −1.1813E−02 | 1.1221E−02 | −5.2695E−03 |
| S3 | 4.2040E−03 | −1.2648E−02 | 1.6743E−02 | −4.4255E−03 | −1.1986E−02 | 1.5658E−02 | −8.5900E−03 |
| S4 | 3.0469E−02 | −6.5355E−02 | 1.0009E−01 | −1.0527E−01 | 6.7075E−02 | −2.0857E−02 | −1.7486E−04 |
| S5 | 6.7778E−03 | −5.4960E−02 | 9.3398E−02 | −1.0139E−01 | 6.9003E−02 | −2.4454E−02 | 1.6688E−03 |
| S6 | −8.0565E−03 | 5.3589E−03 | −8.1051E−03 | 2.6271E−02 | −3.9091E−02 | 3.4528E−02 | −1.7896E−02 |
| S7 | −8.8779E−03 | −6.4249E−03 | 1.3058E−02 | −2.7076E−02 | 3.4108E−02 | −2.7581E−02 | 1.3899E−02 |
| S8 | −6.6859E−03 | −3.3553E−02 | 4.2962E−02 | −3.7797E−02 | 2.4369E−02 | −1.3327E−02 | 5.7407E−03 |
| S9 | −2.4669E−03 | −7.6418E−02 | 9.9510E−02 | −8.7883E−02 | 5.7952E−02 | −3.0338E−02 | 1.1665E−02 |
| S10 | −6.2741E−03 | −4.3457E−02 | 3.7412E−02 | −1.3473E−02 | −3.0628E−03 | 4.4155E−03 | −1.5744E−03 |
| S11 | −4.9846E−02 | 2.5342E−02 | −3.2099E−02 | 2.6713E−02 | −1.1286E−02 | 9.2396E−04 | 9.8976E−04 |
| S12 | −5.2689E−02 | 4.0064E−02 | −4.2135E−02 | 3.0326E−02 | −1.3060E−02 | 3.1234E−03 | −3.0994E−04 |
| S13 | −6.4731E−15 | 2.4033E−14 | −3.3885E−14 | 2.4908E−14 | −1.0727E−14 | 2.8167E−15 | −4.4503E−16 |
| S14 | 5.1420E−04 | −9.0807E−03 | 1.0696E−02 | −5.9797E−03 | 1.9347E−03 | −3.7495E−04 | 4.2420E−05 |
| S15 | −1.5515E−02 | −5.2084E−04 | −1.9784E−03 | 1.6247E−03 | −6.4259E−04 | 1.6166E−04 | −2.7781E−05 |
| S16 | −4.6299E−03 | 8.7256E−04 | −2.1278E−03 | 9.5003E−04 | −1.9783E−04 | 2.2790E−05 | −1.4914E−06 |
| S17 | −7.0844E−02 | 2.9961E−02 | −9.9415E−03 | 2.3816E−03 | −3.8536E−04 | 4.2281E−05 | −3.1775E−06 |
| S18 | −3.2191E−02 | 1.2904E−02 | −3.7697E−03 | 7.8546E−04 | −1.1698E−04 | 1.2531E−05 | −9.7014E−07 |

TABLE 8-2

| Surface No. | A18 | A20 | A22 | A24 | A26 | A28 |
|---|---|---|---|---|---|---|
| S1 | 3.0083E−04 | −2.9442E−05 | 0.0000E+00 | 0.0000E+00 | 0.0000E+00 | 0.0000E+00 |
| S2 | 1.2475E−03 | −1.1890E−04 | 0.0000E+00 | 0.0000E+00 | 0.0000E+00 | 0.0000E+00 |
| S3 | 2.2926E−03 | −2.4275E−04 | 0.0000E+00 | 0.0000E+00 | 0.0000E+00 | 0.0000E+00 |
| S4 | 1.8784E−03 | −3.4945E−04 | 0.0000E+00 | 0.0000E+00 | 0.0000E+00 | 0.0000E+00 |

TABLE 8-2-continued

| Surface No. | A18 | A20 | A22 | A24 | A26 | A28 |
|---|---|---|---|---|---|---|
| S5 | 1.4882E−03 | −3.2642E−04 | 0.0000E+00 | 0.0000E+00 | 0.0000E+00 | 0.0000E+00 |
| S6 | 5.0314E−03 | −5.8832E−04 | 0.0000E+00 | 0.0000E+00 | 0.0000E+00 | 0.0000E+00 |
| S7 | −3.9414E−03 | 4.8174E−04 | 0.0000E+00 | 0.0000E+00 | 0.0000E+00 | 0.0000E+00 |
| S8 | −1.5027E−03 | 1.6391E−04 | 0.0000E+00 | 0.0000E+00 | 0.0000E+00 | 0.0000E+00 |
| S9 | −2.7199E−03 | 2.7378E−04 | 0.0000E+00 | 0.0000E+00 | 0.0000E+00 | 0.0000E+00 |
| S10 | 2.5388E−04 | −1.55895E−05 | 0.0000E+00 | 0.0000E+00 | 0.0000E+00 | 0.0000E+00 |
| S11 | −3.7283E−04 | 5.1769E−05 | −2.5870E−06 | 0.0000E+00 | 0.0000E+00 | 0.0000E+00 |
| S12 | −1.9463E−05 | 6.9109E−06 | −4.2683E−07 | 0.0000E+00 | 0.0000E+00 | 0.0000E+00 |
| S13 | 3.8946E−17 | −1.4522E−18 | 0.0000E+00 | 0.0000E+00 | 0.0000E+00 | 0.0000E+00 |
| S14 | −2.5533E−06 | 6.2353E−08 | 0.0000E+00 | 0.0000E+00 | 0.0000E+00 | 0.0000E+00 |
| S15 | 3.2253E−06 | −2.3835E−07 | 1.0015E−08 | −1.8120E+10 | 0.0000E+00 | 0.0000E+00 |
| S16 | 5.1940E−08 | −7.4672E−10 | 0.0000E+00 | 0.0000E+00 | 0.0000E+00 | 0.0000E+00 |
| S17 | 1.6261E−07 | −5.4677E−09 | 1.0904E−10 | −8.7069E−13 | −7.8731E−15 | 1.5720E−16 |
| S18 | 5.4220E−08 | −2.1641E−09 | 6.0131E−11 | −1.1049E−12 | 1.2072E−14 | −5.9419E−17 |

FIG. 8A shows a longitudinal aberration curve of the optical camera system according to Embodiment 4, which represents the deviation of the converged focal point after light of different wavelengths passes through the camera lens. FIG. 8B shows an astigmatism curve of the optical camera system according to Embodiment 4, which represents the curvature of the tangential image plane and the curvature of the sagittal image plane. FIG. 8C shows a distortion curve of the optical camera system according to Embodiment 4, which represents distortion magnitude values corresponding to different image heights. FIG. 8D shows a lateral color curve of the optical camera system according to Embodiment 4, which represents the deviation of different image heights on the imaging plane after light passes through the camera lens. According to FIGS. 8A to 8D, it can be seen that the optical camera system given in Embodiment 4 can achieve good imaging quality.

Embodiment 5

Figure 9:
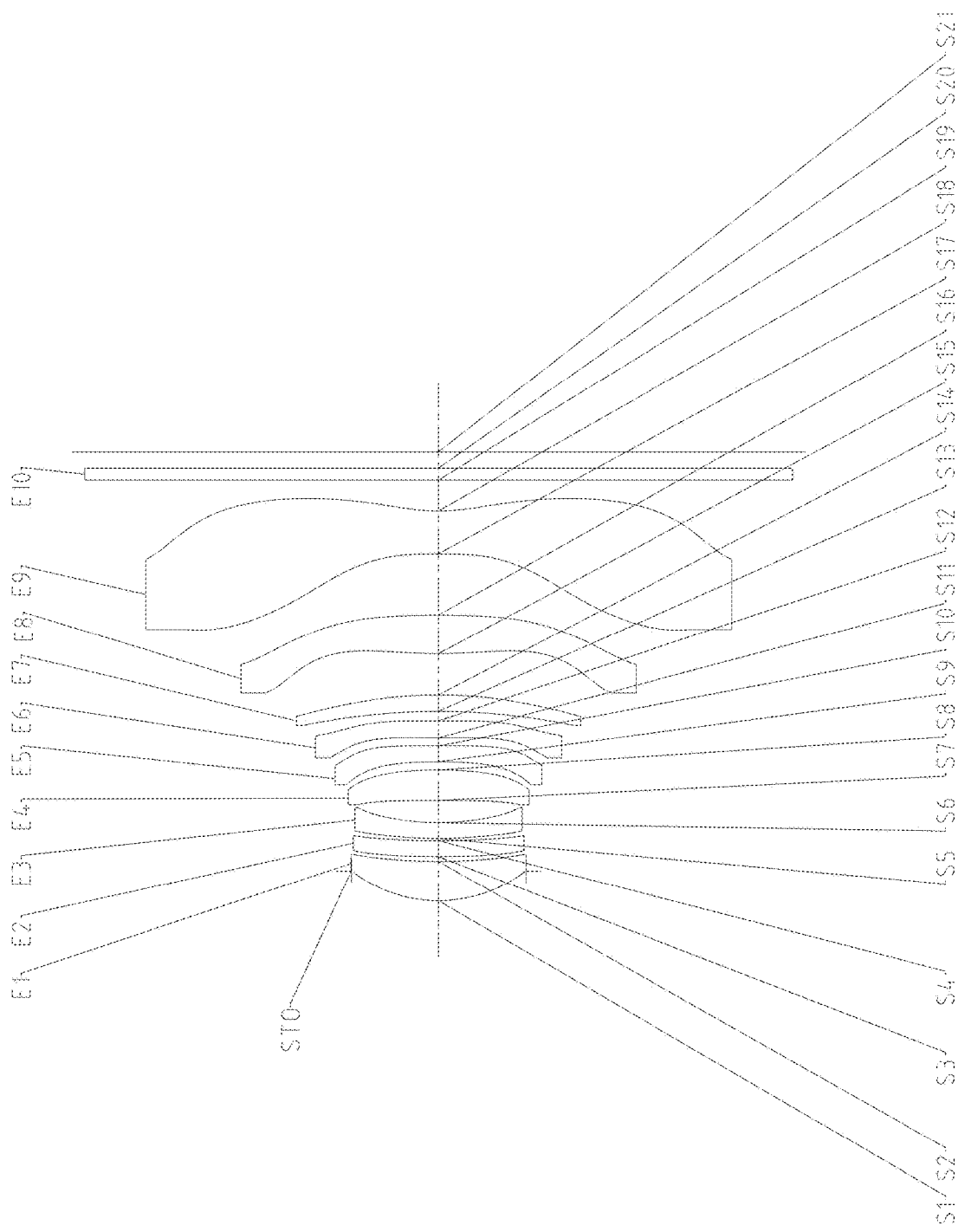
FIG. 9 shows a schematic structural diagram of an optical camera system according to Embodiment 5 of the present application.

An optical camera system according to Embodiments of the present application will be described below with reference to FIGS. 9 to 10D. FIG. 9 shows a schematic structural diagram of the optical camera system according to Embodiment 5 of the present application.

As shown in FIG. 9, the optical camera system includes a diaphragm STO, a first lens E1, a second lens E2, a third lens E3, a fourth lens E4, a fifth lens E5, a sixth lens E8, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a positive refractive power, and has a convex object side surface S3 and a concave image side surface S4. The third lens E3 has a negative refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a concave object side surface S9 and a concave image side surface S10. The sixth lens E8 has a positive refractive power, and has a convex object side surface S11 and a concave image side surface S12. The seventh lens E7 has a positive refractive power, and has a concave object side surface S13 and a convex image side surface S14. The eighth lens E8 has a positive refractive power, and has a convex object side surface S15 and a convex image side surface S18. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 8.78 mm, a total length TTL of the optical camera system is 7.94 mm, a half ImgH of a diagonal length of an effective pixel region on the imaging plane S21 of the optical camera system is 8.25 mm, and the maximum field of view FOV of the optical camera system is 84.31°.

Table 9 shows a table of basic parameters of the optical camera system of Embodiment 5, wherein the units of the radius of curvature, thickness/distance, and focal length are ail millimeters (mm). Tables 10-1 and 10-2 show higher-order coefficients of each of aspheric lens surfaces that are applicable in Embodiment 5, wherein the surface shape of each aspheric surface can be defined by formula (1) given in Embodiment 1 described above.

TABLE 9

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.5268 | | | | |
| S1 | Aspherical | 2.5094 | 0.6952 | 1.55 | 56.1 | 6.31 | −1.2671 |
| S2 | Aspherical | 8.3398 | 0.0867 | | | | −2.9453 |
| S3 | Aspherical | 15.8754 | 0.2829 | 1.67 | 20.4 | 139.42 | 90.1477 |
| S4 | Aspherical | 19.0148 | 0.0400 | | | | 98.0252 |
| S5 | Aspherical | 7.3977 | 0.2800 | 1.68 | 19.2 | −16.92 | 4.5551 |
| S6 | Aspherical | 4.4278 | 0.3929 | | | | −0.8303 |
| S7 | Aspherical | −74.9592 | 0.5355 | 1.55 | 56.1 | 16.56 | 95.7783 |

TABLE 9-continued

| Surface No. | Surface type | Radius of curvature | Thickness/ distance | Material Refractive index | Abbe number | Focal length | Conic coefficient |
|---|---|---|---|---|---|---|---|
| S8  | Aspherical | −8.0900   | 0.1461 |      |      |        | 6.2262   |
| S9  | Aspherical | −9.9214   | 0.2800 | 1.67 | 20.4 | −13.54 | −3.2738  |
| S10 | Aspherical | 100.0000  | 0.1409 |      |      |        | −60.1687 |
| S11 | Aspherical | 18.0230   | 0.2988 | 1.64 | 23.5 | 54.98  | 6.2255   |
| S12 | Aspherical | 36.4984   | 0.1700 |      |      |        | 85.2866  |
| S13 | Aspherical | −11.5844  | 0.2900 | 1.64 | 23.5 | 42.57  | 22.1897  |
| S14 | Aspherical | −8.2213   | 0.7305 |      |      |        | −0.3653  |
| S15 | Aspherical | 8.6224    | 0.6855 | 1.55 | 56.1 | 10.72  | 4.0239   |
| S16 | Aspherical | −17.7008  | 1.0850 |      |      |        | −1.8309  |
| S17 | Aspherical | −15.3879  | 0.7536 | 1.54 | 55.7 | −4.52  | 4.7995   |
| S18 | Aspherical | 2.9310    | 0.5470 |      |      |        | −11.6943 |
| S19 | Spherical  | Infinity  | 0.2100 | 1.52 | 64.2 |        |          |
| S20 | Spherical  | Infinity  | 0.2869 |      |      |        |          |
| S21 | Spherical  | Infinity  |        |      |      |        |          |

TABLE 10-1

| Surface No. | A4 | A6 | A8 | A10 | A12 | A14 | A16 |
|---|---|---|---|---|---|---|---|
| S1  | 1.0217E−02  | 1.7490E−03  | −3.2832E−03 | 5.8223E−03  | −6.1047E−03 | 3.9384E−03  | −1.5375E−03 |
| S2  | −6.6526E−03 | −2.9771E−03 | 7.4223E−03  | −1.8977E−03 | −4.2280E−03 | 5.1077E−03  | −2.5655E−03 |
| S3  | 2.3154E−03  | −8.4412E−03 | 1.1560E−02  | −1.5891E−03 | −1.0718E−02 | 1.2797E−02  | −6.8834E−03 |
| S4  | 2.9641E−02  | −6.1957E−02 | 9.0170E−02  | −9.1538E−02 | 5.7713E−02  | −1.8318E−02 | 1.8404E−04  |
| S5  | 8.2237E−03  | −5.5393E−02 | 8.5943E−02  | −8.7009E−02 | 5.6832E−02  | −1.9374E−02 | 8.8794E−04  |
| S6  | −6.2321E−03 | 2.0331E−03  | −3.9562E−02 | 2.0423E−02  | −3.1669E−02 | 2.8350E−02  | −1.4858E−02 |
| S7  | −8.4202E−03 | −7.9474E−03 | 1.6958E−02  | −3.5468E−02 | 4.5052E−02  | −3.5822E−02 | 1.7464E−02  |
| S8  | −6.8995E−03 | −3.3029E−02 | 4.8321E−02  | −4.8864E−02 | 3.2636E−02  | −1.5182E−02 | 4.9299E−03  |
| S9  | −5.5594E−03 | −7.2169E−02 | 1.0008E−01  | −8.9273E−02 | 5.2952E−02  | −2.2045E−02 | 6.5304E−03  |
| S10 | −1.0285E−02 | −3.7445E−02 | 3.1984E−02  | −9.5631E−02 | 5.2172E−02  | −1.8043E−03 |             |
| S11 | −5.5462E−02 | 4.3871E−02  | −6.4621E−02 | 6.0688E−02  | −3.3878E−02 | 1.0842E−02  | −1.8792E−03 |
| S12 | −5.6593E−02 | 5.3625E−02  | −6.1643E−02 | 4.6358E−02  | −2.1637E−02 | 6.2729E−03  | −1.0981E−03 |
| S13 | −1.4782E−12 | −1.2307E−14 | 1.3619E−14  | −7.9395E−15 | 2.7097E−15  | −5.6132E−16 | 6.9579E−17  |
| S14 | 1.7864E−03  | −1.2558E−02 | 1.3849E−02  | −7.5408E−03 | 2.4253E−03  | −4.7840E−04 | 5.6766E−05  |
| S15 | −1.5554E−02 | −1.2427E−03 | −1.1961E−03 | 1.1793E−03  | −4.8708E−04 | 1.2621E−04  | −2.2460E−05 |
| S16 | −5.3981E−03 | 1.1542E−03  | 2.0715E−03  | 8.9097E−04  | −1.8231E−04 | 2.0755E−05  | −1.3457E−06 |
| S17 | −7.0658E−02 | 2.9906E−02  | −9.9506E−03 | 2.3965E−03  | −3.9162E−04 | 4.3739E−05  | −3.3924E−06 |
| S18 | −3.2352E−02 | 1.2796E−02  | −3.7081E−03 | 7.6741E−04  | −1.1369E−04 | 1.2136E−05  | −9.3795E−07 |

TABLE 10-2

| Surface No. | A18 | A20 | A22 | A24 | A26 | A28 |
|---|---|---|---|---|---|---|
| S1  | 3.3404E−04  | −3.1258E−05 | 0.0000E+00  | 0.0000E+00  | 0.0000E+00 | 0.0000E+00  |
| S2  | 6.2134E−04  | −5.9327E−05 | 0.0000E+00  | 0.0000E+00  | 0.0000E+00 | 0.0000E+00  |
| S3  | 1.8374E−03  | −1.9648E−04 | 0.0000E+00  | 0.0000E+00  | 0.0000E+00 | 0.0000E+00  |
| S4  | 1.5399E−03  | −2.9967E−04 | 0.0000E+00  | 0.0000E+00  | 0.0000E+00 | 0.0000E+00  |
| S5  | 1.4010E−03  | −2.9752E−04 | 0.0000E+00  | 0.0000E+00  | 0.0000E+00 | 0.0000E+00  |
| S6  | 4.2293E−03  | −5.0143E−04 | 0.0000E+00  | 0.0000E+00  | 0.0000E+00 | 0.0000E+00  |
| S7  | −4.7539E−03 | 5.5510E−04  | 0.0000E+00  | 0.0000E+00  | 0.0000E+00 | 0.0000E+00  |
| S8  | −9.9652E−04 | 8.9069E−05  | 0.0000E+00  | 0.0000E+00  | 0.0000E+00 | 0.0000E+00  |
| S9  | −1.2461E−03 | 1.1018E−04  | 0.0000E+00  | 0.0000E+00  | 0.0000E+00 | 0.0000E+00  |
| S10 | 2.9828E−04  | −1.9595E−05 | 0.0000E+00  | 0.0000E+00  | 0.0000E+00 | 0.0000E+00  |
| S11 | 1.4929E−04  | −1.6673E−06 | −2.7927E+07 | 0.0000E+00  | 0.0000E+00 | 0.0000E+00  |
| S12 | 1.0768E−04  | −4.8662E−06 | 4.4551E−08  | 0.0000E+00  | 0.0000E+00 | 0.0000E+00  |
| S13 | −4.7524E−18 | 1.3769E−19  | 0.0000E+00  | 0.0000E+00  | 0.0000E+00 | 0.0000E+00  |
| S14 | −3.7301E−06 | 1.0514E−07  | 0.0000E+00  | 0.0000E+00  | 0.0000E+00 | 0.0000E+00  |
| S15 | 2.7099E−06  | −2.0767E−07 | 9.0055E−09  | −1.6736E−10 | 0.0000E+00 | 0.0000E+00  |
| S16 | 4.6503E−08  | −6.6458E−10 | 0.0000E+00  | 0.0000E+00  | 0.0000E+00 | 0.0000E+00  |
| S17 | 1.8366E−07  | −6.3585E−09 | 1.7047E−10  | −2.6116E−12 | 2.0781E−14 | −5.1305E−17 |
| S18 | 5.2384E−08  | −2.0901E−09 | 5.8029E−11  | −1.0643E−12 | 1.1587E−14 | −5.6701E−17 |

Figures 10A, 10B:
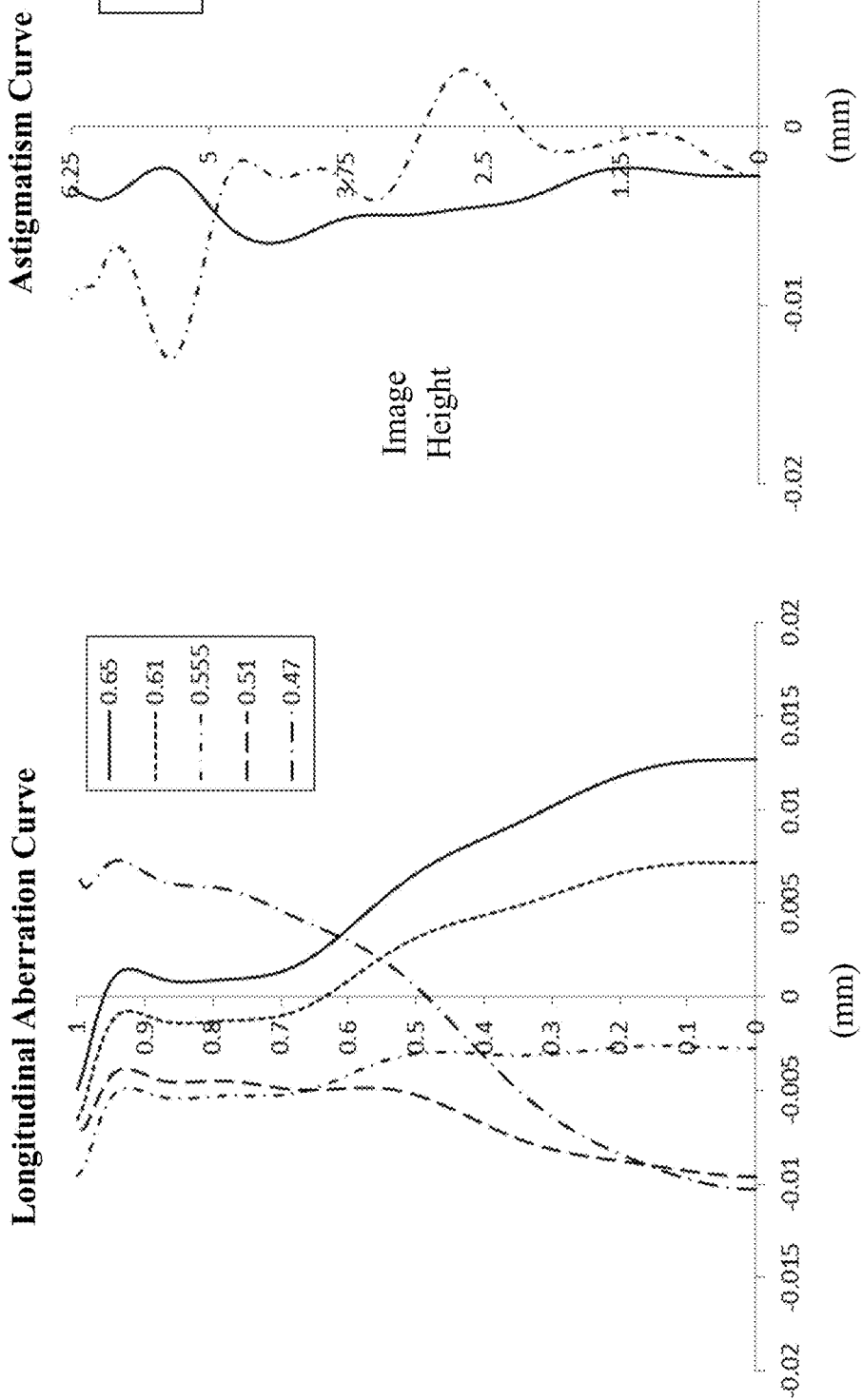
FIGS. 10A to 10D show a longitudinal aberration curve, astigmatism curve, distortion curve and lateral color curve of the optical camera system according to Embodiment 5, respectively.
Figure 10D:
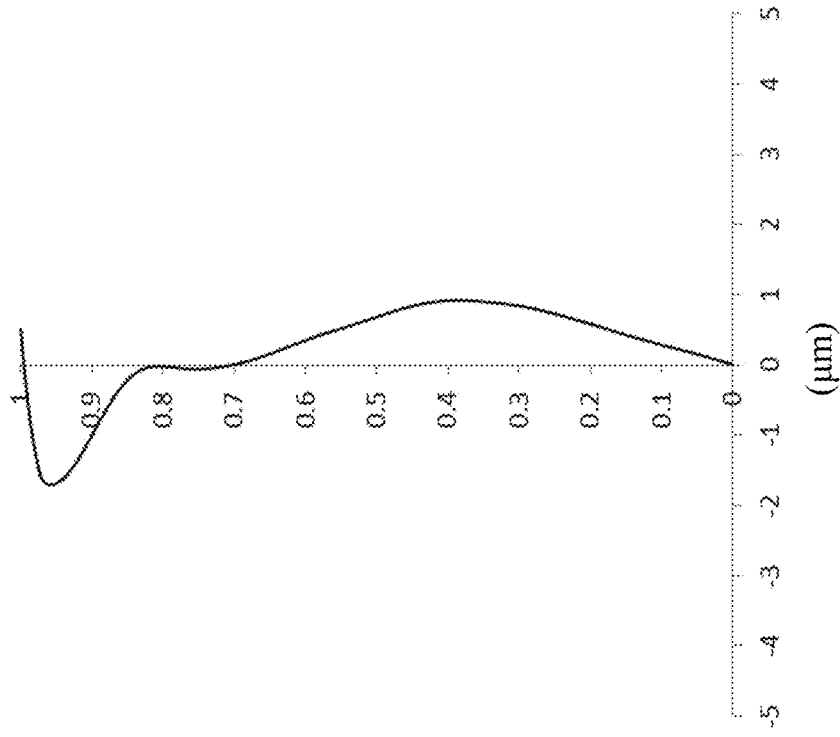
Figure 10C:
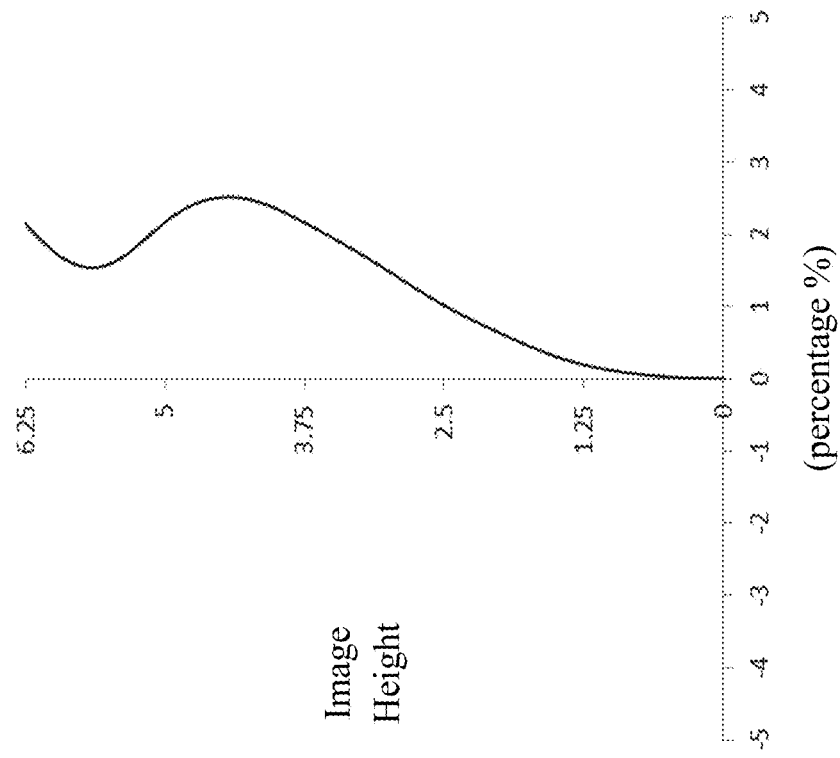

FIG. 10A shows a longitudinal aberration curve of the optical camera system according to Embodiment 5, which represents the deviation of the converged focal point after light of different wavelengths passes through the camera lens. FIG. 10B shows an astigmatism curve of the optical camera system according to Embodiment 5, which represents the curvature of the tangential image plane and the curvature of the sagittal image plane. FIG. 10C shows a distortion curve of the optical camera system according to Embodiment 5, which represents distortion magnitude values corresponding to different image heights. FIG. 10D shows a lateral color curve of the optical camera system according to Embodiment 5, which represents the deviation of different image heights on the imaging plane after light passes through the camera lens. According to FIGS. 10A to 10D, it can be seen that the optical camera system given in Embodiment 5 can achieve good imaging quality.

Embodiment 8

Figure 11:
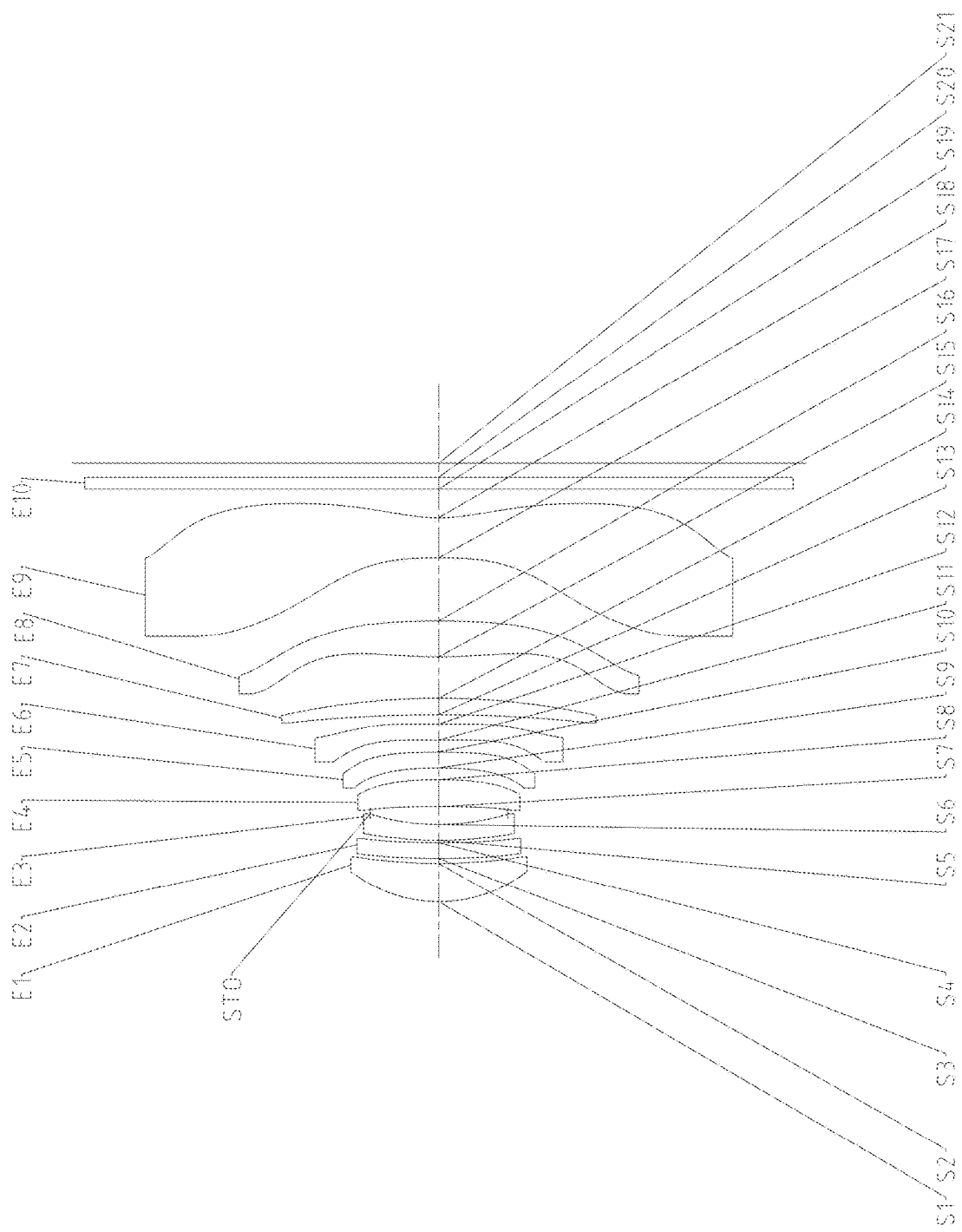
FIG. 11 shows a schematic structural diagram of an optical camera system according to Embodiment 6 of the present application.

An optical camera system according to Embodiment 6 of the present application will be described below with reference to FIGS. 11 to 12D. FIG. 11 shows a schematic structural diagram of the optical camera system according to Embodiment 6 of the present application.

As shown in FIG. 11, the optical camera system includes a first lens E1, a second lens E2, a third lens E3, a diaphragm STO, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a positive refractive power, and has a convex object side surface S3 and a concave image side surface S4. The third lens E3 has a negative refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a concave object side surface S9 and a convex image side surface S10. The sixth lens E6 has a negative refractive power, and has a convex object side surface S11 and a concave image side surface S12. The seventh lens E7 has a positive refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 6.55 mm, a total length TTL of the optical camera system is 7.75 mm, a half ImgH of a diagonal length of an effective pixel region on the imaging plane S21 of the optical camera system is 6.45 mm, and the maximum field of view FOV of the optical camera system is 88.28°.

Table 11 shows a table of basic parameters of the optical camera system of Embodiment 6, wherein the units of the radius of curvature, thickness/distance, and focal length are all millimeters (mm). Tables 12-1 and 12-2 show higher-order coefficients of each of aspheric lens surfaces that are applicable in Embodiment 6, wherein the surface shape of each aspheric surface can be defined by formula (1) given in Embodiment 1 described above.

TABLE 11

| Surface No. | Surface type | Radius of curvature | Thickness/ distance | Material Refractive index | Abbe number | Focal length | Conic coefficient |
| --- | --- | --- | --- | --- | --- | --- | --- |
| OBJ | Spherical | Infinity | Infinity | | | | |
| S1 | Aspherical | 2.5081 | 0.6788 | 1.55 | 56.1 | 6.30 | −1.3064 |
| S2 | Aspherical | 8.3874 | 0.0895 | | | | −4.4845 |
| S3 | Aspherical | 16.1253 | 0.2779 | 1.67 | 20.4 | 232.76 | 86.8875 |
| S4 | Aspherical | 17.8744 | 0.0421 | | | | 98.9772 |
| S5 | Aspherical | 6.4498 | 0.2800 | 1.68 | 19.2 | −16.44 | 4.2423 |
| S6/STO | Aspherical | 4.0127 | 0.3135 | | | | −0.9647 |
| S7 | Aspherical | −58.3108 | 0.4778 | 1.55 | 56.1 | 15.37 | 98.5595 |
| S8 | Aspherical | −7.3560 | 0.2077 | | | | 10.1361 |
| S9 | Aspherical | −6.6697 | 0.2800 | 1.67 | 20.4 | −21.02 | −5.0612 |
| S10 | Aspherical | −12.9576 | 0.2092 | | | | −35.1524 |
| S11 | Aspherical | 33.7745 | 0.2800 | 1.64 | 23.5 | −200.30 | −48.3193 |
| S12 | Aspherical | 26.6750 | 0.1700 | | | | 69.8633 |
| S13 | Aspherical | −24.0254 | 0.2900 | 1.64 | 23.5 | 42.19 | 22.1897 |
| S14 | Aspherical | −12.8054 | 0.7305 | | | | −1.1485 |
| S15 | Aspherical | 8.7279 | 0.6416 | 1.55 | 56.1 | 10.40 | 4.1039 |
| S16 | Aspherical | −15.8101 | 1.1134 | | | | 2.3007 |
| S17 | Aspherical | −14.9804 | 0.7079 | 1.54 | 55.7 | −4.49 | 4.8923 |
| S18 | Aspherical | 2.9165 | 0.5051 | | | | −10.4838 |
| S19 | Spherical | Infinity | 0.2100 | 1.52 | 64.2 | | |
| S20 | Spherical | Infinity | 0.2450 | | | | |
| S21 | Spherical | Infinity | | | | | |

TABLE 12-1

| Surface No. | A4 | A6 | A8 | A10 | A12 | A14 | A16 |
|---|---|---|---|---|---|---|---|
| S1 | 9.8678E-03 | 1.2060E-03 | -1.8290E-03 | 3.1236E-03 | -3.2935E-03 | 2.1654E-03 | -8.5388E-04 |
| S2 | -9.2562E-03 | 2.0101E-03 | 3.8271E-03 | -6.2615E-03 | 8.6719E-03 | -7.4990E-03 | 3.6221E-03 |
| S3 | 4.1427E-04 | 1.3127E-03 | -4.1947E-03 | 1.0124E-02 | -9.6480E-03 | 4.2219E-03 | -7.9569E-04 |
| S4 | 2.1320E-02 | -3.6240E-02 | 3.9396E-02 | -2.8364E-02 | 1.5648E-02 | -9.8814E-03 | 6.1080E-03 |
| S5 | -3.3035E-03 | -3.1635E-02 | 3.9783E-02 | -2.0641E-02 | -6.7046E-06 | 6.5598E-03 | -3.2375E-03 |
| S6 | -8.6177E-03 | 5.1726E-03 | -1.4535E-02 | 5.1426E-02 | -8.2612E-02 | 7.7987E-02 | -4.3394E-02 |
| S7 | -1.0611E-02 | -3.0716E-03 | -1.2978E-02 | 3.9676E-02 | -6.5443E-02 | 6.2854E-02 | -3.5194E-02 |
| S8 | -1.0456E-02 | -2.2790E-02 | 3.2748E-02 | -3.9974E-02 | 3.5137E-02 | -2.1717E-02 | 8.8199E-03 |
| S9 | -8.3002E-03 | -5.8088E-02 | 8.7805E-02 | -1.0140E-01 | 8.5582E-02 | -5.0160E-02 | 1.8863E-02 |
| S10 | -8.0719E-03 | -4.4968E-02 | 5.2289E-02 | -4.0102E-02 | 1.9194E-02 | -5.4633E-03 | 7.0347E-04 |
| S11 | -4.4360E-02 | 2.7431E-03 | -1.1664E-02 | 8.5061E-03 | -1.1903E-02 | 7.9475E-03 | -3.0877E-03 |
| S12 | -4.6599E-02 | 1.5529E-02 | -8.5102E-03 | 7.2503E-03 | -4.8353E-03 | 2.0512E-03 | -5.3449E-04 |
| S13 | -1.4782E-12 | -1.2263E-14 | 1.3540E-14 | -7.8753E-15 | 2.6817E-15 | -5.5434E-16 | 6.8575E-17 |
| S14 | 1.4357E-13 | 5.2409E-15 | -6.8443E-15 | 4.4005E-15 | -1.5912E-15 | 3.3892E-16 | -4.2231E-17 |
| S15 | -1.7992E-02 | 5.4422E-03 | -5.1864E-03 | 2.6170E-03 | -8.1785E-04 | 1.7140E-04 | -2.4844E-05 |
| S16 | -8.4909E-03 | 5.1815E-03 | -3.9530E-03 | 1.4038E-03 | -2.7336E-04 | 3.1278E-05 | -2.1024E-06 |
| S17 | -6.9516E-02 | 2.9172E-02 | -9.6250E-03 | 2.2971E-03 | -3.7142E-04 | 4.0921E-05 | -3.1123E-06 |
| S18 | -3.2089E-02 | 1.3157E-02 | -3.9645E-03 | 8.5110E-04 | -1.3018E-04 | 1.4302E-05 | -1.1355E-06 |

TABLE 12-2

| Surface No. | A18 | A20 | A22 | A24 | A26 | A28 |
|---|---|---|---|---|---|---|
| S1 | 1.8648E-04 | -1.7534E-05 | 0.0000E+00 | 0.0000E+00 | 0.0000E+00 | 0.0000E+00 |
| S2 | -9.1415E-04 | 9.3964E-05 | 0.0000E+00 | 0.0000E+00 | 0.0000E+00 | 0.0000E+00 |
| S3 | 1.7610E-05 | 7.6704E-06 | 0.0000E+00 | 0.0000E+00 | 0.0000E+00 | 0.0000E+00 |
| S4 | -2.1808E-03 | 3.0490E-04 | 0.0000E+00 | 0.0000E+00 | 0.0000E+00 | 0.0000E+00 |
| S5 | 5.3465E-04 | -14668E-05 | 0.0000E+00 | 0.0000E+00 | 0.0000E+00 | 0.0000E+00 |
| S6 | 1.3175E-02 | -1.6754E-03 | 0.0000E+00 | 0.0000E+00 | 0.0000E+00 | 0.0000E+00 |
| S7 | 1.0638E-02 | -1.3232E-03 | 00000E+00 | 0.0000E+00 | 0.0000E+00 | 0.0000E+00 |
| S8 | -2.0785E-03 | 2.0964E-04 | 0.0000E+00 | 0.0000E+00 | 0.0000E+00 | 0.0000E+00 |
| S9 | -4.0488E-03 | 3.7420E-04 | 0.0000E+00 | 0.0000E+00 | 0.0000E+00 | 0.0000E+00 |
| S10 | 2.4891E-05 | -1.1177E-05 | 0.0000E+00 | 0.0000E+00 | 0.0000E+00 | 0.0000E+00 |
| S11 | 7.1169E-04 | -8.8299E-05 | 4.3913E-06 | 0.0000E+00 | 0.0000E+00 | 0.0000E+00 |
| S12 | 8.3601E-05 | -7.2480E-06 | 2.6846E-07 | 0.0000E+00 | 0.0000E+00 | 0.0000E+00 |
| S13 | -4.6749E-18 | 1.3521E-19 | 0.0000E+00 | 0.0000E+00 | 0.0000E+00 | 0.0000E+00 |
| S14 | 2.8494E-18 | -8.0445E-20 | 0.0000E+00 | 0.0000E+00 | 0.0000E+00 | 0.0000E+00 |
| S15 | 2.4617E-05 | -1.5799E-07 | 5.8599E-09 | -9.5297E-11 | 0.0000E+00 | 0.0000E+00 |
| S16 | 7.7093E-08 | -1.1933E-09 | 0.0000E+00 | 0.0000E+00 | 0.0000E+00 | 0.0000E+00 |
| S17 | 1.6333E-07 | -5.7771E-09 | 1.2916E-10 | -1.5383E-12 | 3.8546E-15 | 7.0503E-17 |
| S18 | 6.5099E-08 | -2.6643E-09 | 7.5794E-11 | -1.4220E-12 | 1.5803E-14 | -7.8728E-17 |

Figures 12A, 12B:
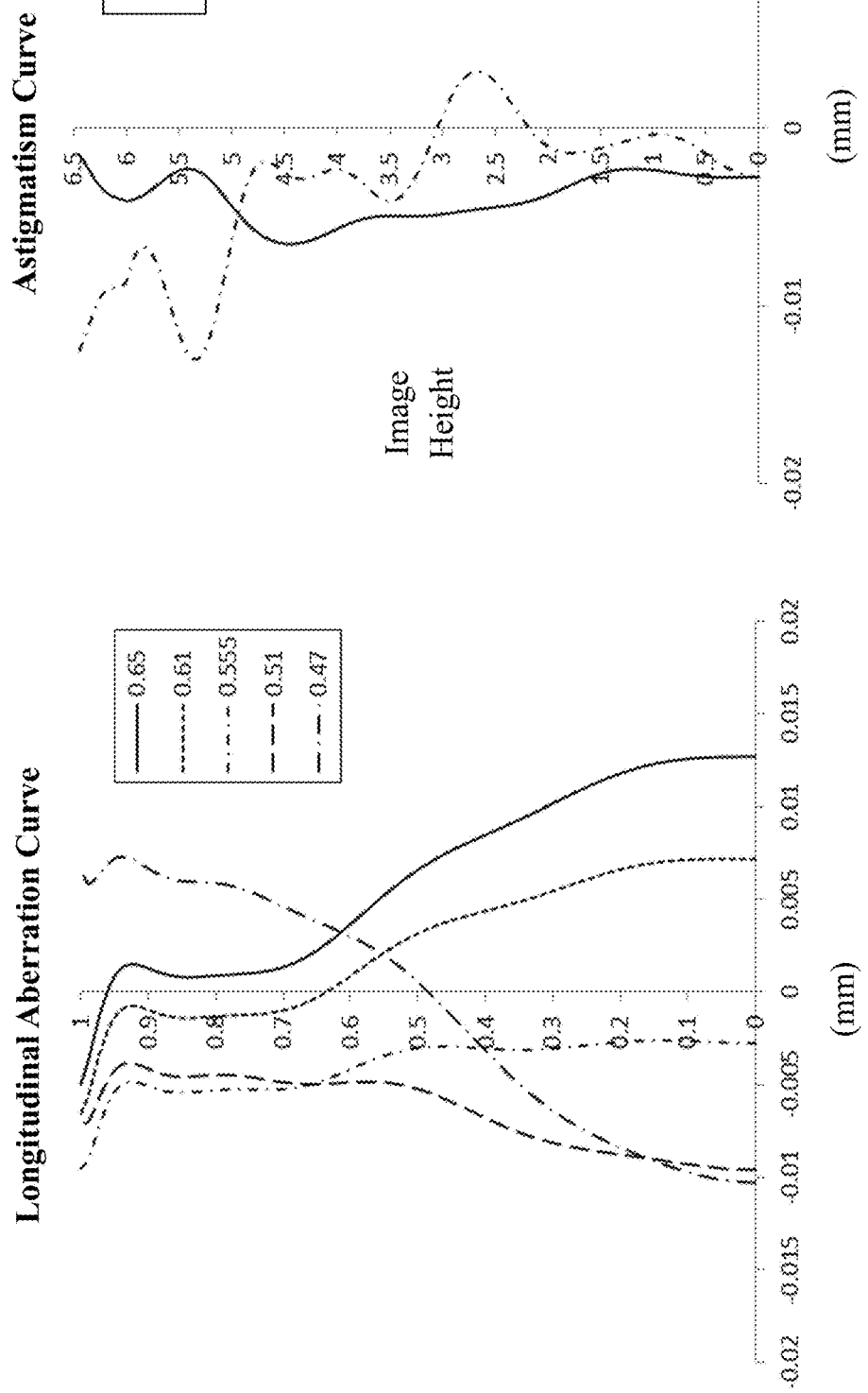
FIGS. 12A to 12D show a longitudinal aberration curve, astigmatism curve, distortion curve and lateral color curve of the optical camera system according to Embodiment 6, respectively.
Figure 12D:
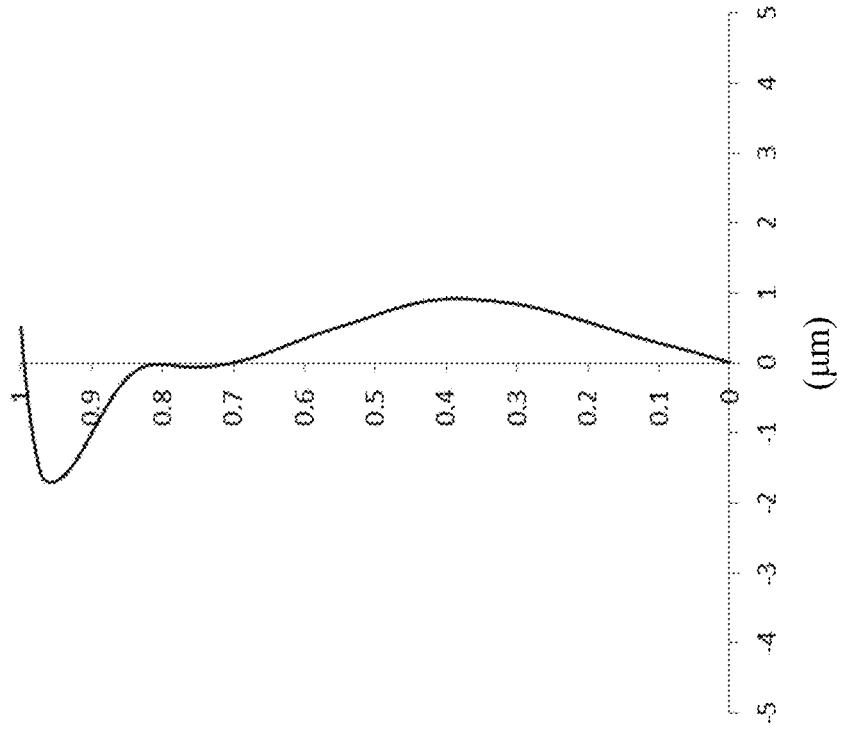
Figure 12C:
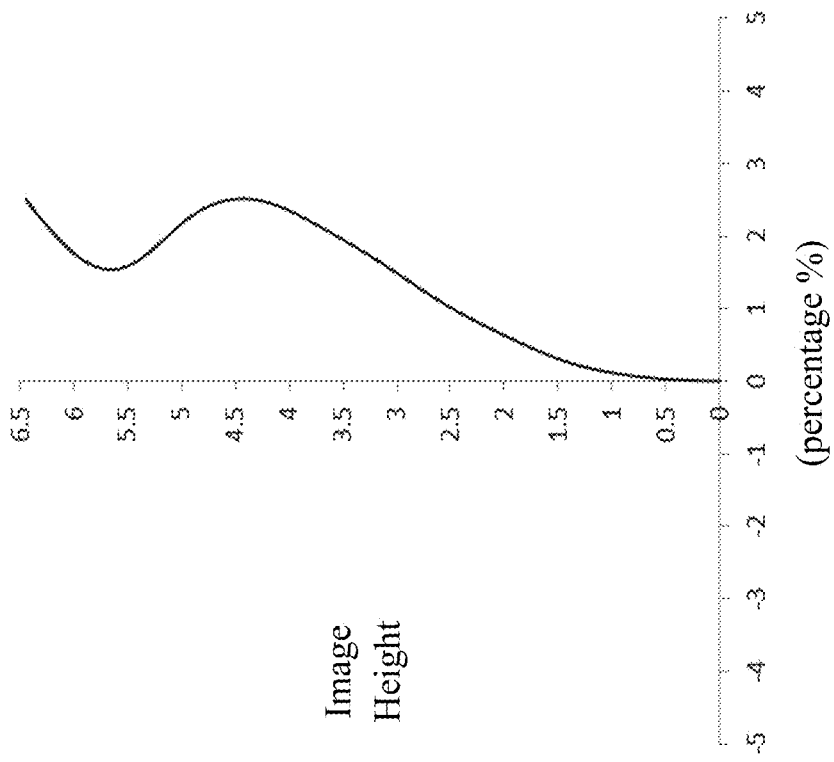

FIG. 12A shows a longitudinal aberration curve of the optical camera system according to Embodiment 6, which represents the deviation of the converged focal point after light of different wavelengths passes through the camera lens. FIG. 12B shows an astigmatism curve of the optical camera system according to Embodiment 6, which represents the curvature of the tangential image plane and the curvature of the sagittal image plane. FIG. 12C shows a distortion curve of the optical camera system according to Embodiment 6, which represents distortion magnitude values corresponding to different image heights. FIG. 12D shows a lateral color curve of the optical camera system according to Embodiment 6, which represents the deviation of different image heights on the imaging plane after light passes through the camera lens. According to FIGS. 12A to 12D, it can be seen that the optical camera system given in Embodiment 6 can achieve good imaging quality.

Embodiment 7

Figure 13:
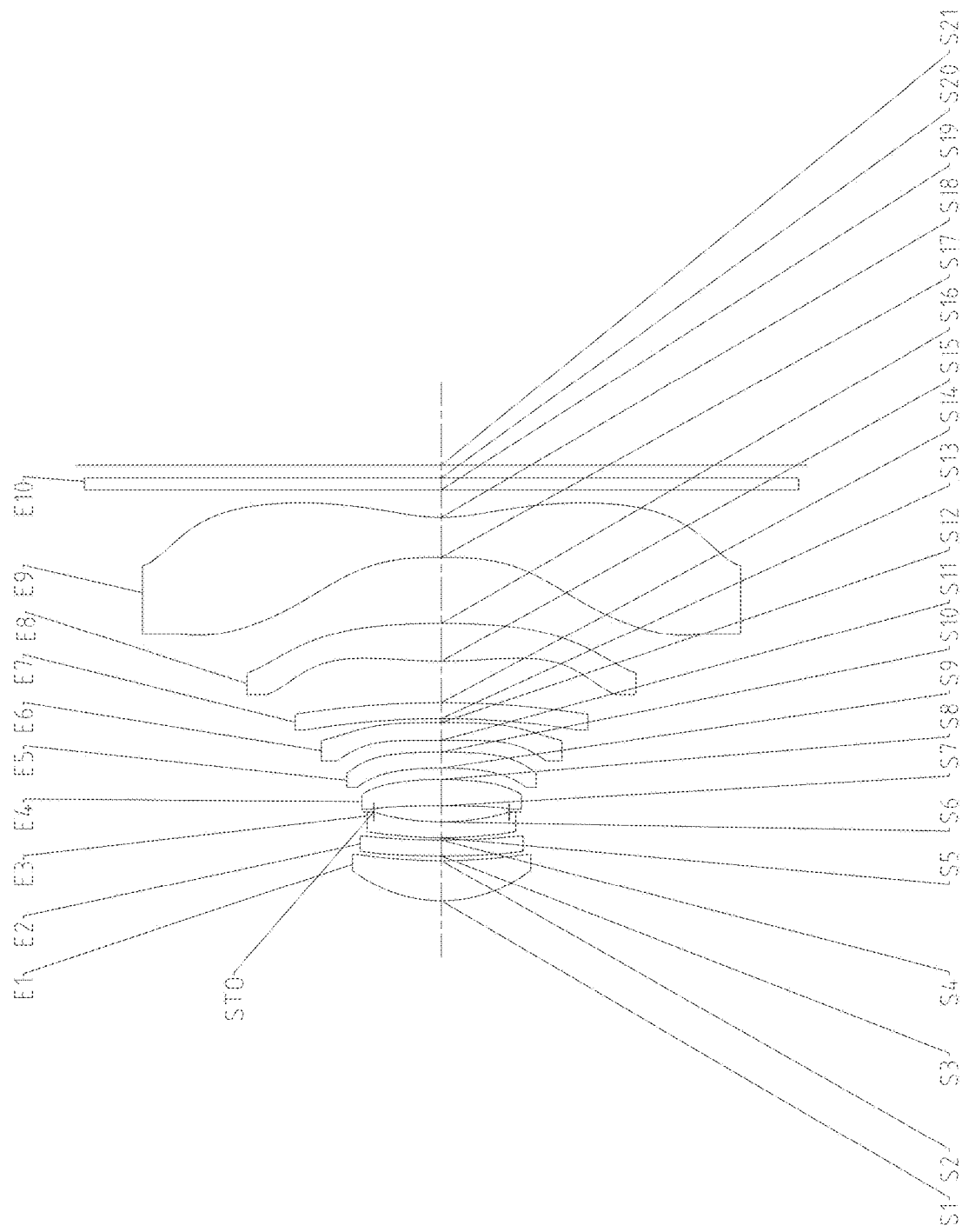
FIG. 13 shows a schematic structural diagram of an optical camera system according to Embodiment 7 of the present application.
Figure 14B:
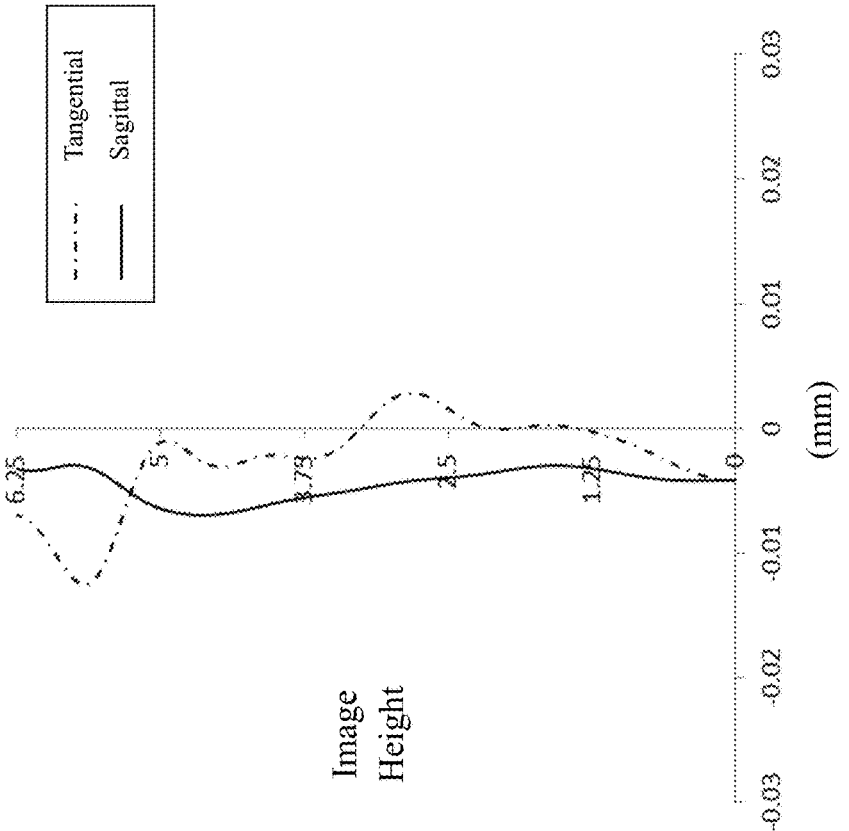
FIGS. 14A to 14D show a longitudinal aberration curve, astigmatism curve, distortion curve and lateral color curve of the optical camera system according to Embodiment 7, respectively.
Figure 14A:
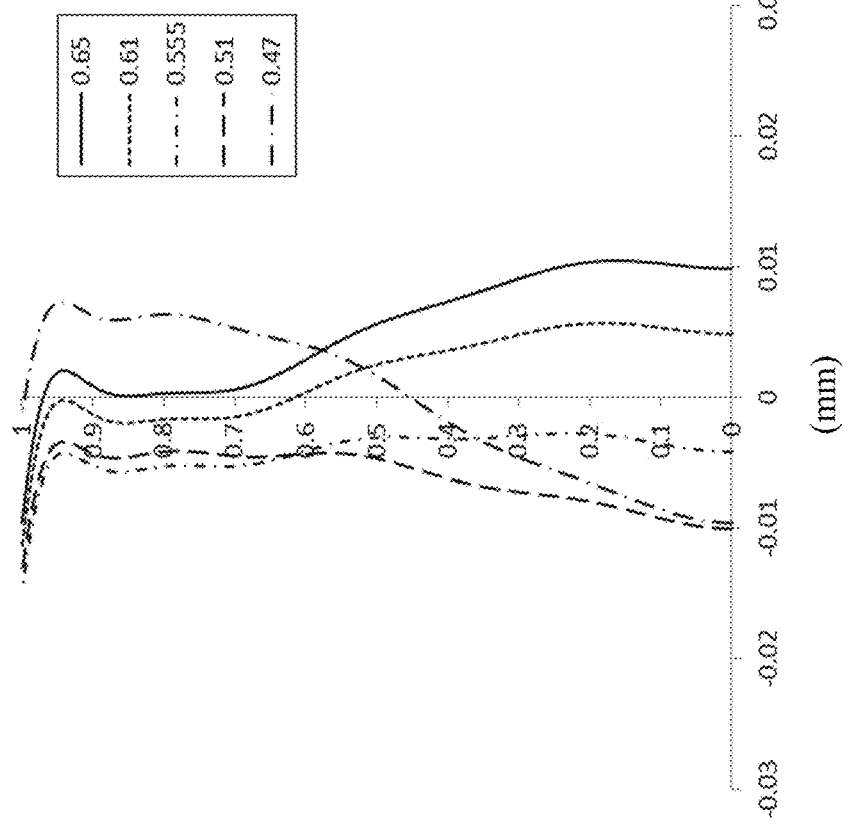
Figure 14D:
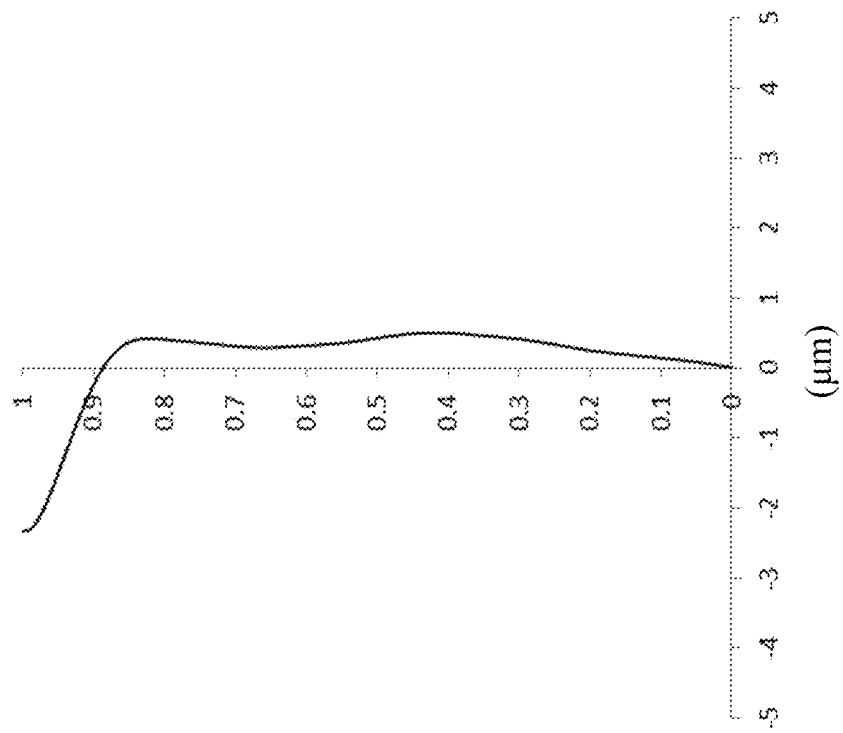

An optical camera system according to Embodiment 7 of the present application will be described below with reference to FIGS. 13 to 14D, FIG. 13 shows a schematic structural diagram of the optical camera system according to Embodiment 7 of the present application.

As shown in FIG. 13, the optical camera system includes a first lens E1, a second lens E2, a third lens E3, a diaphragm STO, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power and has a convex object side surface S1 and a concave image side surface S2. The second lens E2 has a positive refractive power, and has a convex object side surface S3 and a concave image side surface S4. The third lens E3 has a negative refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a concave object side surface S9 and a convex image side surface S1. The sixth lens E6 has a positive refractive power, and has a convex object side surface S11 and a concave image side surface S12. The seventh lens E7 has a negative refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 6.46 mm, a total length TTL of the optical camera system is 7.69 mm, a half ImgH of a diagonal length of an effective pixel region on the imaging plane S21 of the optical camera system is 6.25 mm, and the maximum field of view FOV of the optical camera system is 86.84°.

Table 13 shows a table of basic parameters of the optical camera system of Embodiment 7, wherein the units of the radius of curvature, thickness/distance, and focal length are all millimeters (mm). Tables 14-1 and 14-2 show higher-order coefficients of each of aspheric lens surfaces that are applicable in Embodiment 7, wherein the surface shape of each aspheric surface can be defined by formula (1) given in Embodiment 1 described above.

TABLE 13

| Surface No. | Surface type | Radius of curvature | Thickness/distance | Material Refractive index | Abbe number | Focal length | Conic coefficient |
|---|---|---|---|---|---|---|---|
| OBJ | Spherical | Infinity | Infinity | | | | |
| S1 | Aspherical | 2.5200 | 0.7135 | 1.55 | 56.1 | 6.28 | −1.3395 |
| S2 | Aspherical | 8.5430 | 0.0846 | | | | −6.8398 |
| S3 | Aspherical | 16.5433 | 0.2800 | 1.67 | 20.4 | 307.19 | 85.7710 |
| S4 | Aspherical | 17.8776 | 0.0400 | | | | 96.5424 |
| S5 | Aspherical | 6.6628 | 0.2800 | 1.68 | 19.2 | −16.46 | 4.0006 |
| S6/STO | Aspherical | 4.1002 | 0.2823 | | | | −1.0841 |
| S7 | Aspherical | −54.9508 | 0.4648 | 1.55 | 56.1 | 14.43 | 99.0000 |
| S8 | Aspherical | −6.9105 | 0.2035 | | | | 10.1361 |
| S9 | Aspherical | −6.4949 | 0.2800 | 1.67 | 20.4 | −19.53 | −6.1638 |
| S10 | Aspherical | −13.2028 | 0.2043 | | | | −15.8405 |
| S11 | Aspherical | 27.4738 | 0.3117 | 1.64 | 23.5 | 46.20 | −56.3597 |
| S12 | Aspherical | 360.3856 | 0.0726 | | | | 99.0000 |
| S13 | Aspherical | −14.5000 | 0.2800 | 1.64 | 23.5 | −196.69 | 11.4201 |
| S14 | Aspherical | −16.5000 | 0.7305 | | | | 12.7914 |
| S15 | Aspherical | 8.4457 | 0.6737 | 1.55 | 56.1 | 10.30 | 4.2011 |
| S16 | Aspherical | −16.3492 | 1.1639 | | | | −3.1731 |
| S17 | Aspherical | −15.0404 | 0.7034 | 1.54 | 55.7 | −4.50 | 4.7225 |
| S18 | Aspherical | 2.9201 | 0.4844 | | | | −10.3455 |
| S19 | Spherical | Infinity | 0.2100 | 1.52 | 64.2 | | |
| S20 | Spherical | Infinity | 0.2244 | | | | |
| S21 | Spherical | Infinity | | | | | |

TABLE 14-1

| Surface No. | A4 | A6 | A8 | A10 | A12 | A14 | A16 |
|---|---|---|---|---|---|---|---|
| S1 | 9.5987E−03 | 1.6217E−03 | −3.3093E−03 | 5.4756E−03 | −5.5524E−03 | 3.4903E−03 | −1.3189E−03 |
| S2 | −9.7878E−03 | 6.2680E−04 | 6.4059E−03 | −8.4334E−03 | 1.0081E−02 | −8.3753E−03 | 4.0194E−03 |
| S3 | 1.2058E−03 | −3.5523E−04 | −3.7069E−03 | 1.3911E−02 | −1.6383E−02 | 9.6610E−03 | −3.2582E−03 |
| S4 | 2.5459E−02 | −4.9082E−02 | 6.0291E−02 | −5.1270E−02 | 3.3283E−02 | −1.9898E−02 | 1.0172E−02 |
| S5 | −1.0445E−02 | −4.2818E−02 | 5.7189E−02 | −3.5468E−02 | 6.8049E−03 | 5.7239E−03 | −3.9627E−03 |
| S6 | −8.9923E−03 | 5.0313E−03 | −2.0239E−02 | 7.2962E−02 | −1.2027E−01 | 1.1620E−01 | −6.6322E−02 |
| S7 | −1.0125E−02 | −3.8148E−03 | −1.5798E−02 | 5.1421E−02 | −8.9012E−02 | 8.9732E−02 | −5.2736E−02 |
| S8 | −8.9194E−03 | −1.3872E−02 | 2.2508E−02 | −2.5579E−02 | 2.1408E−02 | −1.2632E−02 | 4.8828E−03 |
| S9 | −1.1897E−02 | −3.9534E−02 | 5.1523E−02 | −5.6230E−02 | 4.6306E−02 | −2.6634E−02 | 9.7546E−03 |
| S10 | −1.7718E−02 | −1.9881E−02 | 1.7003E−02 | −7.7221E−03 | −1.4867E−03 | 3.7303E−03 | −1.9931E−03 |
| S11 | −5.1436E−02 | 2.0195E−02 | −2.2151E−02 | 2.4870E−02 | −2.1240E−02 | 1.1851E−02 | −4.2103E−03 |
| S12 | −4.7653E−02 | 2.0484E−02 | −1.4301E−02 | 1.0938E−02 | −6.4487E−03 | 2.5419E−03 | −6.3017E−04 |
| S13 | −1.4782E−12 | −1.3308E−14 | 1.6103E−14 | −1.0354E−14 | 3.8864E−15 | −8.7559E−16 | 1.1577E−16 |
| S14 | 5.3117E−13 | 1.1234E−14 | −1.3906E−14 | 8.4540E−15 | −2.9724E−15 | 6.2811E−16 | −7.8743E−17 |
| S15 | −2.0150E−02 | 5.3130E−03 | −4.8064E−03 | 2.5222E−03 | −8.4167E−04 | 1.9123E−04 | −3.0419E−05 |
| S16 | −7.4892E−03 | 4.1679E−03 | −3.2898E−03 | 1.1983E−03 | −2.3816E−04 | 2.7637E−05 | −1.8705E−06 |
| S17 | −6.7731E−02 | 2.8063E−02 | −9.1585E−03 | 2.1623E−03 | −3.4640E−04 | 3.7919E−05 | −2.8803E−06 |
| S18 | −3.2109E−02 | 1.3186E−02 | −3.9618E−03 | 8.4479E−04 | −1.2846E−04 | 1.4064E−05 | −1.1155E−06 |

TABLE 14-2

| Surface No. | A18 | A20 | A22 | A24 | A26 | A28 |
|---|---|---|---|---|---|---|
| S1 | 2.7573E−04 | −24684E−05 | 0.0000E+00 | 0.0000E+00 | 0.0000E+00 | 0.0000E+00 |
| S2 | −1.0114E−03 | 1.0312E−04 | 0.0000E+00 | 0.0000E+00 | 0.0000E+00 | 0.0000E+00 |
| S3 | 6.3393E−04 | −5.9499E−05 | 0.0000E+00 | 0.0000E+00 | 0.0000E+00 | 0.0000E+00 |
| S4 | −3.1754E−03 | 4.0877E−04 | 0.0000E+00 | 0.0000E+00 | 0.0000E+00 | 0.0000E+00 |
| S5 | 9.2889E−04 | −81195E−05 | 0.0000E+00 | 0.0000E+00 | 0.0000E+00 | 0.0000E+00 |

TABLE 14-2-continued

| Surface No. | A18 | A20 | A22 | A24 | A26 | A28 |
|---|---|---|---|---|---|---|
| S6 | 2.0662E−02 | −2.6919E−03 | 0.0000E+00 | 0.0000E+00 | 0.0000E+00 | 0.0000E+00 |
| S7 | 1.6649E−02 | −2.1515E−03 | 0.0000E+00 | 0.0000E+00 | 0.0000E+00 | 0.0000E+00 |
| S8 | −1.1116E−03 | 1.1014E−04 | 0.0000E+00 | 0.0000E+00 | 0.0000E+00 | 0.0000E+00 |
| S9 | −2.0373E−03 | 1.8469E−04 | 0.0000E+00 | 0.0000E+00 | 0.0000E+00 | 0.0000E+00 |
| S10 | 4.8675E−04 | −4.5599E−05 | 0.0000E+00 | 0.0000E+00 | 0.0000E+00 | 0.0000E+00 |
| S11 | 9.1562E−04 | −1.0387E−04 | 5.2440E−06 | 0.0000E+00 | 0.0000E+00 | 0.0000E+00 |
| S12 | 9.4307E−05 | −7.7984E−06 | 2.7290E−07 | 0.0000E+00 | 0.0000E+00 | 0.0000E+00 |
| S13 | −8.1912E−18 | 2.3520E−19 | 0.0000E+00 | 0.0000E+00 | 0.0000E+00 | 0.0000E+00 |
| S14 | 5.3984E−18 | −1.5594E−19 | 0.0000E+00 | 0.0000E+00 | 0.0000E+00 | 0.0000E+00 |
| S15 | 3.3312E−06 | −2.3663E−07 | 9.7159E−09 | −1.7397E−10 | 0.0000E+00 | 0.0000E+00 |
| S16 | 6.8543E−03 | −1.0521E−09 | 0.0000E+00 | 0.0000E+00 | 0.0000E+00 | 0.0000E+00 |
| S17 | 1.5241E−07 | −5.5393E−09 | 1.3278E−10 | −1.9192E−12 | 1.3464E−14 | −1.7849E−17 |
| S18 | 6.3997E−08 | −2.6235E−09 | 7.4788E−11 | −1.4061E−12 | 1.5655E−14 | −7.3120E−17 |

Figure 14C:
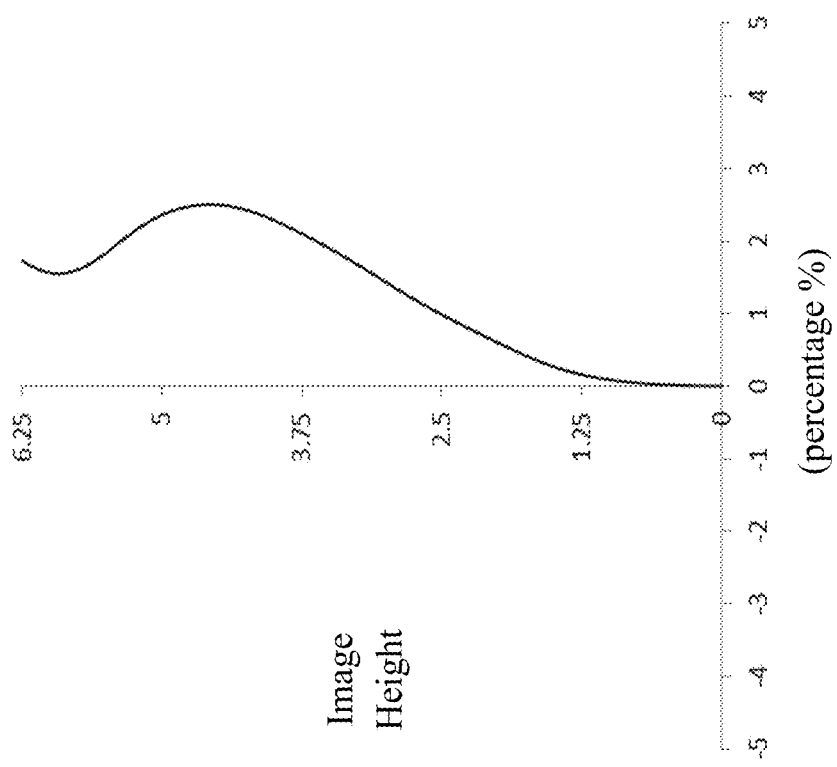

FIG. 14A shows a longitudinal aberration curve of the optical camera system according to Embodiment 7, which represents the deviation of the converged focal point after light of different wavelengths passes through the camera lens. FIG. 14B shows an astigmatism curve of the optical camera system according to Embodiment 7, which represents the curvature of the tangential image plane and the curvature of the sagittal image plane. FIG. 14C shows a distortion curve of the optical camera system according to Embodiment 7, which represents distortion magnitude values corresponding to different image heights. FIG. 14D shows a lateral color curve of the optical camera system according to Embodiment 7, which represents the deviation of different image heights on the imaging plane after light passes through the camera lens. According to FIGS. 14A to 14D, it can be seen that the optical camera system given in Embodiment 7 can achieve good imaging quality.

Embodiment 8

Figure 15:
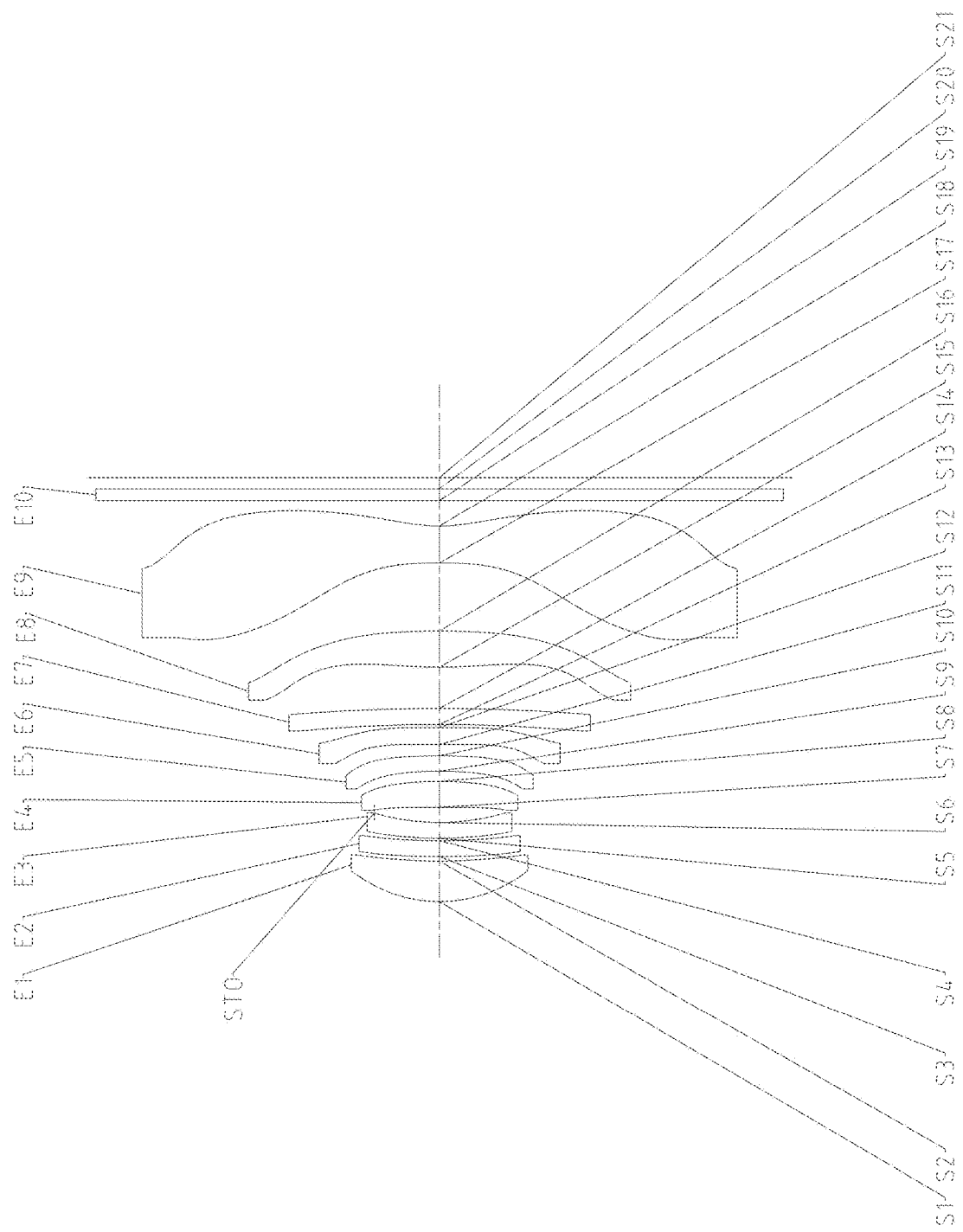
FIG. 15 shows a schematic structural diagram of an optical camera system according to Embodiment 8 of the present application.

An optical camera system according to Embodiments of the present application will be described below with reference to FIGS. 15 to 18D. FIG. 15 shows a schematic structural diagram of the optical camera system according to Embodiment 8 of the present application.

As shown in FIG. 15, the optical camera system includes a first lens E1, a second lens E2, a third lens E3, a diaphragm STO, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a negative refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a concave object side surface S9 and a convex image side surface S10. The sixth lens E6 has a positive refractive power, and has a convex object side surface S11 and a concave image side surface S12. The seventh lens E7 has a negative refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 8.26 mm, a total length TTL of the optical camera system is 7.50 mm, a half ImgH of a diagonal length of an effective pixel region on the imaging plane S21 of the optical camera system is 6.25 mm, and the maximum field of view FOV of the optical camera system is 88.20°.

Table 15 shows a table of basic parameters of the optical camera system of Embodiment 8, wherein the units of the radius of curvature, thickness/distance, and focal length are all millimeters (mm). Tables 16-1 and 16-2 show higher-order coefficients of each of aspheric lens surfaces that are applicable in Embodiment 8, wherein the surface shape of each aspheric surface can be defined by formula (1) given in Embodiment 1 described above.

TABLE 15

| Surface No. | Surface type | Radius of curvature | Thickness/ distance | Material Refractive index | Material Abbe number | Focal length | Conic coefficient |
|---|---|---|---|---|---|---|---|
| OBJ | Spherical | Infinity | Infinity | | | | |
| S1 | Aspherical | 2.4975 | 0.7139 | 1.55 | 56.1 | 6.23 | −1.3309 |
| S2 | Aspherical | 8.4383 | 0.0813 | | | | −8.3935 |
| S3 | Aspherical | 15.9962 | 0.2800 | 1.67 | 20.4 | −338.90 | 86.0926 |
| S4 | Aspherical | 14.8327 | 0.0400 | | | | 92.9886 |
| S5 | Aspherical | 6.0165 | 0.2800 | 1.68 | 19.2 | −17.96 | 3.9992 |
| S6/STO | Aspherical | 3.9506 | 0.2675 | | | | −1.0835 |
| S7 | Aspherical | −59.4619 | 0.4564 | 1.55 | 56.1 | 14.72 | −99.0000 |
| S8 | Aspherical | −7.0986 | 0.1811 | | | | 10.1361 |
| S9 | Aspherical | −7.1342 | 0.2800 | 1.67 | 20.4 | −20.73 | −6.5526 |

TABLE 15-continued

| Surface No. | Surface type | Radius of curvature | Thickness/ distance | Material Refractive index | Abbe number | Focal length | Conic coefficient |
|---|---|---|---|---|---|---|---|
| S10 | Aspherical | −14.9996 | 0.1977 | | | | −16.3029 |
| S11 | Aspherical | 19.4727 | 0.3019 | 1.64 | 23.5 | 48.00 | −74.1390 |
| S12 | Aspherical | 52.3778 | 0.0556 | | | | 46.9881 |
| S13 | Aspherical | −26.5493 | 0.2800 | 1.64 | 23.5 | −206.12 | −8.0421 |
| S14 | Aspherical | −33.3306 | 0.7305 | | | | 36.4980 |
| S15 | Aspherical | 8.4641 | 0.6375 | 1.55 | 56.1 | 9.70 | 4.2560 |
| S16 | Aspherical | −13.7562 | 1.2008 | | | | −4.5676 |
| S17 | Aspherical | −15.0558 | 0.6528 | 1.54 | 55.7 | −4.34 | 4.5611 |
| S18 | Aspherical | 2.8008 | 0.4565 | | | | −10.0542 |
| S19 | Spherical | Infinity | 0.2100 | 1.52 | 64.2 | | |
| S20 | Spherical | Infinity | 0.1964 | | | | |
| S21 | Spherical | Infinity | | | | | |

TABLE 16-1

| Surface No. | A4 | A6 | A8 | A10 | A12 | A14 | A16 |
|---|---|---|---|---|---|---|---|
| S1 | 9.7415E−03 | 9.9772E−04 | −9.5243E−04 | 9.4157E−04 | −5.5600E−04 | 2.3322E−04 | −6.7287E−05 |
| S2 | −9.3733E−03 | −3.5803E−03 | 1.1999E−02 | −8.6393E−03 | 4.1570E−03 | −2.1390E−03 | 1.0311E−03 |
| S3 | 2.8850E−03 | −6.3151E−03 | 2.6820E−03 | 1.8788E−02 | −3.4675E−02 | 2.8744E−02 | −1.3293E−02 |
| S4 | 3.0645E−02 | −7.1168E−02 | 1.0914E−01 | −1.1720E−01 | 8.7452E−02 | −4.6334E−02 | 1.7318E−02 |
| S5 | 2.5834E−03 | −6.5573E−02 | 1.2090E−01 | −1.5103E−01 | 1.4332E−01 | −9.7535E−02 | 4.4391E−02 |
| S6 | −8.4402E−03 | 7.4049E−04 | −4.5238E−03 | 3.5340E−02 | −6.5352E−02 | 6.7674E−02 | −4.0817E−02 |
| S7 | −8.6529E−03 | −1.0150E−02 | 8.6927E−03 | −5.5693E−03 | −6.9639E−03 | 1.6031E−02 | −1.2968E−02 |
| S8 | −8.4139E−03 | −2.1964E−02 | 2.3941E−02 | −2.1154E−02 | 1.2663E−02 | −5.5195E−03 | 1.7225E−03 |
| S9 | −9.1593E−03 | −4.8009E−02 | 6.6618E−02 | −7.5962E−02 | 6.5960E−02 | −4.0254E−02 | 1.5623E−02 |
| S10 | −1.6296E−02 | −2.4869E−02 | 2.6139E−02 | −1.9137E−02 | 7.9362E−03 | −1.2248E−03 | −4.2024E−04 |
| S11 | −5.1573E−02 | 1.6722E−02 | −1.1411E−02 | 1.0322E−02 | −1.0050E−02 | 6.4498E−03 | −2.5229E−03 |
| S12 | −4.9122E−02 | 2.0932E−02 | −1.2278E−02 | 8.2878E−03 | −4.9511E−03 | 2.0937E−03 | −5.6118E−04 |
| S13 | −1.4830E−12 | 2.0623E−15 | −3.2848E−15 | 2.5090E−15 | −1.0884E−15 | 2.8325E−16 | −4.3813E−17 |
| S14 | 4.7796E−13 | 7.8672E−16 | −4.0157E−16 | −2.4977E−16 | 2.2613E−16 | −7.2560E−17 | 1.1811E−17 |
| S15 | −1.9210E−02 | 4.4164E−03 | −4.5337E−03 | 2.5311E−03 | −8.5205E−04 | 1.9437E−04 | −3.0110E−05 |
| S16 | −5.1949E−03 | 2.8253E−03 | −3.0357E−03 | 1.2349E−03 | −2.6194E−04 | 3.1830E−05 | −2.2448E−06 |
| S17 | −6.9378E−02 | 2.9114E−02 | −9.6105E−03 | 2.2973E−03 | −3.7273E−04 | 4.1352E−05 | −3.1871E−06 |
| S18 | −3.3486E−02 | 1.4255E−02 | −4.4004E−03 | 9.6374E−04 | −1.5063E−04 | 1.6962E−05 | −1.3340E−06 |

TABLE 16-2

| Surface No. | A18 | A20 | A22 | A24 | A26 | A28 |
|---|---|---|---|---|---|---|
| S1 | 1.5009E−05 | −2.0588E−06 | 0.0000E+00 | 0.0000E+00 | 0.0000E+00 | 0.0000E+00 |
| S2 | −3.0943E−04 | 3.8707E−05 | 0.0000E+00 | 0.0000E+00 | 0.0000E+00 | 0.0000E+00 |
| S3 | 3.3320E−03 | −3.5400E−04 | 0.0000E+00 | 0.0000E+00 | 0.0000E+00 | 0.0000E+00 |
| S4 | −4.0579E−03 | 4.3101E−04 | 0.0000E+00 | 0.0000E+00 | 0.0000E+00 | 0.0000E+00 |
| S5 | −1.1802E−02 | 1.3511E−03 | 0.0000E+00 | 0.0000E+00 | 0.0000E+00 | 0.0000E+00 |
| S6 | 1.3345E−02 | −1.8133E−03 | 0.0000E+00 | 0.0000E+00 | 0.0000E+00 | 0.0000E+00 |
| S7 | 4.9731E−03 | −7.2758E−04 | 0.0000E+00 | 0.0000E+00 | 0.0000E+00 | 0.0000E+00 |
| S8 | −3.4556E−04 | 3.0515E−05 | 0.0000E+00 | 0.0000E+00 | 0.0000E+00 | 0.0000E+00 |
| S9 | −3.4221E−03 | 3.2035E−04 | 0.0000E+00 | 0.0000E+00 | 0.0000E+00 | 0.0000E+00 |
| S10 | 2.1498E−04 | −2.6036E−05 | 0.0000E+00 | 0.0000E+00 | 0.0000E+00 | 0.0000E+00 |
| S11 | 5.7904E−04 | −6.9257E−05 | 3.1249E−06 | 0.0000E+00 | 0.0000E+00 | 0.0000E+00 |
| S12 | 9.0537E−05 | −8.0600E−06 | 3.0335E−07 | 0.0000E+00 | 0.0000E+00 | 0.0000E+00 |
| S13 | 3.7096E−18 | −1.3222E−19 | 0.0000E+00 | 0.0000E+00 | 0.0000E+00 | 0.0000E+00 |
| S14 | −9.7437E−19 | 3.2364E−20 | 0.0000E+00 | 0.0000E+00 | 0.0000E+00 | 0.0000E+00 |
| S15 | 3.1792E−06 | −2.1702E−07 | 8.5590E−09 | −1.4722E−10 | 0.0000E+00 | 0.0000E+00 |
| S16 | 8.5243E−08 | −1.3533E−09 | 0.0000E+00 | 0.0000E+00 | 0.0000E+00 | 0.0000E−00 |
| S17 | 1.7148E−07 | −6.3637E−09 | 1.5710E−10 | −2.3872E−12 | 1.8781E−14 | −4.5155E−17 |
| S18 | 8.1664E−08 | −3.4421E−09 | 1.0086E−10 | −1.9487E−12 | 2.2298E−14 | −1.1437E−16 |

Figure 16D:
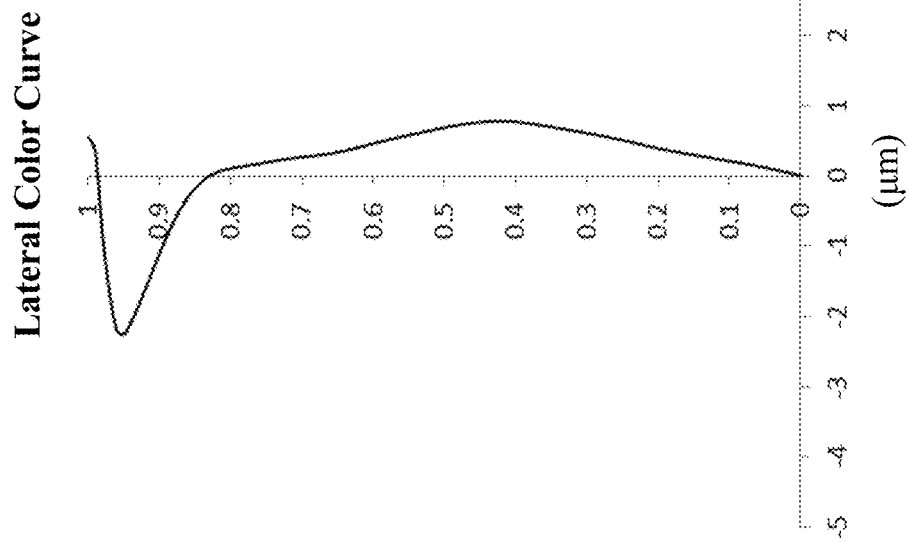
Figure 16C:
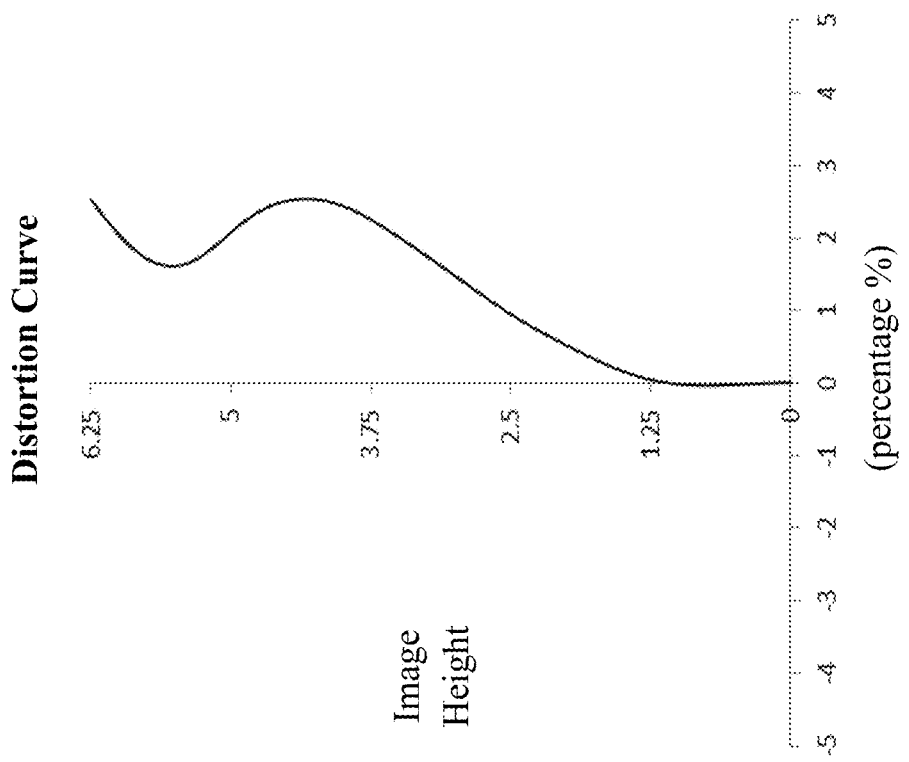

FIG. 16A shows a longitudinal aberration curve of the optical camera system according to Embodiment 8, which represents the deviation of the converged focal point after light of different wavelengths passes through the camera lens. FIG. 16B shows an astigmatism curve of the optical camera system according to Embodiment 8, which represents the curvature of the tangential image plane and the curvature of the sagittal image plane. FIG. 16C shows a distortion curve of the optical camera system according to Embodiment 8, which represents distortion magnitude values corresponding to different image heights. FIG. 16D shows a lateral color curve of the optical camera system according to Embodiment 8, which represents the deviation of different image heights on the imaging plane after light passes through the camera lens. According to FIGS. 16A to 16D, it can be seen that the optical camera system given in Embodiment 8 can achieve good imaging quality.

Embodiment 9

Figure 17:
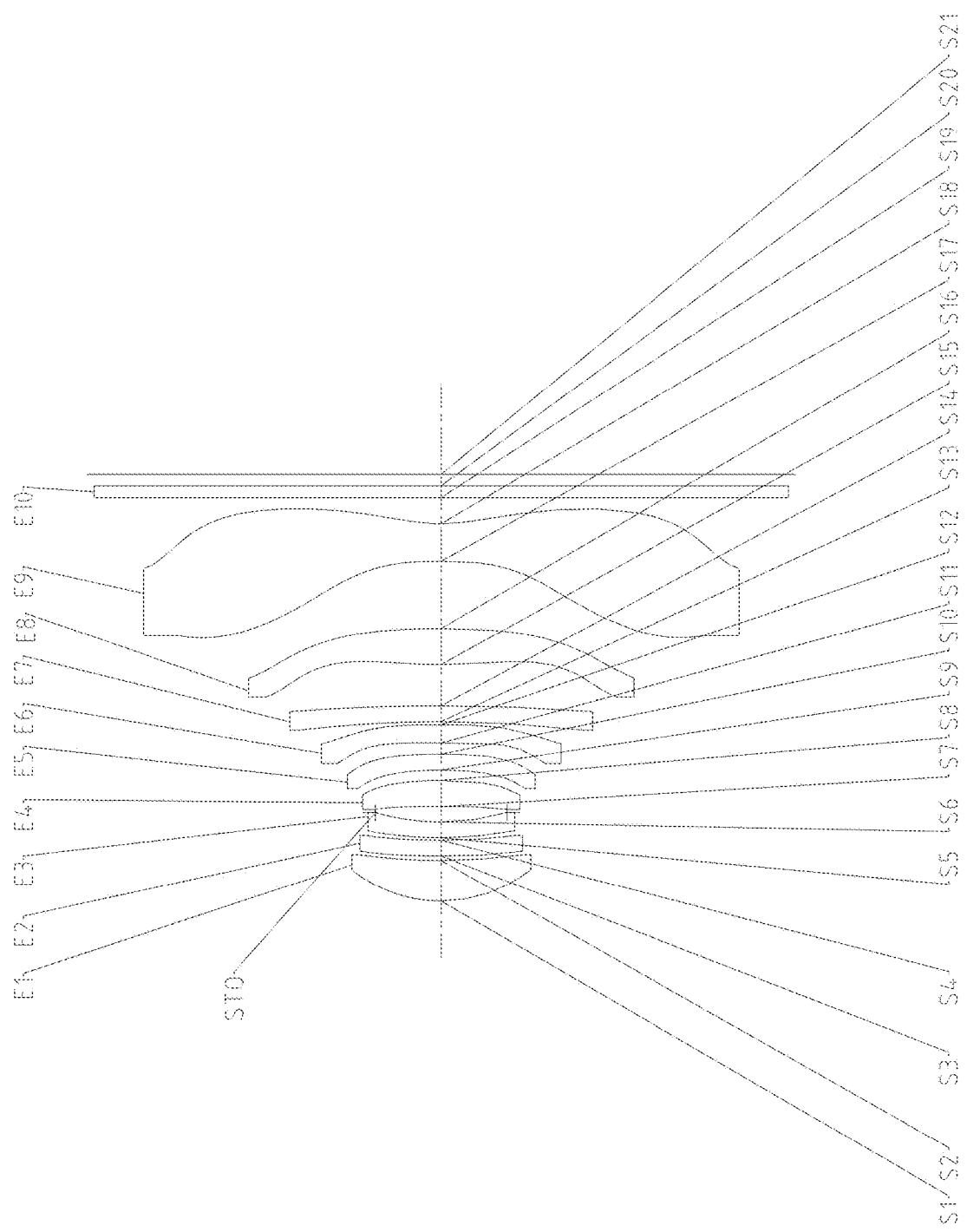
FIG. 17 shows a schematic structural diagram of an optical camera system according to Embodiment 9 of the present application.

An optical camera system according to Embodiments of the present application will be described below with reference to FIGS. 17 to 18D. FIG. 17 shows a schematic structural diagram of the optical camera system according to Embodiment 9 of the present application.

As shown in FIG. 17, the optical camera system includes a first lens E1, a second lens E2, a third lens E3, a diaphragm STO, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a negative refractive power, and has a convex object side surface S5 and a concave image side surface S6. The fourth lens E4 has a positive refractive power, and has a concave object side surface S7 and a convex image side surface S8. The fifth lens E5 has a negative refractive power, and has a concave object side surface S9 and a convex image side surface S10. The sixth lens E8 has a positive refractive power, and has a convex object side surface S11 and a convex image side surface S12. The seventh lens E7 has a negative refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 8.30 mm, a total length TTL of the optical camera system is 7.56 mm, a half ImgH of a diagonal length of an effective pixel region on the imaging plane S21 of the optical camera system is 8.25 mm, and the maximum field of view FOV of the optical camera system is 87.77°.

Table 17 shows a table of basic parameters of the optical camera system of Embodiment 9, wherein the units of the radius of curvature, thickness/distance, and focal length are all millimeters (mm). Tables 18-1 and 18-2 show higher-order coefficients of each of aspheric lens surfaces that are applicable in Embodiment 9, wherein the surface shape of each aspheric surface can be defined by formula (1) given in Embodiment 1 described above.

TABLE 17

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| S1 | Aspherical | 2.5072 | 0.7203 | 1.55 | 56.1 | 6.24 | −1.3364 |
| S2 | Aspherical | 8.5407 | 0.0819 | | | | −8.5183 |
| S3 | Aspherical | 16.3842 | 0.2800 | 1.67 | 20.4 | −368.79 | 86.4303 |
| S4 | Aspherical | 15.2543 | 0.0434 | | | | 92.1451 |
| S5 | Aspherical | 6.0871 | 0.2800 | 1.68 | 19.2 | −17.97 | 3.9483 |
| S6/STO | Aspherical | 3.9825 | 0.2711 | | | | −1.0672 |
| S7 | Aspherical | −52.5093 | 0.4628 | 1.55 | 56.1 | 14.53 | 98.7170 |
| S8 | Aspherical | −6.9110 | 0.1839 | | | | 10.1361 |
| S9 | Aspherical | −6.6478 | 0.2800 | 1.67 | 20.4 | −20.14 | −6.1545 |
| S10 | Aspherical | −13.4074 | 0.1982 | | | | −17.3422 |
| S11 | Aspherical | 27.9716 | 0.3213 | 1.64 | 23.5 | 34.00 | −99.0000 |
| S12 | Aspherical | −100.0000 | 0.0563 | | | | −99.0000 |
| S13 | Aspherical | −20.6684 | 0.2800 | 1.64 | 23.5 | −81.83 | −5.4807 |
| S14 | Aspherical | −34.2030 | 0.7305 | | | | 34.3023 |
| S15 | Aspherical | 8.4399 | 0.6425 | 1.55 | 56.1 | 9.97 | 4.2515 |
| S16 | Aspherical | −14.9021 | 1.1915 | | | | −5.4139 |
| S17 | Aspherical | −15.0129 | 0.6647 | 1.54 | 55.7 | −4.38 | 4.5607 |
| S18 | Aspherical | 2.8312 | 0.4621 | | | | −10.2102 |
| S19 | Spherical | Infinity | 0.2100 | 1.52 | 64.2 | | |
| S20 | Spherical | Infinity | 0.2020 | | | | |
| S21 | Spherical | Infinity | | | | | |

TABLE 18-1

| Surface No. | A4 | A6 | A8 | A10 | A12 | A14 | A16 |
|---|---|---|---|---|---|---|---|
| S1 | 9.1901E−03 | 3.2985E−03 | −7.0131E−03 | 1.0302E−02 | −9.4266E−03 | 5.4506E−03 | −1.9280E−03 |
| S2 | −9.5658E−03 | −3.1575E−03 | 1.2091E−02 | −9.9755E−03 | 6.4858E−03 | −4.1899E−03 | 1.9833E−03 |
| S3 | 3.2532E−03 | −7.9787E−03 | 7.6776E−03 | 9.0461E−03 | −2.2027E−02 | 1.8201E−02 | −8.0219E−03 |
| S4 | 3.1093E−02 | −7.3497E−02 | 1.1245E−01 | −1.1822E−01 | 8.6266E−02 | −4.5594E−02 | 1.7480E−02 |
| S5 | 3.0713E−03 | −6.4085E−02 | 1.0273E−01 | −9.3551E−02 | 5.1390E−02 | −1.2806E−02 | −1.3017E−03 |
| S6 | −7.6328E−03 | −2.5492E−03 | 1.9742E−03 | 2.6886E−02 | −5.6968E−02 | 6.1467E−02 | −3.7788E−02 |
| S7 | −9.2031E−03 | −9.5925E−03 | 8.0866E−03 | −9.3477E−03 | 3.1567E−03 | 5.7669E−03 | −7.8421E−03 |
| S8 | −8.3057E−03 | −1.9988E−02 | 1.7812E−02 | −1.3091E−02 | 5.1921E−03 | −9.0744E−06 | −9.8882E−04 |
| S9 | −9.8965E−03 | −4.2043E−02 | 5.4718E−02 | −6.4106E−02 | 5.7729E−02 | −3.5669E−02 | 1.3782E−02 |
| S10 | −1.7915E−02 | −2.0577E−02 | 2.2105E−02 | −1.8230E−02 | 9.0598E−03 | −2.2133E−03 | −7.6018E−05 |
| S11 | −5.3398E−02 | 2.3075E−02 | −2.5180E−02 | 2.8329E−02 | −2.5172E−02 | 1.4787E−02 | −5.5163E−03 |
| S12 | −4.7409E−02 | 1.9763E−02 | −1.2482E−02 | 9.0225E−03 | −5.3902E−03 | 2.2025E−03 | −5.6360E−04 |
| S13 | −1.4816E−12 | −4.4907E−15 | 6.1183E−15 | −3.9535E−15 | 1.3923E−15 | −2.7937E−16 | 3.1193E−17 |
| S14 | 4.9450E−13 | −3.6967E−15 | 3.2002E−15 | −1.8144E−15 | 6.2322E−16 | −1.3153E−16 | 1.6569E−17 |
| S15 | −1.9078E−02 | 4.2872E−03 | −4.4740E−03 | 2.5723E−03 | −9.1157E−04 | 2.1568E−04 | −3.5173E−05 |
| S16 | −5.2575E−03 | 2.5810E−03 | −2.7437E−03 | 1.1012E−03 | −2.2939E−04 | 2.7282E−05 | −1.8667E−06 |
| S17 | −6.9332E−02 | 2.9083E−02 | −9.5969E−03 | 2.2932E−03 | −3.7192E−04 | 4.1245E−05 | −3.1774E−06 |
| S18 | −3.3240E−02 | 1.4105E−02 | −4.3478E−03 | 9.5066E−04 | −1.4836E−04 | 1.6686E−05 | −1.3601E−06 |

TABLE 18-2

| Surface No. | A18 | A20 | A22 | A24 | A26 | A28 |
|---|---|---|---|---|---|---|
| S1 | 3.8210E−04 | −3.2711E−05 | 0.0000E+00 | 0.0000E+00 | 0.0000E+00 | 0.0000E+00 |
| S2 | −5.2386E−04 | 5.6264E−05 | 0.0000E+00 | 0.0000E+00 | 0.0000E+00 | 0.0000E+00 |
| S3 | 1.9130E−03 | −1.9674E−04 | 0.0000E+00 | 0.0000E+00 | 0.0000E+00 | 0.0000E+00 |
| S4 | −4.2583E−03 | 4.6872E−04 | 0.0000E+00 | 0.0000E+00 | 0.0000E+00 | 0.0000E+00 |
| S5 | 1.5765E−03 | −2.8615E−04 | 0.0000E+00 | 0.0000E+00 | 0.0000E+00 | 0.0000E+00 |
| S6 | 1.2513E−02 | −1.1171E−03 | 0.0000E+00 | 0.0000E+00 | 0.0000E+00 | 0.0000E+00 |
| S7 | 3.7351E−03 | −6.1496E−04 | 0.0000E+00 | 0.0000E+00 | 0.0000E+00 | 0.0000E+00 |
| S8 | 3.7861E−04 | −4.7519E−05 | 0.0000E+00 | 0.0000E+00 | 0.0000E+00 | 0.0000E+00 |
| S9 | −2.9931E−03 | 2.7348E−04 | 0.0000E+00 | 0.0000E+00 | 0.0000E+00 | 0.0000E+00 |
| S10 | 1.5702E−04 | −2.2184E−05 | 0.0000E+00 | 0.0000E+00 | 0.0000E+00 | 0.0000E+00 |
| S11 | 1.2510E−03 | −1.5464E−04 | 7.8034E−06 | 0.0000E+00 | 0.0000E+00 | 0.0000E+00 |
| S12 | 8.6012E−05 | −7.1379E−06 | 2.4532E−07 | 0.0000E+00 | 0.0000E+00 | 0.0000E+00 |
| S13 | −1.7252E−18 | 3.2794E−20 | 0.0000E+00 | 0.0000E+00 | 0.0000E−00 | 0.0000E+00 |
| S14 | −1.1381E−18 | 3.2696E−20 | 0.0000E+00 | 0.0000E+00 | 0.0000E+00 | 0.0000E+00 |
| S15 | 3.9011E−06 | −2.7860E−07 | 1.1461E−08 | −2.0535E−10 | 0.0000E+00 | 0.0000E+00 |
| S16 | 6.8470E−08 | −1.0430E−09 | 0.0000E+00 | 0.0000E+00 | 0.0000E+00 | 0.0000E+00 |
| S17 | 1.7087E−07 | −6.3360E−09 | 1.5622E−10 | −2.3681E−12 | 1.8520E−14 | −4.3457E−17 |
| S18 | 8.0181E−08 | −3.3771E−09 | 9.8891E−11 | −1.9098E−12 | 2.1846E−14 | −1.1204E−16 |

Figures 18A, 18B:
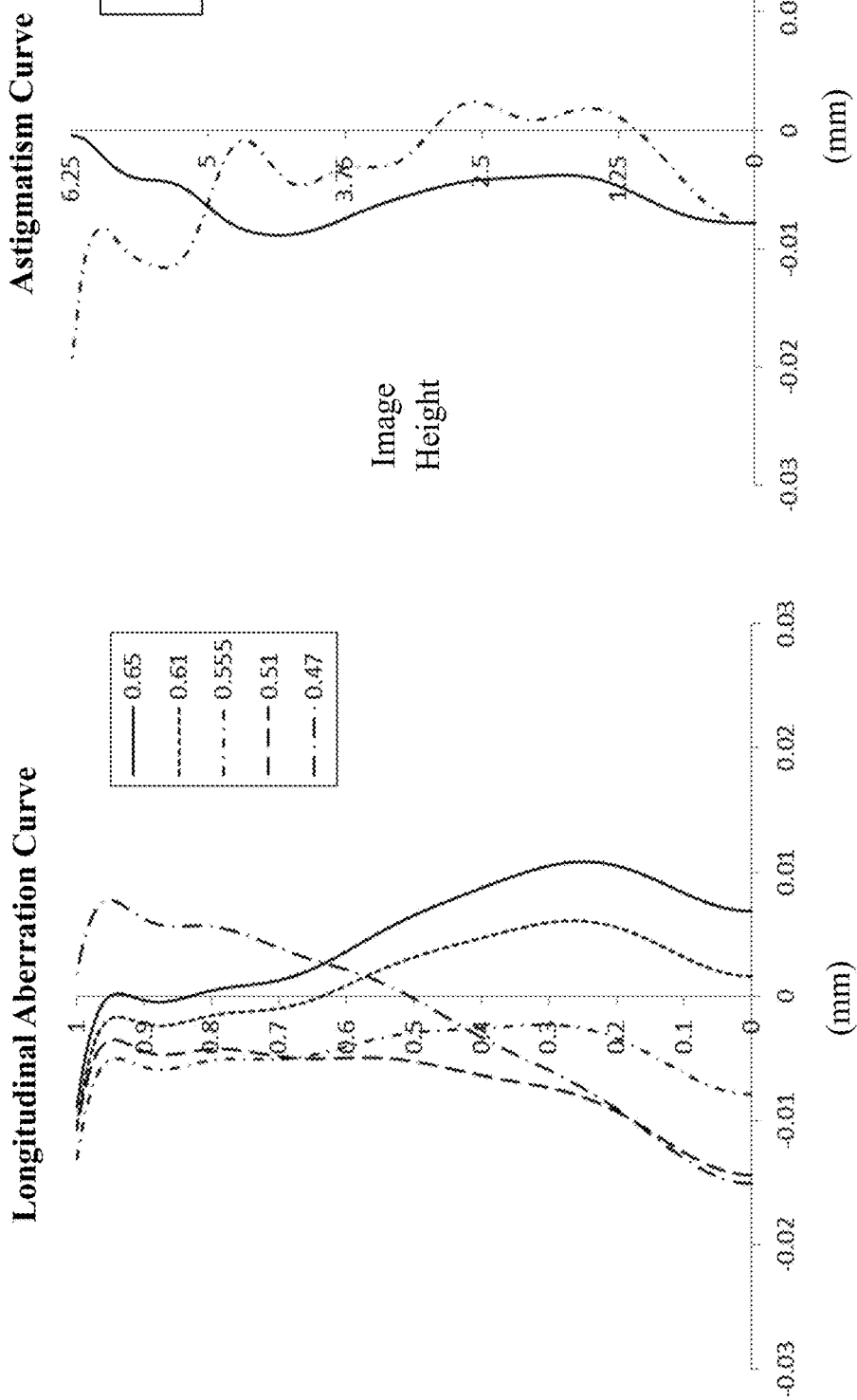
FIGS. 18A to 18D show a longitudinal aberration curve, astigmatism curve, distortion curve and lateral color curve of the optical camera system according to Embodiment 9, respectively.
Figure 18D:
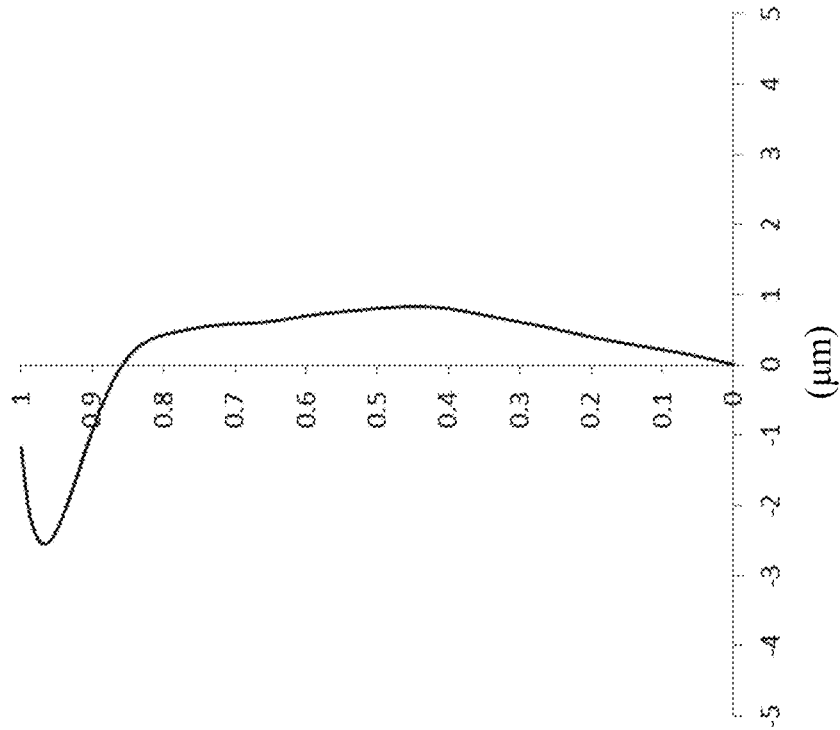
Figure 18C:
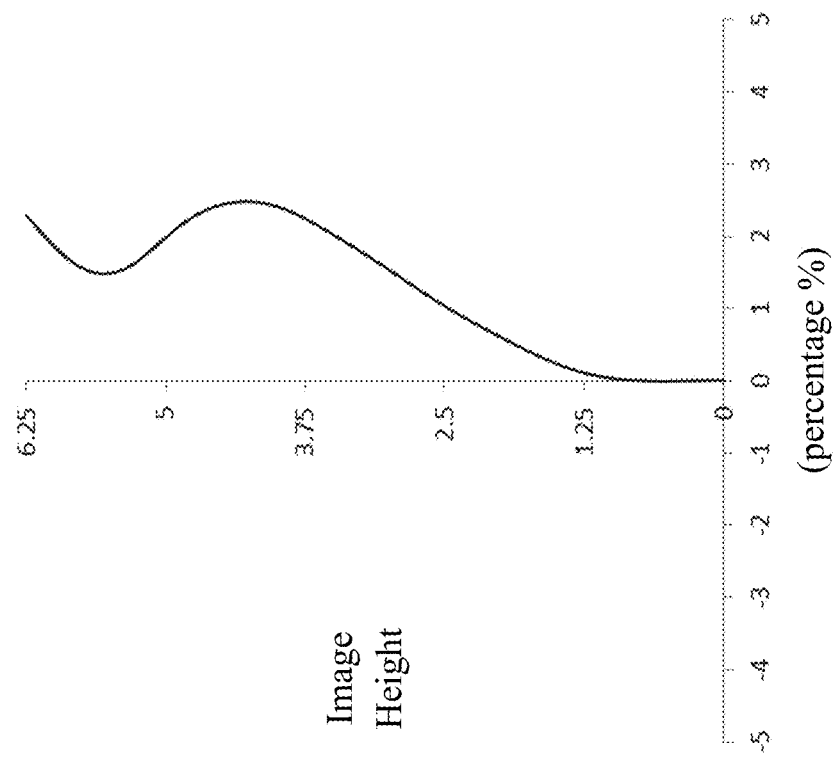

FIG. 18A shows a longitudinal aberration curve of the optical camera system according to Embodiment 9, which represents the deviation of the converged focal point after light of different wavelengths passes through the camera lens. FIG. 18B shows an astigmatism curve of the optical camera system according to Embodiment 9, which represents the curvature of the tangential image plane and the curvature of the sagittal image plane. FIG. 18C shows a distortion curve of the optical camera system according to Embodiment 9, which represents distortion magnitude values corresponding to different image heights. FIG. 18D shows a lateral color curve of the optical camera system according to Embodiment 9, which represents the deviation of different image heights on the imaging plane after light passes through the camera lens. According to FIGS. 18A to 18D, it can be seen that the optical camera system given in Embodiment 9 can achieve good imaging quality.

Embodiment 10

Figure 19:
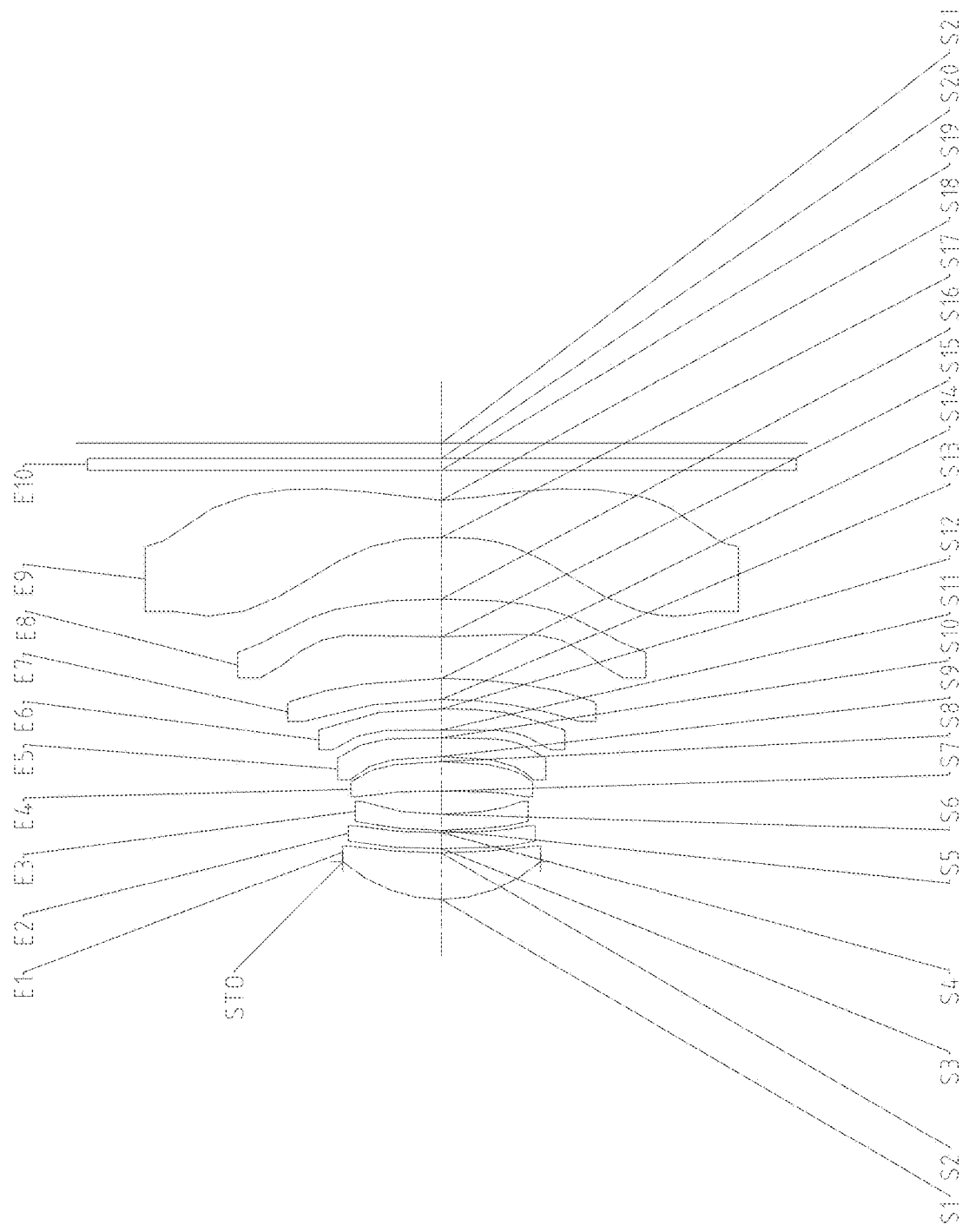
FIG. 19 shows a schematic structural diagram of an optical camera system according to Embodiment 10 of the present application.

An optical camera system according to Embodiment 10 of the present application will be described below with reference to FIGS. 19 to 20D. FIG. 19 shows a schematic structural diagram of the optical camera system according to Embodiment 10 of the present application.

As shown in FIG. 19, the optical camera system includes a diaphragm STO, a first lens E1, a second lens E2, a third lens E3, a fourth lens E4, a fifth lens E5, a sixth lens E6, a seventh lens E7, an eighth lens E8, a ninth lens E9, a filter E10 and an imaging plane S21 in order from an object side to an image side along an optical axis.

The first lens E1 has a positive refractive power, and has a convex object side surface S1 and a concave image side surface S2. The second lens E2 has a negative refractive power, and has a convex object side surface S3 and a concave image side surface S4. The third lens E3 has a negative refractive power, and has a convex object side surface S5 and a concave image side surface S8. The fourth lens E4 has a positive refractive power, and has a concave object side surface S7 and a convex image side surface S8. The fifth lens E5 has a negative refractive power, and has a concave object side surface S9 and a concave image side surface S10. The sixth lens E8 has a positive refractive power, and has a convex object side surface S11 and a convex image side surface S12. The seventh lens E7 has a negative refractive power, and has a concave object side surface S13 and a convex image side surface S14. The eighth lens E8 has a positive refractive power, and has a convex object side surface S15 and a convex image side surface S16. The ninth lens E9 has a negative refractive power, and has a concave object side surface S17 and a concave image side surface S18. The filter E10 has an object side surface S19 and an image side surface S20. Light from an object sequentially passes through the respective surfaces S1 to S20 and finally forms an image on the imaging plane S21.

In the present example, a total effective focal length f of the optical camera system is 8.87 mm, a total length TTL of the optical camera system is 8.06 mm, a half ImgH of a diagonal length of an effective pixel region on the imaging plane S21 of the optical camera system is 6.25 mm, and the maximum field of view FOV of the optical camera system is 84.28°.

Table 19 shows a table of basic parameters of the optical camera system of Embodiment 10, wherein the units of the radius of curvature, thickness/distance, and focal length are all millimeters (mm). Tables 20-1 and 20-2 show higher-order coefficients of each of aspheric lens surfaces that are applicable in Embodiment 10, wherein the surface shape of each aspheric surface can be defined by formula (1) given in Embodiment 1 described above,

TABLE 19

| Surface No. | Surface type | Radius of curvature | Thickness/ distance | Material Refractive index | Abbe number | Focal length | Conic coefficient |
|---|---|---|---|---|---|---|---|
| OBJ | Spherical | Infinity | Infinity | | | | |
| STO | Spherical | Infinity | −0.6750 | | | | |
| S1 | Aspherical | 2.5426 | 0.8308 | 1.55 | 56.1 | 6.18 | −1.2232 |
| S2 | Aspherical | 9.1378 | 0.0784 | | | | −5.3502 |
| S3 | Aspherical | 18.3757 | 0.2800 | 1.67 | 20.4 | −152.31 | 89.1732 |
| S4 | Aspherical | 15.4618 | 0.0404 | | | | 86.5652 |
| S5 | Aspherical | 7.2433 | 0.2800 | 1.68 | 19.2 | −23.36 | 5.4934 |
| S6 | Aspherical | 4.8917 | 0.4111 | | | | −2.4875 |
| S7 | Aspherical | −34.0786 | 0.5195 | 1.55 | 56.1 | 17.46 | 95.7783 |
| S8 | Aspherical | −7.4893 | 0.0892 | | | | 3.8939 |
| S9 | Aspherical | −8.5564 | 0.3300 | 1.67 | 20.4 | −11.83 | −9.7357 |
| S10 | Aspherical | 100.0000 | 0.1383 | | | | −90.0000 |
| S11 | Aspherical | 13.8741 | 0.3700 | 1.64 | 23.5 | 15.94 | −68.6282 |
| S12 | Aspherical | −38.9251 | 0.1700 | | | | −85.4016 |
| S13 | Aspherical | −7.7708 | 0.3700 | 1.64 | 23.5 | −70.08 | 2.9228 |
| S14 | Aspherical | −9.5637 | 0.7305 | | | | 0.4517 |
| S15 | Aspherical | 8.6783 | 0.6772 | 1.55 | 56.1 | 11.00 | 3.8103 |
| S16 | Aspherical | −18.9573 | 1.0872 | | | | 8.0165 |
| S17 | Aspherical | −15.3037 | 0.6528 | 1.54 | 55.7 | −4.52 | 4.1833 |
| S18 | Aspherical | 2.9289 | 0.5287 | | | | −14.5658 |
| S19 | Spherical | Infinity | 0.2100 | 1.52 | 64.2 | | |
| S20 | Spherical | Infinity | 0.2684 | | | | |
| S21 | Spherical | Infinity | | | | | |

TABLE 20-1

| Surface No. | A4 | A6 | A8 | A10 | A12 | A14 | A16 |
|---|---|---|---|---|---|---|---|
| S1 | 9.8226E−03 | 5.2706E−05 | 1.1946E−03 | −1.3835E−03 | 1.0151E−03 | −4.7735E−04 | 1.3483E−04 |
| S2 | −7.7586E−03 | 1.8360E−03 | −3.2991E−03 | 1.0955E−02 | −1.3120E−02 | 8.2312E−03 | −2.9008E−03 |
| S3 | 1.1832E−03 | −2.9692E−03 | 5.3810E−03 | 9.9751E−04 | −6.0850E−03 | 5.0914E−03 | −2.0114E−03 |
| S4 | 1.4709E−02 | −2.9047E−02 | 3.6248E−02 | −2.4388E−02 | 4.2919E−03 | 5.1427E−03 | −3.7876E−03 |
| S5 | −4.0556E−03 | −2.4663E−02 | 3.4396E−02 | −2.2377E−02 | 3.9318E−03 | 4.9981E−03 | −3.7361E−03 |
| S6 | −4.6477E−03 | 2.2973E−03 | −1.8080E−03 | 1.0124E−02 | −1.3955E−02 | 1.0717E−02 | −4.6713E−03 |
| S7 | −8.1541E−03 | −6.8168E−03 | 8.5499E−03 | −1.1153E−02 | 9.3146E−03 | −5.1639E−03 | 1.8585E−03 |
| S8 | 1.0180E−03 | −3.9041E−02 | 3.3186E−02 | −4.4373E−02 | −1.8958E−02 | 1.7973E−02 | −7.3808E−03 |
| S9 | −5.7127E−03 | −5.0382E−02 | 4.9813E−02 | −2.3606E−02 | −7.6478E−04 | 5.1071E−03 | −1.5913E−03 |
| S10 | −2.8088E−02 | −4.5084E−03 | −2.2249E−03 | 1.3943E−02 | −1.6511E−02 | 9.1406E−03 | −2.7252E−03 |
| S11 | −4.6475E−02 | 1.3998E−02 | −1.0922E−02 | 4.6194E−03 | 2.2956E−03 | −4.2774E−03 | 2.2750E−03 |
| S12 | −3.4008E−02 | 6.7049E−03 | −4.7949E−03 | 1.8329E−03 | 1.3313E−03 | −1.6629E−03 | 7.3135E−04 |
| S13 | 4.5817E−15 | −1.2635E−14 | 1.4166E−14 | −8.2731E−15 | 2.6919E−15 | −4.7785E−16 | 3.9199E−17 |
| S14 | −4.3098E−03 | 3.8486E−03 | −8.8446E−04 | −6.2200E−05 | 3.5231E−05 | 6.4521E−06 | −3.6183E−06 |
| S15 | −2.4928E−02 | 1.0153E−02 | −6.8891E−03 | 3.0384E−03 | −9.1778E−04 | 1.9765E−04 | −3.0839E−05 |
| S16 | −1.5256E−02 | 1.0077E−02 | −5.5869E−03 | 1.7347E−03 | −3.1846E−04 | 3.5306E−05 | −2.3131E−06 |
| S17 | −8.6390E−02 | 4.4482E−02 | 1.6423E−02 | 4.1507E−03 | −7.1267E−04 | 8.5110E−05 | −7.2111E−06 |
| S18 | −3.5877E−02 | 1.6569E−02 | −5.1862E−03 | 1.1132E−03 | −1.6891E−04 | 1.3470E−05 | −1.4689E−06 |

TABLE 20-2

| Surface No. | A18 | A20 | A22 | A24 | A26 | A28 |
|---|---|---|---|---|---|---|
| S1 | −2.0782E−05 | 1.2012E−06 | 0.0000E+00 | 0.0000E+00 | 0.0000E+00 | 0.0000E+00 |
| S2 | 5.3907E−04 | −4.0948E−05 | 0.0000E+00 | 0.0000E+00 | 0.0000E+00 | 0.0000E+00 |
| S3 | 3.8814E−04 | −2.8674E−05 | 0.0000E+00 | 0.0000E+00 | 0.0000E+00 | 0.0000E+00 |
| S4 | 1.0209E−03 | −1.0117E−04 | 0.0000E+00 | 0.0000E+00 | 0.0000E+00 | 0.0000E+00 |

TABLE 20-2-continued

| Surface No. | A18 | A20 | A22 | A24 | A26 | A28 |
|---|---|---|---|---|---|---|
| S5  | 1.0296E−03  | −1.0434E−04 | 0.0000E+00  | 0.0000E+00  | 0.0000E+00  | 0.0000E+00 |
| S6  | 1.0975E−03  | −1.0672E−04 | 0.0000E+00  | 0.0000E+00  | 0.0000E+00  | 0.0000E+00 |
| S7  | −3.6782E−04 | 2.8563E−05  | 0.0000E+00  | 0.0000E+00  | 0.0000E+00  | 0.0000E+00 |
| S8  | 1.4874E−03  | −1.2273E−04 | 0.0000E+00  | 0.0000E+00  | 0.0000E+00  | 0.0000E+00 |
| S9  | 3.8085E−05  | 3.1237E−05  | 0.0000E+00  | 0.0000E+00  | 0.0000E+00  | 0.0000E+00 |
| S10 | 4.2701E−04  | −2.7502E−05 | 0.0000E+00  | 0.0000E+00  | 0.0000E+00  | 0.0000E+00 |
| S11 | −5.7716E−04 | 7.1324E−05  | −3.4640E−06 | 0.0000E+00  | 0.0000E+00  | 0.0000E+00 |
| S12 | −1.6201E−04 | 1.7983E−05  | −7.9510E−07 | 0.0000E+00  | 0.0000E+00  | 0.0000E+00 |
| S13 | −3.0274E−19 | −1.0083E−19 | 0.0000E+00  | 0.0000E+00  | 0.0000E+00  | 0.0000E+00 |
| S14 | 4.8460E−07  | −21632E−08  | 0.0000E+00  | 0.0000E+00  | 0.0000E+00  | 0.0000E+00 |
| S15 | 3.3886E−06  | −2.4415E−07 | 1.0193E−08  | −1.8524E−10 | 0.0000E+00  | 0.0000E+00 |
| S16 | 8.2332E−08  | −1.2269E−09 | 0.0000E+00  | 0.0000E+00  | 0.0000E+00  | 0.0000E+00 |
| S17 | 4.3717E−07  | −1.8868E−08 | 5.6687E−10  | −1.1281E−11 | 1.3378E−13  | −7.1620E−16 |
| S18 | 8.4870E−08  | −3.5196E−09 | 1.0191E−10  | −1.9533E−12 | 2.2239E−14  | −1.1374E−16 |

Figures 20A, 20B:
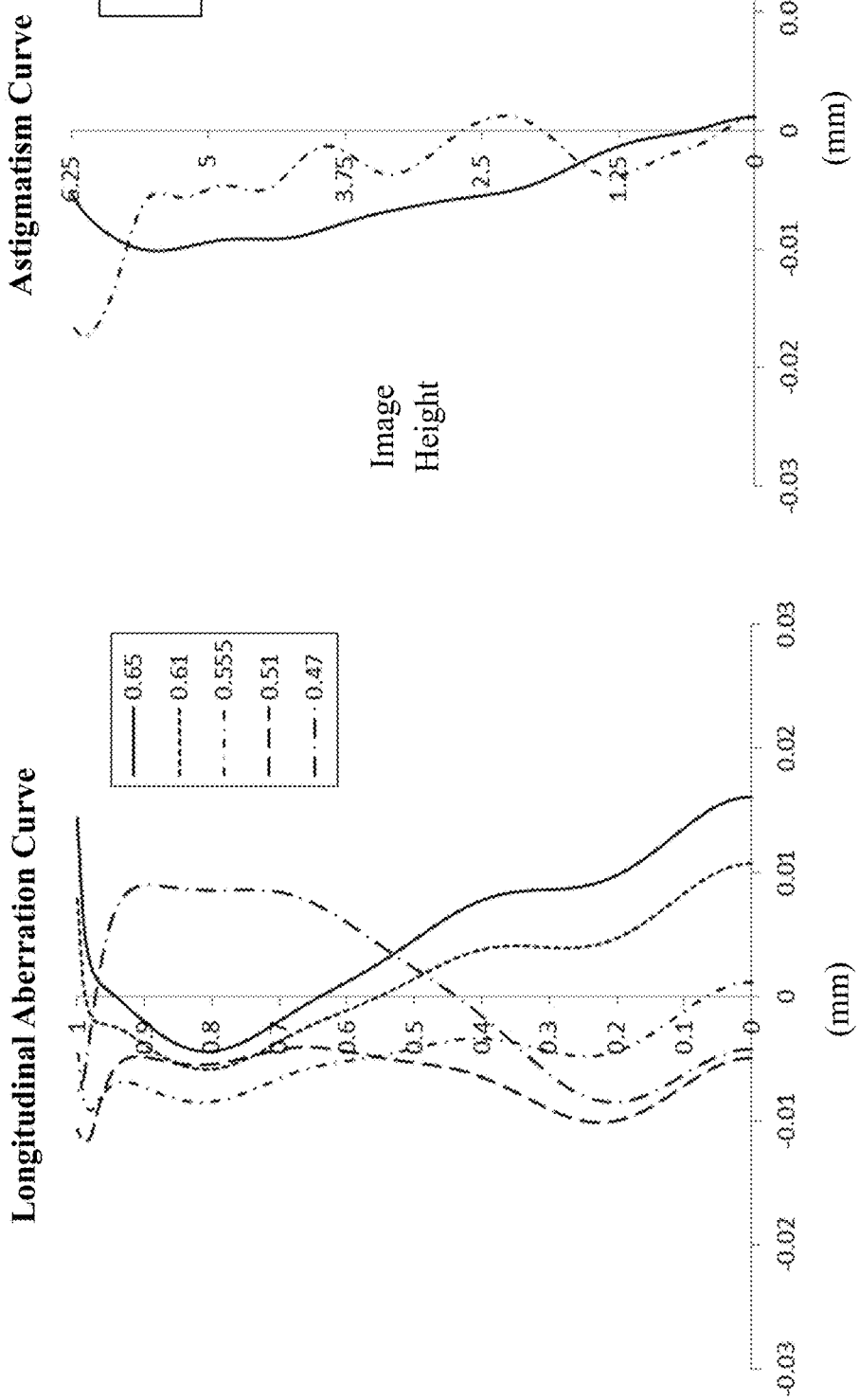
FIGS. 20A to 20D show a longitudinal aberration curve, astigmatism curve, distortion curve and lateral color curve of the optical camera system according to Embodiment 10, respectively.
Figure 20D:
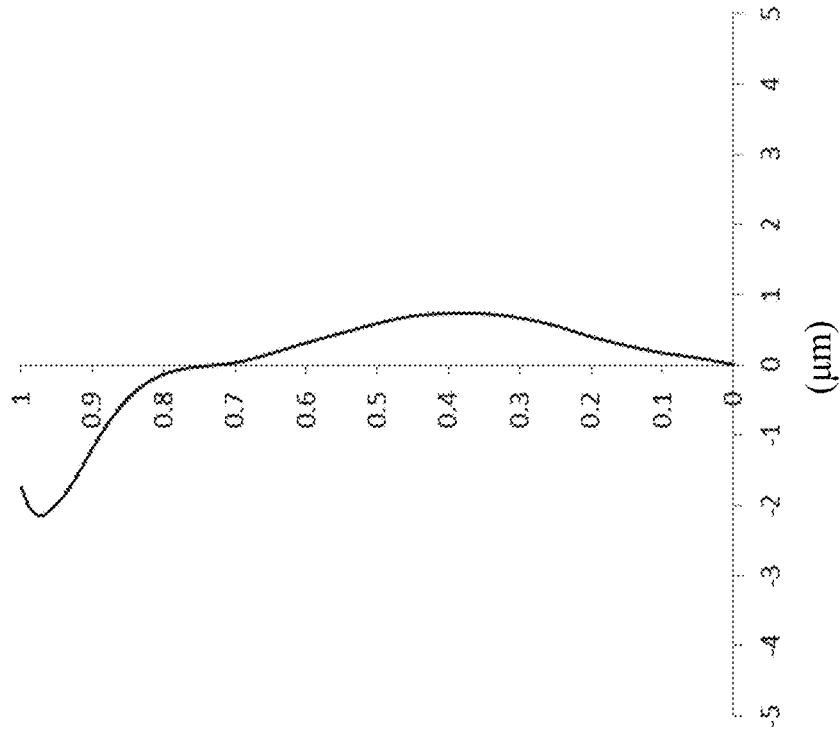
Figure 20C:
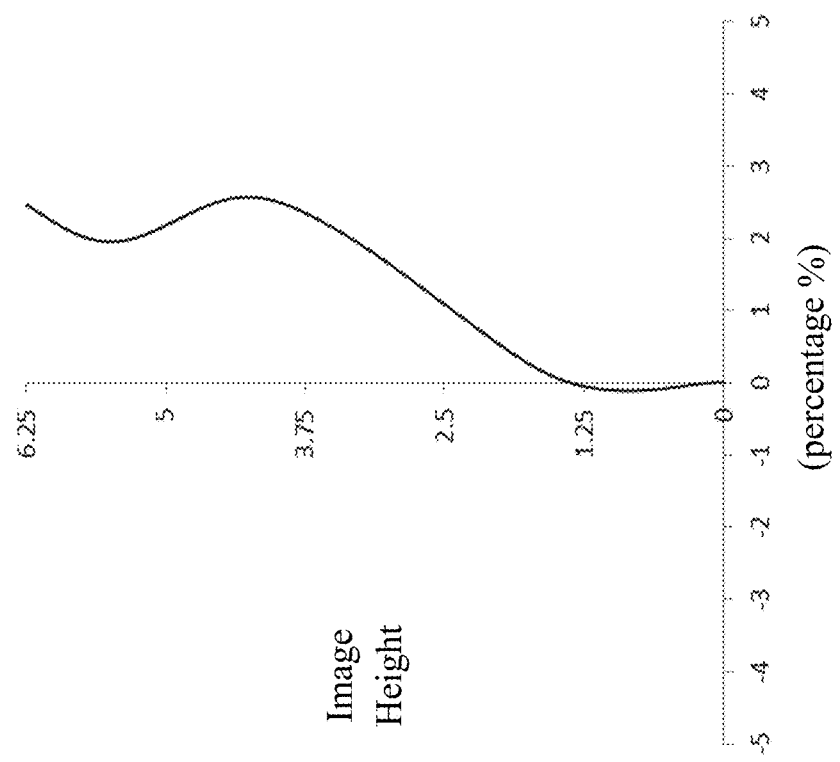

FIG. 20A shows a longitudinal aberration curve of the optical camera system according to Embodiment 10, which represents the deviation of the converged focal point after light of different wavelengths passes through the camera lens. FIG. 20B shows an astigmatism curve of the optical camera system according to Embodiment 10, which represents the curvature of the tangential image plane and the curvature of the sagittal image plane. FIG. 20C shows a distortion curve of the optical camera system according to Embodiment 10, which represents distortion magnitude values corresponding to different image heights. FIG. 20D shows a lateral color curve of the optical camera system according to Embodiment 10, which represents the deviation of different image heights on the imaging plane after light passes through the camera lens. According to FIGS. 20A to 20D, it can be seen that the optical camera system given in Embodiment 10 can achieve good imaging quality.

In summary, Embodiments 1 to 10 satisfy the relationships shown in Table 21, respectively.

TABLE 21

| Conditional expression\Embodiment | 1 | 2 | 3 | 4 | 5 | 6 | 7 | 8 | 9 | 10 |
|---|---|---|---|---|---|---|---|---|---|---|
| TTL/ImgH | 1.24 | 1.28 | 1.30 | 1.26 | 1.27 | 1.20 | 1.23 | 1.20 | 1.21 | 1.29 |
| tan(FOV/2) × f (mm) | 6.38 | 6.20 | 6.20 | 6.21 | 6.14 | 6.36 | 6.11 | 6.06 | 6.06 | 6.21 |
| (f3 + f4) / (f3 − f4) | 0.06 | 0.12 | 0.02 | 0.01 | 0.01 | 0.03 | 0.07 | 0.10 | 0.11 | 0.14 |
| f1/f | 0.90 | 0.90 | 0.91 | 0.94 | 0.93 | 0.96 | 0.97 | 1.00 | 0.99 | 0.90 |
| f8/f9 | −2.66 | −2.45 | −2.38 | −2.34 | −2.37 | −2.32 | −2.29 | −2.23 | −2.27 | −2.43 |
| f5/f | −2.56 | −2.50 | −1.89 | −2.23 | −2.00 | −3.21 | −3.03 | −3.31 | −3.20 | −1.72 |
| \|(R13 − R14)/(R13 + R14)\| | 0.04 | 0.02 | 0.06 | 0.14 | 0.17 | 0.30 | 0.06 | 0.11 | 0.25 | 0.10 |
| (ET2 + ET3)/(CT2 + CT3) | 1.20 | 1.19 | 1.18 | 1.20 | 1.20 | 1.09 | 1.09 | 1.08 | 1.08 | 1.12 |
| 2 × CT7/(CT5 + CT6) | 1.06 | 1.04 | 1.04 | 1.01 | 1.00 | 1.04 | 0.95 | 0.96 | 0.93 | 1.06 |
| SAG42/SAG52 | 0.75 | 0.76 | 0.78 | 0.79 | 0.87 | 0.76 | 0.76 | 0.78 | 0.78 | 0.87 |
| DT11/ImgH | 0.24 | 0.25 | 0.25 | 0.24 | 0.25 | 0.24 | 0.25 | 0.25 | 0.25 | 0.25 |
| f23/f | −2.74 | −2.77 | −2.95 | −2.74 | −2.87 | −2.73 | −2.72 | −2.74 | −2.73 | −2.96 |
| R8/f4 | −0.59 | −0.55 | −0.48 | −0.60 | −0.49 | −0.48 | −0.48 | −0.48 | −0.48 | −0.43 |
| CT8/T89 | 0.91 | 0.75 | 0.75 | 0.62 | 0.63 | 0.58 | 0.58 | 0.53 | 0.54 | 0.62 |
| DT32/DT42 | 0.90 | 0.89 | 0.88 | 0.89 | 0.89 | 0.85 | 0.85 | 0.84 | 0.84 | 0.88 |
| Tr7r14/TTL | 0.23 | 0.24 | 0.23 | 0.24 | 0.23 | 0.25 | 0.24 | 0.23 | 0.24 | 0.25 |
| CT6/T7 | 1.02 | 1.06 | 1.06 | 1.02 | 1.03 | 0.97 | 1.11 | 1.08 | 1.15 | 1.00 |
| SL/TTL | 0.93 | 0.93 | 0.93 | 0.93 | 0.93 | 0.82 | 0.82 | 0.81 | 0.81 | 0.92 |

The present application further provides an imaging apparatus, of which an electronic photosensitive element may be a photosensitive coupling element (CCD) or a complementary metal oxide semiconductor element (CMOS). The imaging apparatus may be an independent imaging device such as a digital camera, or may be an imaging module integrated in a mobile electronic device such as a mobile phone. The imaging apparatus is equipped with the optical camera system described above.

The above description is only the preferred embodiments of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

The invention claimed is:

1. An optical camera system, comprising, in order from an object side to an image side along an optical axis: a first lens, a second lens, a third lens, a fourth lens, a fifth lens, a sixth lens, a seventh lens, an eighth lens and a ninth lens all having refractive power,
  wherein the first lens has a convex object side surface;
  wherein the first lens, fourth lens, and the eighth lens all have positive refractive power, and the third lens, the fifth lens, and the ninth lens all have negative refractive power; and
  a distance TTL from an object side surface of the first lens to an imaging plane of the optical camera system on the optical axis and a half ImgH of a diagonal length of an effective pixel region of the optical camera system satisfy: TTL/ImgH<1.5;
  wherein an effective half aperture DT11 of the object side surface of the first lens and the half ImgH of the diagonal length of the effective pixel region of the optical camera system satisfy: DT11/ImgH<0.5.

2. The optical camera system according to claim 1, wherein the maximum field of view FOV of the optical camera system and a total effective focal length f of the optical camera system satisfy: tan (FOV/2)×f>5 mm.

3. The optical camera system according to claim 1, wherein an effective focal length f3 of the third lens and an effective focal length f4 of the fourth lens satisfy: 0<(f3+f4)/(f3−f4)<0.5.

4. An optical camera system, comprising, in order from an object side to an image side along an optical axis: a first lens, a second lens, a third lens, a fourth lens, a fifth lens, a sixth lens, a seventh lens, an eighth lens and a ninth lens all having refractive power,
  wherein the first lens has a convex object side surface;
  wherein the first lens, fourth lens, and the eighth lens all have positive refractive power, and the third lens, the fifth lens, and the ninth lens all have negative refractive power; and
  a distance TTL from an object side surface of the first lens to an imaging plane of the optical camera system on the optical axis and a half ImgH of a diagonal length of an effective pixel region of the optical camera system satisfy: TTL/ImgH<1.5;
  wherein an effective focal length f1 of the first lens and a total effective focal length f of the optical camera system satisfy: 0.7<f1/f≤1.

5. The optical camera system according to claim 1, wherein an effective focal length f8 of the eighth lens and an effective focal length f9 of the ninth lens satisfy: −3<f8/f9<−2.

6. The optical camera system according to claim 1, wherein an effective focal length f5 of the fifth lens and a total effective focal length f of the optical camera system satisfy: −4<f5/f<0.

7. The optical camera system according to claim 1, wherein a radius of curvature R13 of an object side surface of the seventh lens and a radius of curvature R14 of an image side surface of the seventh lens satisfy: |(R13−R14)/(R13+R14)|<0.5.

8. The optical camera system according to claim 1, wherein an edge thickness ET2 of the second lens, an edge thickness ET3 of the third lens, a center thickness CT2 of the second lens on the optical axis and a center thickness CT3 of the third lens on the optical axis satisfy: 1<(ET2+ET3)/(CT2+CT3)<1.5.

9. The optical camera system according to claim 1, wherein a center thickness CT7 of the seventh lens on the optical axis, a center thickness CT5 of the fifth lens on the optical axis, and a center thickness CT6 of the sixth lens on the optical axis satisfy: 0.8<2×CT7/(CT5+CT6)<1.2.

10. The optical camera system according to claim 1, wherein a separation distance SAG42 from an intersection point of an image side surface of the fourth lens and the optical axis to an effective radius vertex of the image side surface of the fourth lens on the optical axis, and a separation distance SAG52 from an intersection point of an image side surface of the fifth lens and the optical axis to an effective radius vertex of the image side surface of the fifth lens on the optical axis satisfy: 0.6<SAG42/SAG52<1.

11. The optical camera system according to claim 1, wherein a combined focal length f23 of the second lens and the third lens and a total effective focal length f of the optical camera system satisfy: −3<f23/f<0.

12. The optical camera system according to claim 1, wherein a radius of curvature R8 of an image side surface of the fourth lens and an effective focal length f4 of the fourth lens satisfy: −1<R8/f4<0.

13. The optical camera system according to claim 1, wherein a center thickness CT8 of the eighth lens on the optical axis, and a separation distance T89 between the eighth lens and the ninth lens on the optical axis satisfy: 0.5<CT8/T89<1.

14. The optical camera system according to claim 1, wherein the maximum effective radius DT32 of an image side surface of the third lens and the maximum effective radius DT42 of an image side surface of the fourth lens satisfy: 0.5<DT32/DT42<1.

15. The optical camera system according to claim 1, wherein a distance Tr7r14 from an object side surface of the fourth lens to an image side surface of the seventh lens on the optical axis, and the distance TTL from the object side surface of the first lens to the imaging plane of the optical camera system on the optical axis satisfy: 0<Tr7r14/TTL<0.4.

16. The optical camera system according to claim 1, wherein a center thickness CT6 of the sixth lens on the optical axis and a center thickness CT7 of the seventh lens on the optical axis satisfy: 0.8<CT6/CT7<1.2.

17. The optical camera system according to claim 1, wherein the optical camera system further comprises a diaphragm provided between the object side and the fourth lens, and
  a distance SL from the diaphragm to the imaging plane of the optical camera system on the optical axis and the distance TTL from the object side surface of the first lens to the imaging plane of the optical camera system on the optical axis satisfy: 0.7<SL/TTL<1.

18. An optical camera system, comprising, in order from an object side to an image side along an optical axis: a first lens, a second lens, a third lens, a fourth lens, a fifth lens, a sixth lens, a seventh lens, an eighth lens and a ninth lens all having refractive power,
  wherein the first lens has a convex object side surface;
  wherein the first lens, fourth lens, and the eighth lens all have positive refractive power, and the third lens, the fifth lens, and the ninth lens all have negative refractive power; and an effective half aperture DT11 of an object side surface of the first lens and a half ImgH of a diagonal length of an effective pixel region of the optical camera system satisfy: DT11/ImgH<0.5.

* * * * *